(12) United States Patent
Kejser et al.

(10) Patent No.: US 6,381,666 B1
(45) Date of Patent: Apr. 30, 2002

(54) METHOD AND APPARATUS FOR EXTENDING THE RANGE OF THE UNIVERSAL SERIAL BUS PROTOCOL

(75) Inventors: Keith Kejser, New Westminster; Juraj Krajci, Coquitlam, both of (CA)

(73) Assignee: Igron Systems Inc., Burnaby (CA)

( * ) Notice: Subject to any disclaimer, the term of this patent is extended or adjusted under 35 U.S.C. 154(b) by 0 days.

(21) Appl. No.: 09/506,802

(22) Filed: Feb. 18, 2000

(30) Foreign Application Priority Data

Feb. 19, 1999 (CA) ............................... 2262334
Apr. 26, 1999 (CA) ............................... 2269961

(51) Int. Cl.⁷ ............................................... G06F 13/00
(52) U.S. Cl. .................... 710/300; 710/100; 710/305; 710/316; 710/62
(58) Field of Search ........................ 710/100, 62, 63, 710/300, 305, 306, 316, 317

(56) References Cited

U.S. PATENT DOCUMENTS

| 5,588,140 A | * | 12/1996 | Misukanis et al. |
| 5,784,581 A | * | 7/1998 | Hannah |
| 5,797,028 A | * | 8/1998 | Gulick et al. |
| 5,890,015 A | * | 3/1999 | Garney et al. ................ 710/62 |
| 5,983,073 A | * | 11/1999 | Ditzik ....................... 455/11.1 |
| 6,308,215 B1 | * | 10/2001 | Kolbet et al. ............... 709/233 |

FOREIGN PATENT DOCUMENTS

GB 2 325 997 A * 12/1998 ............. G06F/5/06

* cited by examiner

Primary Examiner—Ario Etienne
(74) Attorney, Agent, or Firm—Marks & Clerk

(57) ABSTRACT

The present invention provides a method and apparatus to be used to extend the range of a standard USB devices. An extended range hub is provided which comprises a Local Expander (LEX) and a Remote Expander (REX) which can be separated by up to, for example 100 metres. The method and apparatus permits USB devices to be more conveniently located and used.

40 Claims, 30 Drawing Sheets

METHOD AND APPARATUS FOR EXTENDING THE RANGE OF THE UNIVERSAL SERIAL BUS PROTOCOL

FIELD OF THE INVENTION

This invention relates to methods and apparatus for transmitting signals between devices using Universal Serial Bus ports, and, in particular, to an method for allowing communications between devices using such ports over an extended range.

DESCRIPTION OF THE RELATED ART

Universal Serial Bus (USB) is a technology designed to permit a wide range of peripherals to be attached to personal computers by the average user. Since the technology supports all of the common peripheral devices such as keyboards, mice, speakers, modems, joysticks, cameras and many others, it will replace the serial and parallel ports in use today. The Apple iMac (Trade Mark), for example, supports only USB ports. In addition, almost every personal computer (PC) manufactured since 1997 has been equipped with USB ports.

USB was created by an alliance of seven of the largest companies in the computer and communication markets. Those companies were Intel, Compaq, Microsoft, NorTel, NEC, Digital and IBM. The specifications defining USB (e.g. Intel et al., Universal Serial Bus Specification, Revision 1.0, January 1996; and updated as Revision 1.1 in Sep. 23, 1998, and subsequent updates and modifications (such as draft Revision 2.0)—hereinafter collectively referred to as the "USB Specification", which term can include future modifications and revisions) are non-proprietary and are managed by an open industry organization known as the USB Forum. The USB Specification establishes a number of criteria which must be met in order to comply to USB standards. The USB Specification also defines a number of terms, which definitions are adopted for the purposes of this specification.

For example, it is a requirement of Revision 1.0 of the USB Specification that a single USB domain shall support up to 127 devices operating over a shared medium providing a maximum bandwidth of 12 Mbps. Draft Revision 2.0 allows, however, a bandwidth of 480 Mbps, thus demonstrating modification of the USB Specification.

All known USB Specifications, however, currently limit the distance that a device can be separated from its host PC to 5 meters. By using a series of USB Hubs—devices that are intended to support increased populations rather than increased distances—this distance limitation can be increased, in theory, to 30 meters. This multiple hub solution is both expensive and clumsy. For example, to support a single device at a range of 30 meters the consumer must purchase five hubs at a current cost of about $50 US each. In addition, at least two of these hubs must be provided with electrical power. Since the individual cables between hubs are limited to 5 meters each, it is also likely that some of the hubs would have to be positioned in very inconvenient and insecure locations.

There is therefore a need for methods and apparatus to allow USB devices to be positioned at greater distances from the host PC. For example, an uninterrupted distance of at least 100 meters is required for compatibility with the standards governing the cabling of commercial buildings (see, for example, TIA/EIA-568-A, Commercial Building Telecommunications Cabling Standard, Telecommunications Industry Association, October 1995). Meeting this standard must be accomplished without the need for intermediate repeaters since distribution cabling is not normally accessible between its end-points at, for example, the Telecommunications Closet and the Work Area. Furthermore, even if the cable were to be accessible, the cabling standard does not allow active devices to be inserted other than at the end-points.

Providing for an extended range capability would also create new applications for USB devices as well as facilitating existing ones. For example, a simple residential or SOHO (small office, home office) surveillance system could be constructed by connecting consumer quality cameras to a central PC. An overhead mounted monitor could be controlled by a remote keyboard or mouse. A door-phone entrance system could be monitored from any office in a commercial building. Many other applications are possible.

Currently, however, the USB Specifications do not permit the use of extended ranges. For example, it is a further requirement of the USB Specification that the access of each device to the shared communications bus is controlled by a single Host Controller. It is also specified that when the Host Controller instructs a particular device to place its information onto the shared bus, the requested information must be received by the Host Controller within sixteen (16) "bit-times" of said Host Controller issuing said instruction. In practise, this ensures that the USB Specification provides for a high efficiency of bandwidth utilization by limiting the period during which no information is being transmitted. However, these requirements also limit the physical range of USB devices since one bit-time at 12 Mbps is equivalent to the time taken for an electronic signal to traverse approximately 17 meters of copper cable, and an even shorter distance for one bit-time at 480 Mbps. Further, although the USB device must respond to a request from the Host Controller within 16 bit-times, 7.5 bit-times is allocated for delay within a USB device and its associated 5 meter cable. This allocation retains only 8.5 bit-times at 12 Mbps for additional cable delay. The time represented by 8.5 bit-times is equivalent to the delay incurred by electronic signals in traversing approximately 144 meters of cable. However, this cable length is insufficient to satisfy the round-trip cable length of 200 meters required by the premise cabling specification.

Thus, it is not currently possible to provide USB devices which are separated over an extended distance.

However, it is a further feature of the USB Specification that the USB Specification (or protocol) segregates access to the shared bus into discrete units known as "frames". Each frame is designed to last for a period of 1 ms.

Further, the USB Specification also requires that at least four separate types of data streams or "traffic" are recognized, namely isochronous transfers, control transfers, interrupt transfers and bulk transfers.

Isochronous data transfer is characterised as being a data transfer wherein data flows essentially continuously, and at a steady rate, in close timing with the ability of the receiving mechanism to receive and use the incoming data.

In particular, it should be noted that it is an aspect of isochronous transfers that timely delivery of information is ensured at the expense of potential transient losses in the data stream. In particular, there is no attempt to retransmit any data that may have been lost in previous transmissions. For example, With an isochronous video signal, loss of one frame of information is generally not significant, and there is no interest in retrieving the lost frame. Instead, the host controller is typically more concerned with transmitting or receiving the current frame. Accordingly, isochronous data transfer is said to be a "time-relevant" data transfer system.

This type of data transfer is distinguished from asynchronous data transfer, which pertains to processes that proceed independently of each other until a dependent process has to "interrupt" the other process, and synchronous data transfer, which pertains to processes in which one process has to wait on the completion of an event in another process before continuing. Accordingly, these data transfer methods are said to be non-time-relevant. Instead, a correct response to any request is required.

The current invention therefore uses the fundamental characteristics of isochronous and asynchronous data transfer, and more generally any time relevant or non-time-relevant data transmission, and the existence of regular protocol frames in order to provide methods and apparatus to enable data transmission over extended distances

SUMMARY OF THE INVENTION

Accordingly, while USB technology has proven to be useful, it would still be desirable to provide improvements to the technology by providing a method and apparatus for enabling data transmission equipment, and in particular, time relevant or non-time relevant data transmission equipment utilizing the USB Specification, to be used over an extended range.

Therefore, it is an object of the present invention to provide methods and apparatus to enable devices, hubs and controllers and other devices that conform to the USB Specification to communicate over distances greater than that currently permitted under said USB Specification.

It is a further object of the present invention that such extended range be achieved without the need for intermediate hubs, repeaters or other methods of electronic signal regeneration.

It is a further object of the present invention that no hardware or software changes need be made to the existing devices, hubs and controllers supported by the system, and in particular, to either isochronous or asynchronous systems operating under the USB Specification. The invention, thereby, may be incorporated into networks composed of both conventional range and extended range devices.

It is a further object of the present invention that the apparatus be very cost effective, consistent with the broadest population of devices targeted by the USB industry.

These and other objects of the invention, which will become apparent herein, are attained by the present invention which provides a local expander connected to a host controller and a remote expander connected to a peripheral device, wherein signals between the host controller and the peripheral device are processed in the local and/or remote expander so as to allow the host controller and peripheral device to be located at distances greater than normally specified in the USB Specification.

Accordingly, the present invention, in its most general form, provides a method for transmitting data between a host controller and a peripheral device over an extended distance; said method comprising:
  a. feeding a first original, outgoing digital signal from a host controller to a local expander unit;
  b. optionally converting said outgoing digital signals into a converted outgoing signal having a format suitable for transmission over extended distances;
  c. transmitting either said outgoing digital signal or said converted outgoing signal, as a outgoing transmission signal, over a signal distribution system;
  d. receiving said outgoing transmission signal at a remote expander unit;
  e. optionally converting said outgoing transmission signal to said first original outgoing digital signal;
  f. delivering said first original outgoing digital signal from said remote expander to at least one peripheral device;
  g. receiving, at said remote expander, a reply digital signal from said peripheral device;
  h. optionally converting said reply digital signal into a converted reply signal having a format suitable for transmission over extended distances;
  i. transmitting said reply digital signal or said converted reply signal as a reply transmission signal over said signal distribution system;
  j. receiving said reply transmission signal at said local expander;
  k. optionally converting said reply transmission signal to said original reply digital signal;
  l. storing said reply digital signal as a stored reply digital signal until the receipt of a subsequent original, outgoing digital signal from said host controller, which subsequent signal is the same as, or similar to, said first original outgoing digital signal; and
  m. forwarding said stored reply digital signal to said host controller in response to said subsequent original outgoing digital signal.

DESCRIPTION OF THE PREFERRED EMBODIMENTS

With respect to an isochronous data stream, and in general, a time relevant data stream, said first or said subsequent original, outgoing digital signal is a request for time-relevant data, and preferably, for an isochronous data stream.

For the purposes of the present specification, the term "time relevant data steam" is meant to relate to data streams such as isochronous data streams wherein loss of a frame from a previous transmission is of minor consequence and therefore, does not need to be retransmitted.

In a preferred embodiment, all digital signals conform to the USB Specification (other than for the distance between devices), and all digital signals, and in particular, the reply digital signal, represent isochronous data.

In step (I), it is stated that the digital signal is stored. This storage period, and any other storage period referred to in the present specification, may be a very short time period. For example, the case where the reply signal is received in time to respond to the original digital signal, the reply signal may be also immediately forwarded with minimal storage time.

In a further preferred embodiment, the present invention provides a method for transmission of isochronous data according to the USB Specification wherein isochronous data is transmitted from a peripheral device and is received by a host controller, said method comprising:
  a. Transmitting a request for isochronous data from a host controller to a local expander;
  b. Forwarding said request for isochronous data from said local expander to a remote expander over a signal distribution system;
  c. Delivering said forwarded request for isochronous data to at least one peripheral device;
  d. Transmitting the requested isochronous data from said peripheral device to said remote expander;

e. Forwarding said requested isochronous data from said remote expander to said local expander over said signal distribution system;

f. Storing said requested isochronous data in a packet buffer at said local expander;

g. Transmitting a subsequent request for isochronous data from said host controller to said local expander;

h. Receiving said subsequent request for isochronous data at said local expander; and, I. Retrieving the stored isochronous data from said local expander;

II. Delivering said stored isochronous data to said host controller;

III. Forwarding said subsequent request for isochronous data from said local expander to said remote expander over said signal distribution system; and IV. Repeating steps (c) through (h) for said subsequent request and any further subsequent requests for isochronous data.

In an even more preferred embodiment, the present invention provides a method additionally comprising the following steps after item "a" described hereinabove, namely:

i. Determining whether said local expander already possesses said requested isochronous data;

ii. Generating a synthetic data packet if no such requested isochronous data is present; and iii. Delivering said synthetic isochronous data to said host controller.

One method for generating the synthetic data packet is described hereinbelow.

The present invention also provides a method for transmission of isochronous data according to the USB Specification wherein isochronous data is transmitted from a host controller and is received by a peripheral device, said method comprising:

a) receiving, at a local expander, an original notification of isochronous a host controller;

b) forwarding said original notification of isochronous data from said local expander to a remote expander over a signal distribution system;

c) receiving, at a remote expander, said forwarded original notification of isochronous data;

d) delivering said forwarded notification of asynchronous data to at least one peripheral device;

e) receiving, at a local expander, an original isochronous data packet from a host controller;

f) forwarding said original isochronous data packet from said local expander to a remote expander over a signal distribution system;

g) receiving, at a remote expander, said forwarded original isochronous data packet; and h) delivering said forwarded original isochronous data packet to at least one peripheral device.

With respect to an asynchronous data stream, and in general, a non-time relevant data stream, the present invention provides a method wherein said first or said subsequent original, outgoing digital signal is a request for time-relevant data, and preferably, for an asynchronous data stream.

For the purposes of the present specification, the term "nontime-relevant data" is meant to relate to data streams such as asynchronous data streams wherein loss of a frame from a previous transmission is not acceptable, and that current, correct transfer of information is required.

In a preferred embodiment, all digital signals conform to the USB Specification (other than for the distance between devices), and all digital signals, and in particular, the reply digital signal, represent asynchronous data.

In a further preferred embodiment, the present invention provides a method for transmission of asynchronous data according to the USB Specification wherein asynchronous data is transmitted from a peripheral device and is received by a host controller, said method comprising:

a) receiving, at a local expander, an original request for asynchronous data from a host controller;

b) forwarding said original request for asynchronous data from said local expander to a remote expander over a signal distribution system;

c) receiving, at a remote expander, said forwarded original request for asynchronous data;

d) delivering said forwarded original request for asynchronous data to at least one peripheral device;

e) receiving, at said remote expander, the requested asynchronous data from said peripheral device;

f) forwarding said requested asynchronous data from said remote expander to said local expander over said signal distribution system;

g) storing, in a packet buffer at said local expander, said requested asynchronous data;

h) receiving, at said local expander, a subsequent request for asynchronous data from said host controller; and i) forwarding said subsequent request for asynchronous data from said local expander to a remote expander over a signal distribution system;

ii) delivering said forwarded subsequent request for asynchronous data to at least one peripheral device;

iii) receiving, at said remote expander, the requested asynchronous data from said peripheral device;

i) additionally receiving, at said local expander, said subsequent request for asynchronous data from said host controller as in step (h); and i) retrieving the stored asynchronous data from said packet buffer;

ii) delivering said retrieved asynchronous data to said host controller;

j) receiving, at said local expander, an outgoing acknowledgement signal from said host controller, k) optionally converting said outgoing acknowledgement signal into a converted acknowledgement signal having a format suitable for transmission over extended distances;

l) transmitting either said outgoing acknowledgement signal or said converted acknowledgement signal, as an acknowledgement transmission signal, over a signal distribution system;

m) receiving, at a remote expander unit, said acknowledgement transmission signal;

n) optionally converting said acknowledgement transmission signal to said outgoing acknowledgement signal; and o) delivering said outgoing acknowledgement signal from said remote expander to at least one peripheral device.

In a preferred feature, the method also provides the following additional steps after step (b) described hereinabove, namely:

i) Determining whether said local expander already possesses said requested asynchronous data;

ii) Generating a negative acknowledgement packet if no such requested asynchronous data is present; and iii) Delivering said negative acknowledgement packet to said host controller.

In an even more preferred embodiment, the present invention also provides a method as described hereinabove with respect to the present invention, wherein said method provides a method for transmission of asynchronous data according to the USB Specification wherein asynchronous data is transmitted from a host controller and is received by a peripheral device, said method comprising:

a) receiving, at a local expander, an original notification of asynchronous data from a host controller, b) forwarding said original notification of asynchronous data from said local expander to a remote expander over a signal distribution system;

c) receiving, at a remote expander, said forwarded original notification of asynchronous data;

d) delivering said forwarded notification of asynchronous data to at least one peripheral device;

e) receiving, at a local expander, an original asynchronous data packet from a host controller;

f) forwarding said original asynchronous data packet from said local expander to a remote expander over a signal distribution system;

g) receiving, at a remote expander, said forwarded original asynchronous data packet;

h) delivering said forwarded original asynchronous data packet to at least one peripheral device;

i) receiving, at said remote expander, an inbound acknowledgement packet from said peripheral device;

j) forwarding said inbound acknowledgement packet from said remote expander to said local expander over said signal distribution system;

k) storing, in a packet buffer at said local expander, said inbound acknowledgement packet;

l) receiving, at said local expander, a subsequent notification of asynchronous data from said host controller;

m) receiving, at said local expander, a subsequent asynchronous data packet from said host controller; and
i) retrieving said stored inbound acknowledgement packet from said packet buffer; and
ii) delivering said retrieved inbound acknowledgement packet to said host controller.

In a further preferment, the method described hereinabove additionally comprises the following steps, namely:

i) Determining whether said local expander already possesses said inbound acknowledgement packet;

ii) Generating a negative acknowledgement packet if no such inbound acknowledgement packet is present; and iii) Delivering said negative acknowledgement packet to said host controller.

In systems wherein a guard time is imposed after a data packet is transmitted (in order to prevent premature transmission of another packet), a preferred embodiment of the present invention also provides a method as described hereinabove additionally comprising the following stages:

a) Receiving, at a remote expander, an outbound data packet, b) Determining, at a remote expander, the transfer type of said outbound data packet, c) Forwarding said outbound data packet from said remote expander to a USB device, d) Setting the value of a transmission guard timer to a value that is that is dependent upon said determined transfer type; and e) Inhibiting further outbound transmissions until said guard timer has expired.

In a preferred embodiment for either a time relevant or non-time relevant data transmission, the extended distance exceeds 5 meters, more preferably, exceeds 30 meters, and still more preferably, equals or exceeds 100 meters. In particular, the distance between the local expander and the remote expander exceeds 5 meters, more preferably, exceeds 30 meters, and still more preferably, equals or exceeds 100 meters.

As with the prior art, the method of the present invention can be used in a systems wherein said host controller is a PC, and said peripheral device is, for example, a camera, a mouse, a keyboard, a monitor or a speaker or speakers.

While a number of different signal distribution systems might be used, preferably, the signal distribution system utilizes unshielded twisted pair (UTP) wiring (or cabling). However, other signal distribution systems such as, for example, coaxial cable, shielded twisted pair, wireless transmission, or fibre optic systems using fibre optic cabling, can also be utilized.

In another aspect, the present invention also provides an apparatus for transmission of a digital signal over an extended distance comprising:

a local expander comprising means for receiving a request for a data signal from a host controller which host controller is connected to said local expander;

means in said local expander for generating an outgoing transmission signal;

means in said local expander for sending said outgoing transmission signal to a remote expander, which signals are sent over a signal distribution system;

a remote expander comprising means for receiving said outgoing transmission signal;

means in said remote expander for generating a digital signal from said outgoing transmission signal;

means in said remote expander for forwarding said digital signal to at least one peripheral device, which peripheral device is connected to said remote expander;

means in said remote expander for receiving inbound digital signals from said peripheral devices;

means in said remote expander for converting said inbound digital signals to an inbound transmission signal;

means in said remote expander for sending said inbound transmission signal to said local expander, which signals are sent over said signal distribution system;

means in said local expander for receiving said inbound transmission signal;

means in said local expander for generating a digital signal from said inbound transmission; and means in said remote expander for forwarding said digital signal to said host controller.

In one embodiment, said data signal is a time relevant data signal, and preferably an isochronous data signal. With respect to time relevant data signals (or streams), preferably, the local expander additionally comprises:

a) means for storing said inbound signal as a stored inbound signal;

b) means for analysing said digital signal from said host controller to recognize a subsequent request for transmission of said time relevant digital signal; and c) means for sending said stored inbound signal to said host controller in response to said subsequent request.

In an alternative embodiment, said data signal is a non-time relevant data signal, and preferably is an asynchronous data signal. Accordingly, with respect to non-time relevant data signals, the present invention also provides an apparatus for transmission of a digital signal over an extended distance comprising:

a) a local expander comprising means for receiving a request for a non-time-relevant data signal, preferably wherein said non-time-relevant data signal is a digital signal which conforms to the USB Specification, from a host controller which host controller is connected to said local expander;

b) means in said local expander for generating an outgoing transmission signal;

c) means in said local expander for sending said outgoing transmission signal to a remote expander, which signals are sent over a signal distribution system;

d) a remote expander comprising means for receiving said outgoing transmission signal;

e) means in said remote expander for generating a digital signal from said outgoing transmission signal;

f) means in said remote expander for forwarding said digital signal to at least one peripheral device, which peripheral device is connected to said remote expander;

g) means in said remote expander for receiving inbound digital signals from said peripheral devices;

h) means in said remote expander for converting said inbound digital signals to an inbound transmission signal;

i) means in said remote expander for sending said inbound transmission signal to said local expander, which signals are sent over said signal distribution system;

j) means in said local expander for receiving said inbound transmission signal;

k) means in said local expander for generating a digital signal from said inbound transmission; and l) means in said remote expander for forwarding said digital signal to said host controller.

Preferably, said non-time-relevant signal represents asynchronous data.

In a preferred embodiment, the present invention also provides an apparatus wherein said local expander additionally comprises:

a) means for storing said inbound signal as a stored inbound signal;

b) means for analysing said digital signal from said host controller to recognize a subsequent request for transmission of said non time-relevant digital signal; and c) means for sending said stored inbound signal to said host controller in response to said subsequent request.

Although a number of signal distribution systems may be used, as described hereinabove, preferably the signals are transmitted over a signal distribution system which utilizes Unshielded Twisted Pair (UTP) copper wire. Using this method of device connection provides a low cost, effective means for data-transmission. However, in another embodiment of the system, signals can be transmitted over coaxial cable, shielded cable, wireless transmission methods, or over a fibre optic distribution system.

While the methods and apparatus of the present invention have general utility in a variety of applications, it is of primary importance that the data transmission methods and apparatus of the present invention allow for compliance with the USB Specifications (with the exception of the distance requirements). Preferably, the original signal from the host controller is a request for data from a peripheral device. Additionally, preferably the data requested is from peripheral devices such as cameras, keyboards, mice, monitors, speakers, and the like.

For time relevant data streams, and in particular, during operations utilizing the methods and apparatus of the present invention in applications involving extended range transmissions, it is preferred that the apparatus be preferably capable of recognizing isochronous transfers, when they are received. The data contained within the isochronous transfer is then stored within the system for a period of time. Accordingly, the data that is received during a particular frame may be stored and then transmitted in a following frame. Additionally, a further preferred embodiment of the present invention is that isochronous transfers originating from a plurality of sources may be stored, and retransmitted.

In the operation of a preferred embodiment of the current invention, a host controller (which preferably is a PC) may issue a request to a device for the transfer of isochronous data. The request is received by the apparatus of the present invention, and retransmitted to the target device. When the requested isochronous transfer response is received by the apparatus from the target device, the isochronous data is stored within the internal memory of the apparatus. During a subsequent frame, the host controller will again issue a request to the target device for the transfer of isochronous data. The apparatus will again retransmit this request to the target device. In addition, however, the apparatus recognizes that it currently has isochronous data from the target device stored in its internal memory. The apparatus sends this data to the host controller within the 16 bit-time margin relevant to the current request within the current frame. In this manner, the apparatus uses data collected in a previous frame to satisfy the response time requirement of a current frame.

When a packet is received from the target device, and no further request for data is received from the host controller, the last data packet or packets received and stored (hereinafter the "vestigial" packets) are preferably removed from the system so that they are not transmitted when and if a further request is received from the host controller. Preferably, this is achieved by modification of the method described hereinabove by additionally comprising the following stages, namely:

i) Detecting when a new frame has begun;

ii) Examining the properties of each packet buffer;

iii) Determining whether the data packet contained in said examined packet buffer has been stored for at least one complete frame period;

iv) Discarding said contained data packet if said contained data packet has been stored for at least one complete frame period; and v) Repeating steps (i) through (iv) for each packet buffer in the system.

In an alternative embodiment of the invention, the apparatus handles the first request for the inbound transfer of isochronous data in a unique manner. This unique manner requires the apparatus to generate its own synthetic inbound data packet, and generation of this synthetic data packet is described hereinbelow.

It is possible that packets sent from the Remote Expander may not arrive at the Local Expander in the order expected by the Local Expander. In order to avoid difficulties which might be caused by this occurrence, the method of the present invention also preferably comprises the following stages, namely:

i) Storing the address of the requested peripheral device at said remote expander unit after the local expander has delivered the forwarded request for isochronous data; and further comprising the following steps after transmitting the requested isochronous data from the peripheral device to the remote expander, namely:

i) Retrieving the address of said requested peripheral device at said remote expander unit; and ii) Adding said retrieved address to said requested isochrbnous data.

With respect to non-time relevant data streams, and in particular, asynchronous data signals, streams or transfers, it is preferred, during practise of the method, or during use of the apparatus of the present invention, that the apparatus be preferably capable of recognizing asynchronous transfers, when they are received. The data contained within the asynchronous transfer is then stored-within the system for a period of time. Accordingly, the data that is received during a particular time period may be stored and then transmitted in a following time period. Additionally, a further preferred embodiment of the present invention is that asynchronous transfers originating from a plurality of sources may be stored, and retransmitted.

In the operation of a preferred embodiment of the current invention with respect to a non-time relevant data stream, and an asynchronous data stream in particular, a host controller (which preferably is a PC) may issue a request to a device for the transfer of asynchronous data. The request is received by the apparatus of the present invention, and retransmitted to the target device. When the requested asynchronous transfer response is received by the apparatus from the target device, the asynchronous data is stored within the internal memory of the apparatus. During a subsequent time period, the host controller will again issue a request to the target device for the transfer of asynchronous data. The apparatus will again retransmit this request to the target device. In addition, however, the apparatus recognizes that it currently has asynchronous data from the target device stored in its internal memory. The apparatus sends this data to the host controller within the 16 bit-time margin relevant to the current request within the current time period. In this manner, the apparatus uses data collected in a previous time period to satisfy the response time requirement of a current time period.

The term "time period" can be used to apply to a selected time period of interest (which can include a portion of a frame, a plurality of frames, or the like), but most preferably is a single "frame" as defined in the USB Specification.

The "host controller" is preferably a PC, as has been previously stated. However, the host controller may also be part of a computer system, and in particular, part of a networked computer system.

By utilizing the method and apparatus of the present invention, it is possible to have transfer of time relevant data or non-time relevant data, and isochronous data or asynchronous data in particular, over extended distances, and in particular, over distances greater than specified in the USB Specification.

However, other features of the present invention, as well as other objects and advantages attendant thereto, are set forth in the following description and the accompanying drawings in which like reference numerals depict like elements.

BRIEF DESCRIPTION OF THE DRAWINGS

The invention, and various aspects thereof, will be described by reference to the attached drawings wherein:

In the drawings, FIG. 1 shows a PC (1) equipped with two conventional USB Hubs (2a & 2b), and four standard USB Devices (3a, 3b, 3c & 3d). The length of cable between the two hubs (2a and 2b) cannot exceed 5 meters according to the current USB Specification.

FIG. 2 shows a PC (1) equipped with an apparatus according to the present invention, which is termed as an "Extended Range Hub" (7), and four standard USB Devices (3a, 3b, 3c & 3d). The Extended Range Hub is composed of two separate units, a "Local Expander" (4) and a "Remote Expander" (5) connected by cable (6). In one embodiment of the invention, units 4 and 5 can be separated by, for example, up to 200 meters of Category 5 UTP cable (6) (although fibre optic cabling could also be used).

FIG. 3 illustrates an embodiment of the invention designed to operate over UTP. In this embodiment, the functions normally provided by a USB Hub are provided by two separate units connected by a length of Unshielded Twisted Pair (UTP) copper wiring (6a). A Host PC may be connected to the first unit (4), referred to as Local Expander (LEX). The second unit (5) is referred to herein as Remote Expander (REX). REX (5) may be connected to a plurality of USB devices. In this embodiment said plurality is chosen to be four, but it will be clear to those skilled in the art that other choices may be made within the scope of the invention.

Operation over extended distances is preferably achieved by placing said LEX Unit (4) close to said host PC, placing said REX unit (5) close to said plurality of USB devices, and connecting LEX unit (4) and REX unit (5) by the required extended length of UTP cabling (6a).

Figure 4:
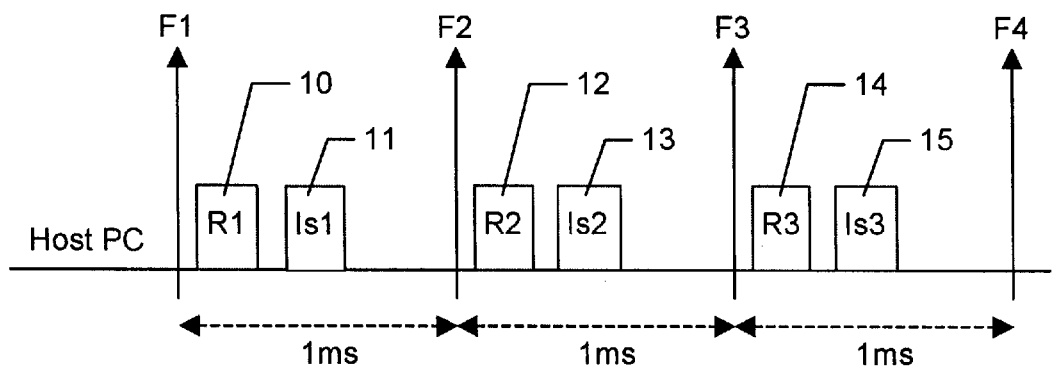
FIG. 4 is a timing diagram showing isochronous transfers according to the USB protocol.

FIG. 4 provides a timing diagram showing isochronous transfers according to the USB protocol. The diagram is constructed from the point of view of a USB Host Controller, normally included on a PC motherboard (Host PC). The USB protocol divides time allocation on the shared bus into "regular frames", each of 1 ms in duration. The start of each frame is identified on the diagram as F1, F2, F3 & F4. When a Host Controller is engaged upon an isochronous transfer with a device, the Host Controller issues regular requests for data transfer to said device. These requests are identified in FIG. 4 as packets R1, R2 & R3 (10, 12 & 14). Under the USB protocol, a USB device must respond to said request within 16 bit-times. The responses are shown in the diagram as packets Is1, Is2 & Is3 (11, 13 & 15). It is commonly expected that transfer Is1 (11) will be delivered in response to request R1 (10), transfer Is2 (13) will be delivered in response to request R2 (12), and so on until the requests are terminated.

Figure 5:
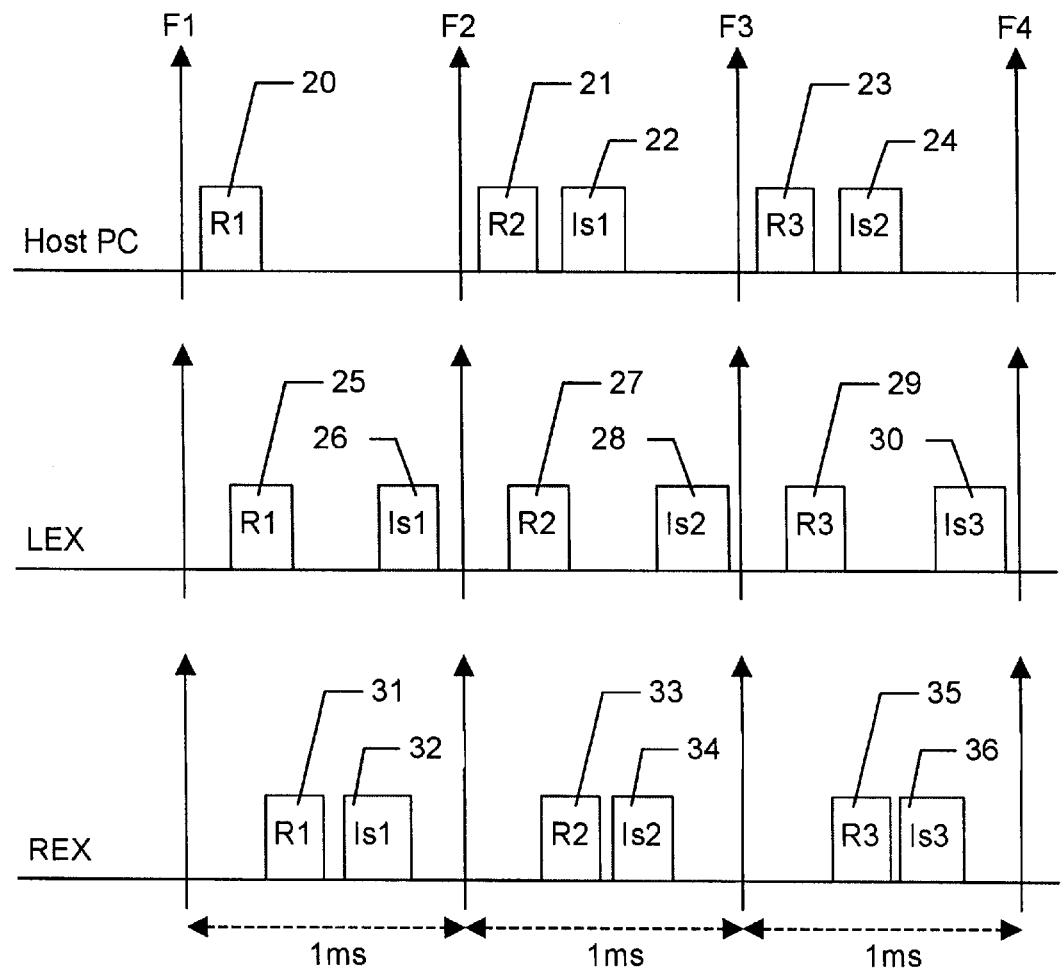
FIG. 5 is a timing diagram showing isochronous transfers according to the current invention.

FIG. 5 provides a timing diagram showing isochronous transfers according to the present invention. The diagram shows the progression of packets through the various subsystems comprising the invention. Timelines are presented for the Host PC (1), Local Expander (LE)Q (4) and Remote Expander (REX) (5) corhponents which were shown in FIG. 2.

An isochronous transfer is initiated from a Host PC (1) by emitting a request for input data R1 (20) to a particular USB address and end-point. Said request R1 (20) is received by the LEX (4) and retransmitted as R1 (25) over the external cabling to the REX (5). Said retransmitted packet R1 (25) is received by the REX (5) and forwarded as R1 (31) to the target device (e.g. one of items 3a, 3b, 3c or 3d of FIG. 2).

The target device generates an input data packet Is1 (32). According to the USB protocol, a device without an integrated cable must generate a response within 6.5 bit-times of the end of the corresponding request. Said input data packet Is1 (32) is received by the REX subsystem (5) and retransmitted as Is1 (26), over the external wiring, to the LEX (4). Said retransmitted response Is1 (26) is not immediately forwarded to the Host PC (1), but is stored within the memory of the LEX subsystem (4).

The Host PC (1) notices that it did not receive a response to its input data request R1 (20), and retries the transaction by generating a new request R2 (21) to the same USB address and end-point. Upon receiving request R2 (21), the LEX subsystem 4 retrieves response Is1 (26) from its memory buffers and forwards it to the Host PC as response Is1 (22). Said second request R2 (21) is repeated as R2 (27) through the LEX and forwarded as R2 (33) to the device. The target device generates a second response Is2 (34) which is retransmitted as Is2 (28) by the REX to the LEX. Response Is2 (28) is again stored within the memory of the LEX subsystem, from where it is sent to the host PC (1) as response Is2 (24) to a third request R3 (23). The process is repeated as necessary with requests R3 (23), R3 (29) and R3 (35) and responses Is3 (36) and Is3 (30).

Figure 6:
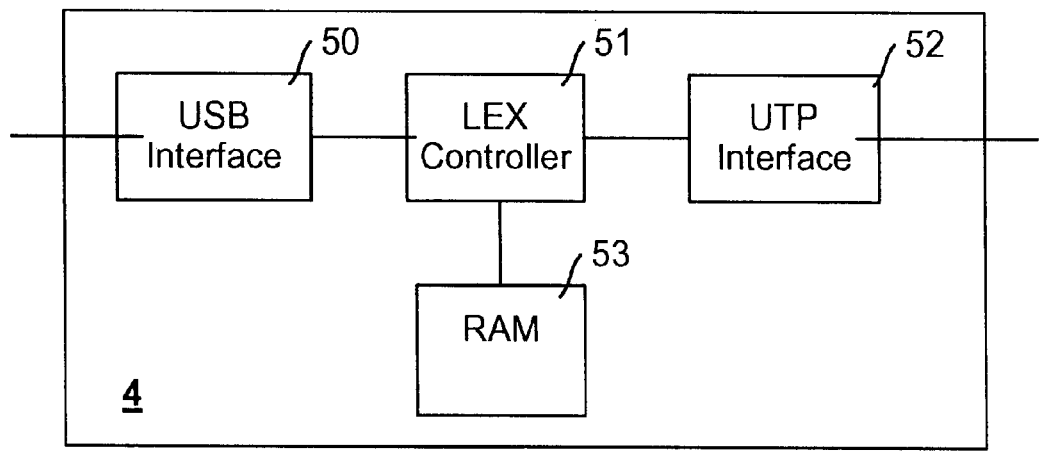
FIG. 6 is a schematic drawing of one embodiment of a Local Expander according to the invention.

FIG. 6 illustrates one embodiment of a Local Expander (LE)9 (4) according to the invention. Said embodiment comprises four major blocks. The USB Interface (50) enables a Host PC to be connected to the unit using standard USB cabling. Said USB Interface (50) receives signals in USB format from said Host PC and delivers USB packets to a LEX Controller (51). Said LEX Controller (51) determines what response is necessary to the received packet and generates the appropriate USB packets. If said LEX Controller (51) requires information to be stored prior to transmission, then said information is stored in RAM (53).

Information that must be sent to the Remote Expander (REX) (5) is forwarded to the UTP interface (52) wherein the information is converted into digital signals suitable for propagation over copper cabling.

In the reverse direction, digital signals originating from the Remote Expander (5) are received by UTP interface (52) and forwarded to LEX Controller (51). Said LEX Controller (51) saves any necessary information in RAM (53) and generates the required responses. Information that must be sent to the Host PC is transferred to the USB Interface (50), from where it may be forwarded to said Host PC using standard USB hardware and protocols.

Figure 7:
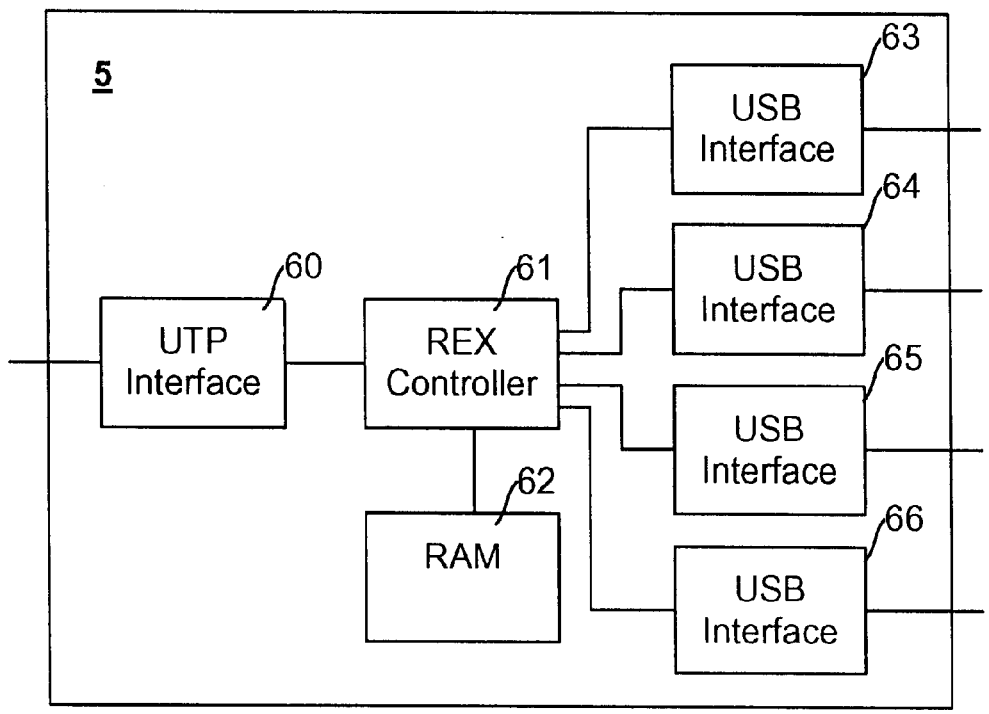
FIG. 7 is a schematic drawing of one embodiment of a Remote Expander according to the invention.

FIG. 7 illustrates an embodiment of a Remote Expander (REX) (5) according to the invention. Said embodiment comprises a UTP Interface (60), a plurality of USB Interfaces (63, 64, 65 and 66), a REX Controller (61) and a RAM (62). Operation of the REX (5) is similar to that of the LEX (4).

Figure 8:
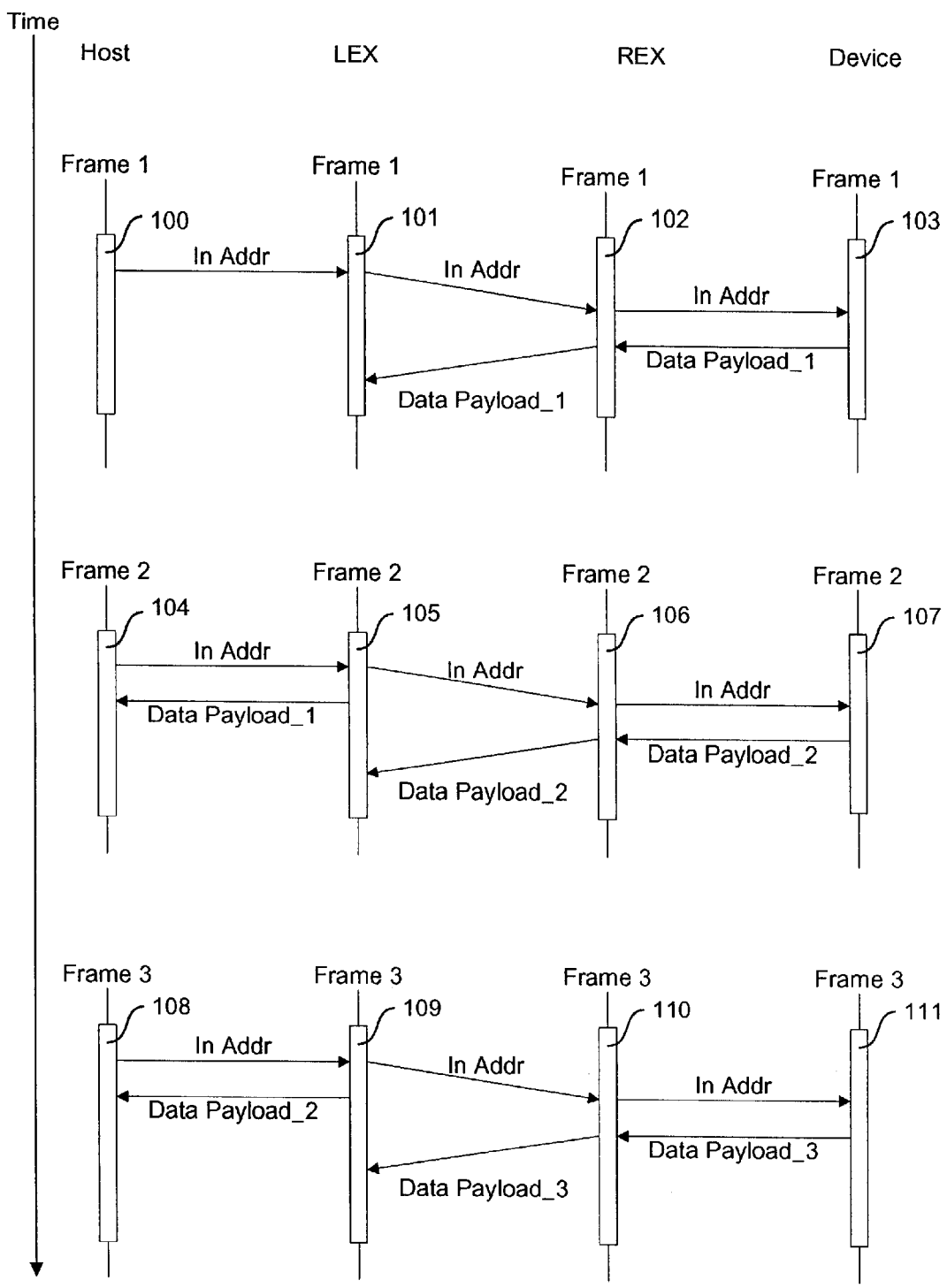
FIG. 8 is a sequence diagram showing an isochronous input transfer according to the invention.

FIG. 8 provides a sequence diagram showing an isochronous input transfer according to the invention. The format used in the diagram is attributable to Jacobson et al. (Ivar Jacobson, Magnus Christerson, Patrick Jonsson and Gunnar Overgaard, Object-Oriented Software Engineering: A Use Case Driven Approach, Addison-Wesley, 1992).

In Frame 1, the control logic (100) within the Host PC generates a request for input data, addressed to a particular USB function. Said request is transmitted to the LEX subsystem as an "In Addr" packet. The control logic (101)

within the LEX subsystem forwards the In Addr packet to the REX subsystem. The control logic (102) within the REX subsystem forwards the In Addr packet to the Device.

The control logic (103) within the device assembles the requested isochronous data and transmits it as a "Data Payload" packet to the REX subsystem. The control logic (102) within the REX subsystem forwards the Data Payload packet to the LEX subsystem. The control logic (101) in the LEX subsystem stores the Data Payload packet in its buffer memory.

In Frame 2, the control logic (104) within the Host PC recognizes that it has not received a response to its previous request for input data. Said control logic automatically retries the transaction by generating a further request addressed to the same USB function as in Frame 1. Said further request is transmitted to the LEX subsystem as a second In Addr packet. On receipt of the second In Addr packet, the control logic (105) within the LEX subsystem recognizes that it has a Data Payload packet stored in memory from the same function identified by the further In Addr packet. Said control logic (105) retrieves said stored packet from memory and transmits same to the Host PC. Said control logic (105) also forwards the new In Addr packet to the REX subsystem. The control logic (106) within the REX subsystem forwards the In Addr packet to the Device.

The control logic (107) within the device assembles the requested isochronous data and transmits it as a Data Payload packet to the REX subsystem. The control logic (106) within the REX subsystem forwards the Data Payload packet to the LEX subsystem. The control logic (105) in the LEX subsystem stores the Data Payload packet in its buffer memory.

The above-described process is repeated for subsequent frames by the distributed control logic (e.g. 108, 109, 110 & 111).

Figure 9:
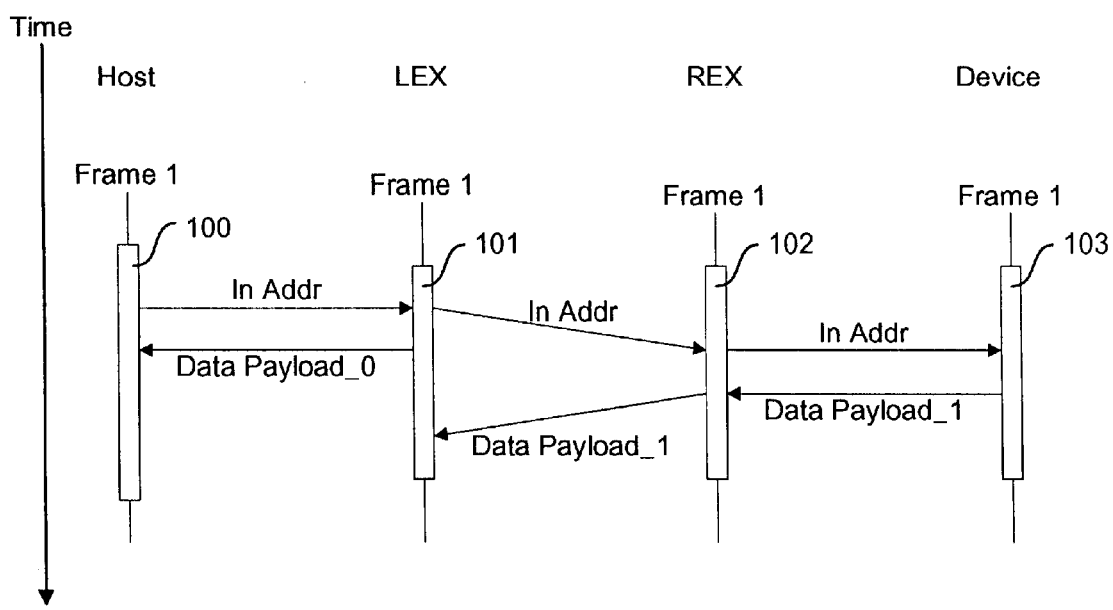
FIG. 9 is an alternative isochronous input transfer according to the invention.

FIG. 9 provides a sequence diagram showing an alternative isochronous input transfer according to the invention. This method differs from that described in FIG. 8 in the manner in which the first request for an isochronous input transfer is handled.

In Frame 1, the control logic (100) within the Host PC generates a request for input data, addressed to a particular USB function. Said request is transmitted to the LEX subsystem as an In Addr packet. The control logic (101) within the LEX subsystem forwards the In Addr packet to the REX subsystem as in FIG. 9.

At this point in the sequence, an additional step is introduced. Said control logic (101) within the LEX subsystem generates a synthetic data packet and transmits it as a Data Payload packet to the Host PC. Said synthetic data packet is labelled Data Payload_0 in FIG. 9. The remainder of the protocol handling continues as described in FIG. 8.

The USB specification defines a DATA packet as being composed of a single byte Packet Identifier (PID), a Data Payload ranging in size from 0 bytes to 1023 bytes, and a Cyclic Redundancy Check of 2 bytes. Said synthetic data packet can therefore be constructed by assembling a data packet containing a zero length payload. Said synthetic data packet can thereby be used to satisfy the timing requirements of the USB protocol while causing no disturbance to the actual information being carried by the protocol.

Figure 10:
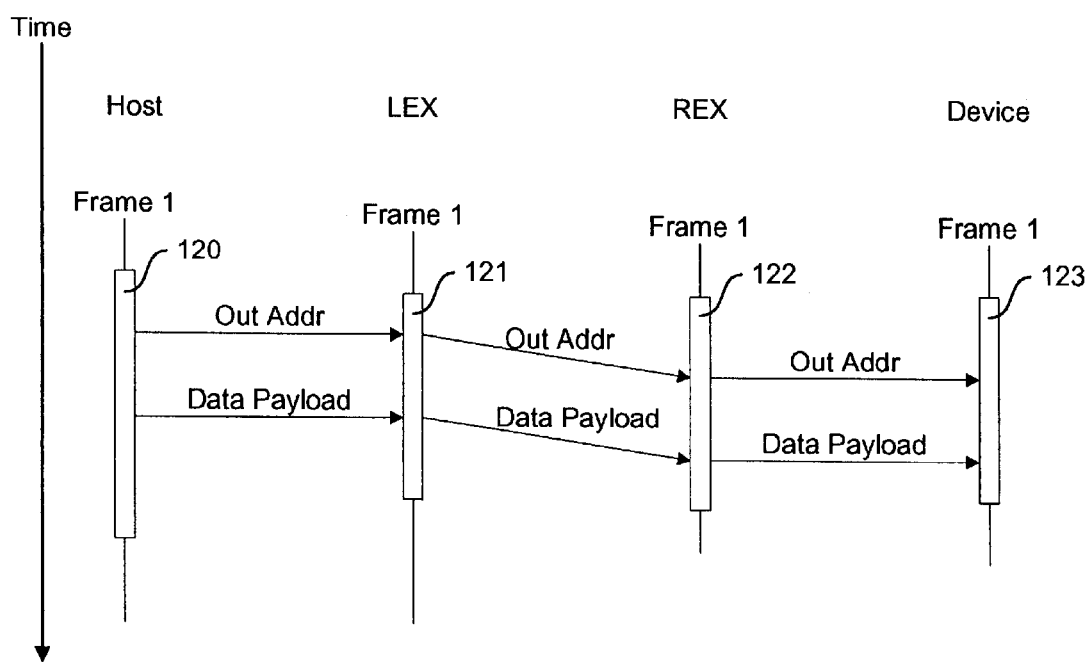
FIG. 10 is a sequence diagram showing an isochronous output transfer according to the invention.

FIG. 10 provides a sequence diagram showing an isochronous output transfer according to the invention.

In Frame 1, the control logic (120) within the Host PC generates a notification of output data, addressed to a particular USB function. Said notification is transmitted to the LEX subsystem as an Out Addr packet. The control logic (121) within the LEX subsystem forwards said Out Addr packet to the REX subsystem. The control logic (122) within the REX subsystem forwards said Out Addr packet to the Device. The information is received by the control logic (123) within the device.

The control logic (120) within the Host PC assembles the notified isochronous data and transmits it as a Data Payload packet to the LEX subsystem. The control logic (121) within the LEX subsystem forwards the Data Payload packet to the REX subsystem. The control logic (122) in the LEX subsystem further forwards the Data Payload packet to the device. The information is received by the control logic (123) within the device.

Figure 11:
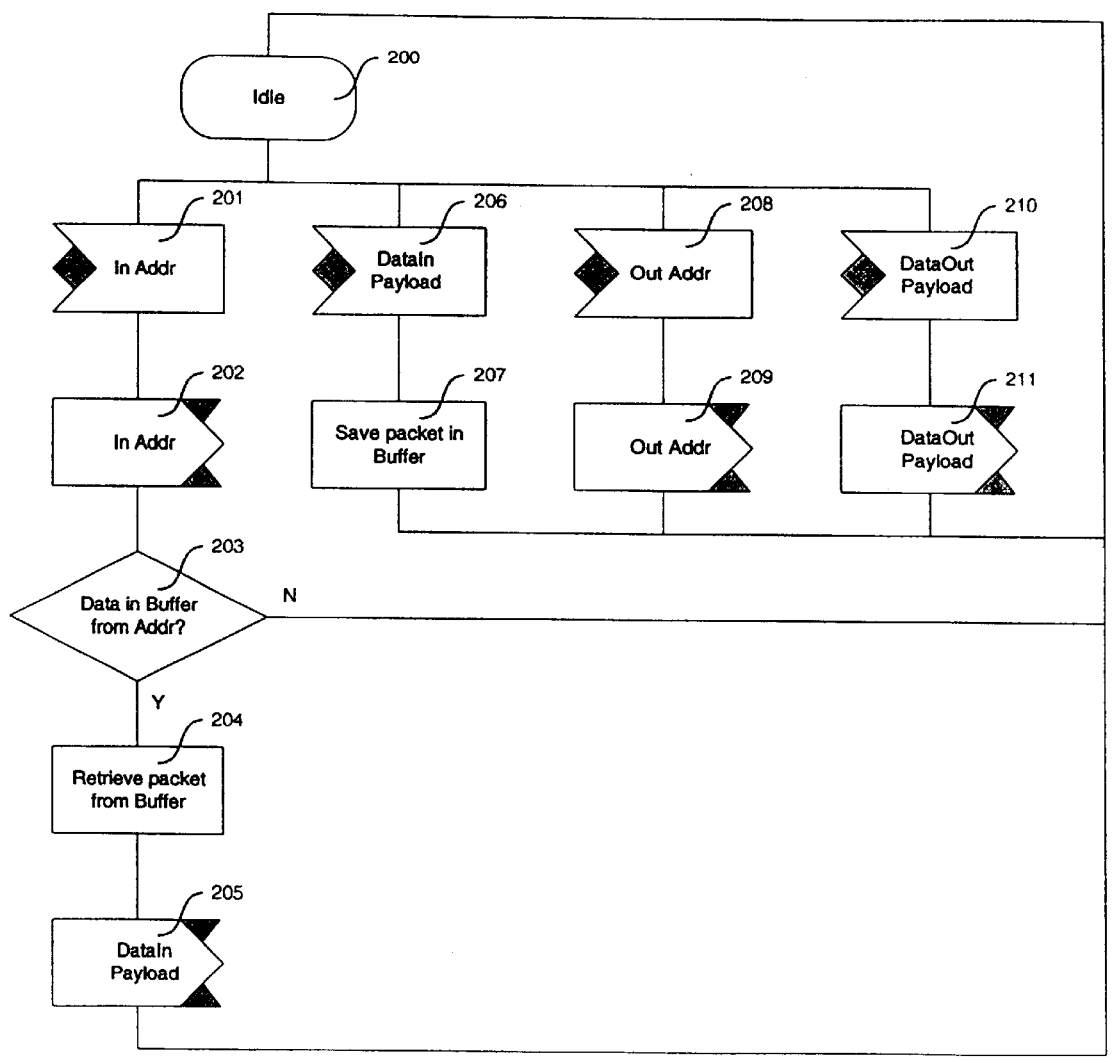
FIG. 11 is a logic diagram of a LEX controller according to the invention.

FIG. 11 provides an algorithm for implementing isochronous transfers at the Local Expander (4). In the embodiment of the invention described in FIG. 6, said algorithm is implemented in hardware by LEX Controller (51). (It will be apparent to those skilled in the art hat this implementation is not unique and that other mechanisms for implementing said lgorithm are possible.) In the following description, the inbound direction refers to packets travelling from a peripheral device and towards a host controller, the outbound direction refers to packets travelling from a host controller and towards a peripheral device.

According to the invention, the algorithm of FIG. 11 is required to implement the processing functions represented by processing blocks of FIG. 8 (101, 105 & 109), and the processing block (121) of FIG. 10.

On initial power-up and after a reset, the system enters Idle state (200) where it waits for a message (USB packet) to be received. When a packet is received, the Packet Identifier (PID) field within the packet is examined to determine what type of packet has been received and what action is required to process said packet.

If the received packet (201) is of type IN, then an identical packet (202) is transmitted. The system then examines (203) its buffer memory to determine whether a stored DATA packet from the device addressed by the IN request is already present in memory. If no such stored DATA packet is present in memory, the system then returns to the idle state (200). If said stored DATA packet is present in memory, the system retrieves (204) said stored packet from memory and sends (205) said packet to the host as a packet of type DATA. It then returns to the Idle state (200).

If the received packet (206) is of type DATA and is travelling in the inbound direction, the system saves (207) said data packet in its buffer memory. The system then returns to the Idle state (200).

If the received packet (208) is of type OUT Addr, the system retransmits the packet (209) packet and returns to the Idle state (200).

If the received packet (210) is of type DATA and is travelling in the outbound direction, the system retransmits packet (211) and returns to the Idle state (200).

Figure 12:
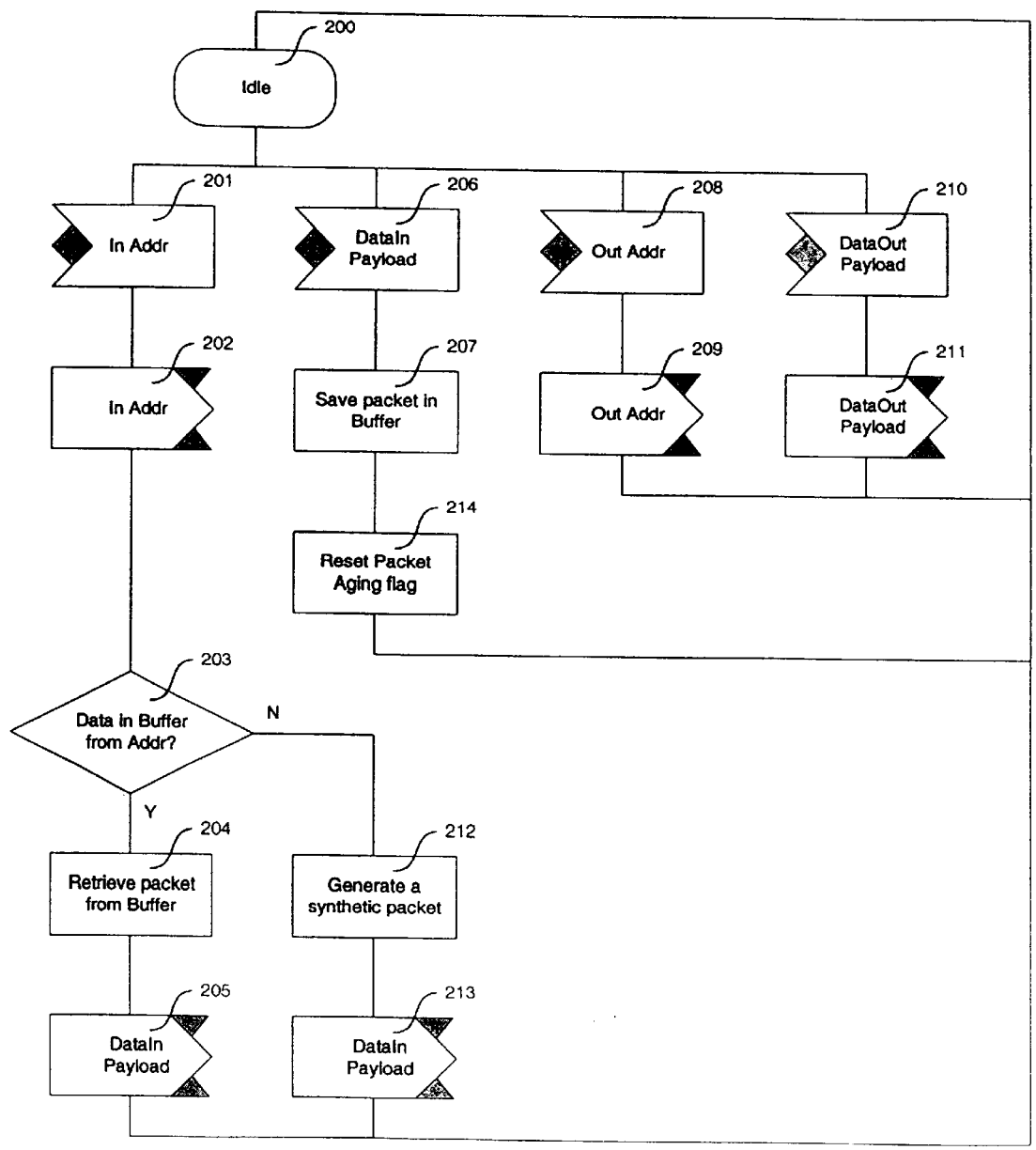
FIG. 12 is a logic diagram of an enhanced LEX controller according to the invention.

FIG. 12 provides an enhanced algorithm for implementing isochronous transfers at the Local Expander according to the invention described in FIG. 9. This algorithm is essentially identical to that described in FIG. 11, other than in the way in which it handles the situation wherein the Host issues a request for data and the LEX does not yet possess said data to return to the host. This situation may occur on the first request of an isochronous input session.

In FIG. 12, if the received packet (201) is of type IN, then an identical packet (202) is transmitted. The system then examines (203) its buffer memory to determine whether a stored DATA packet from the device addressed by the IN request is already present in memory. If no such stored DATA packet is present in memory, the system generates (212) a synthetic DATA packet and transmits (213) said generated packet to the host within the 16 bit-times permitted by the USB protocol. If said stored DATA packet is present in memory, the system retrieves (204) said stored packet from memory and sends (205) said packet to the host as a packet of type DATA. It then returns to the Idle state (200).

If the received packet (206) is of type DATA and is travelling in the inbound direction, the system saves (207) said data packet in its buffer memory. The Packet Aging Flag associated with the newly saved packet is reset (214) for reasons that will be described in the context of FIG. 13. The system then returns to the Idle state (200).

Figure 13:
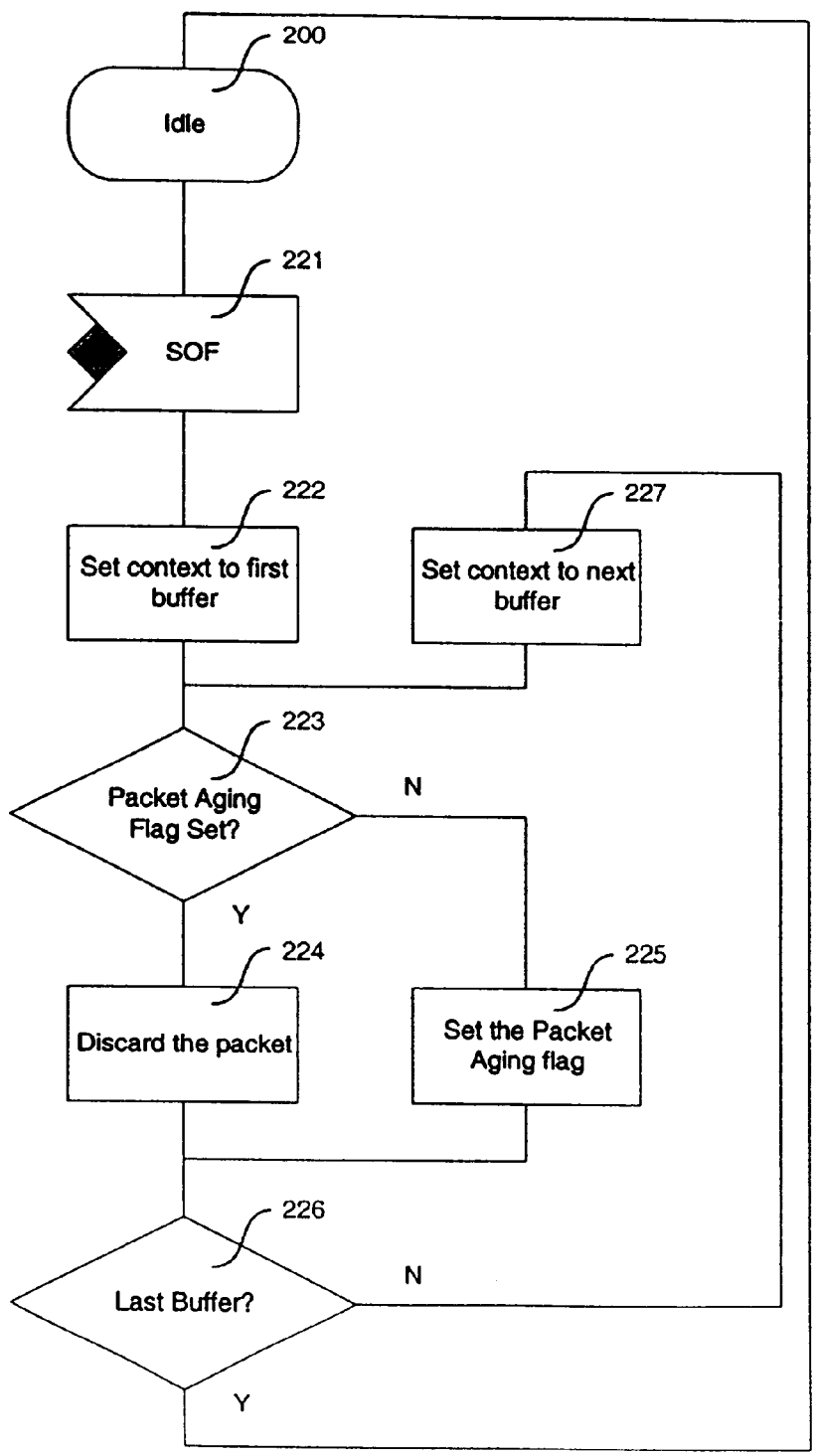
FIG. 13 is a logic diagram of a further enhancement to the LEX Controller enabling vestigial packets to be removed.

FIG. 13 is a logic diagram of a further enhancement to the LEX Controller enabling vestigial packets to be removed. Said vestigial packets can occur during Isochronous Input transfers when the Host PC decides to terminate a session but the LEX Controller already possesses an inbound data packet belonging to said session. This situation is illustrated, for example, in FIG. 8 by packet Data Payload_3.

Under the USB Specification, the start of every frame is marked by a unique Start Of Frame (SOF) signal. The embodiment described in FIG. 13 uses this SOF signal to identify and discard packets that are no longer required. Processing commences when SOF signal (221) is received by the Local Expander. A search of local buffer memory is commenced by setting the context to the first buffer (222). The Packet Aging Flag of the packet pointed to by the current context is examined (223). If the Packet Aging Flag is already set, then the packet in the buffer is discarded (224). If the Packet Aging Flag is not set, then the Packet Aging Flag is set (225) to ensure that the packet will be discarded in the next frame if it has not been transmitted by then.

The aforesaid process is then repeated by setting the context to the next buffer (227) and continuing until all buffers have been checked, as detected by test (226).

Note that as an additional precaution to prevent the premature discarding of vestigial packets, the packet Aging Flag is also reset by step (214) of FIG. 12 whenever a data packet is stored in the buffer memory of the LEX Controller.

Figure 14:
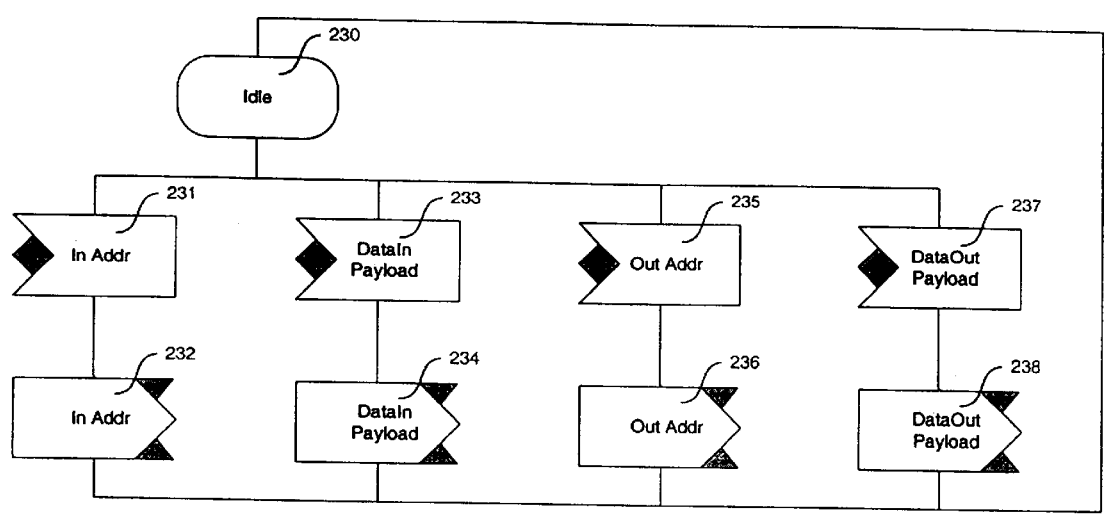
FIG. 14 is a logic diagram of a REX controller according to the invention.

FIG. 14 provides an algorithm for implementing isochronous transfers at the Remote Expander. In the embodiment of the invention described in FIG. 7, said algorithm is implemented in hardware by REX Controller (61). (It will be apparent to those skilled in the art that this implementation is not unique and that other mechanisms for implementing said algorithm are possible.) In the following description, the inbound direction refers to packets travelling from a peripheral device and towards a host controller; the outbound direction refers to packets travelling from a host controller and towards a peripheral device.

According to the invention, the algorithm of FIG. 14 is required to implement the processing functions represented by the processing blocks (1102), (106) & (110) of FIG. 8, and the processing block (122) of FIG. 10.

On initial power-up and after a reset, the system enters Idle state (230) where it waits for a message (USB packet) to be received. When a packet is received, the Packet Identifier (PID) field within the packet is examined to determine what type of packet has been received and what action is required to process said packet.

If the received packet (231) is of type IN, the system retransmits (232) said IN packet and returns to the Idle state (230).

If the received packet (233) is of type DATA and is travelling in the inbound direction, the system retransmits (234) said data packet and returns to the Idle state (230).

If the received packet (235) is of type OUT, the system retransmits (236) said out packet and returns to the Idle state (230).

If the received packet (237) is of type DATA and is travelling in the outbound direction, the system retransmits (238) said data packet and returns to the Idle state (230).

Figure 15:
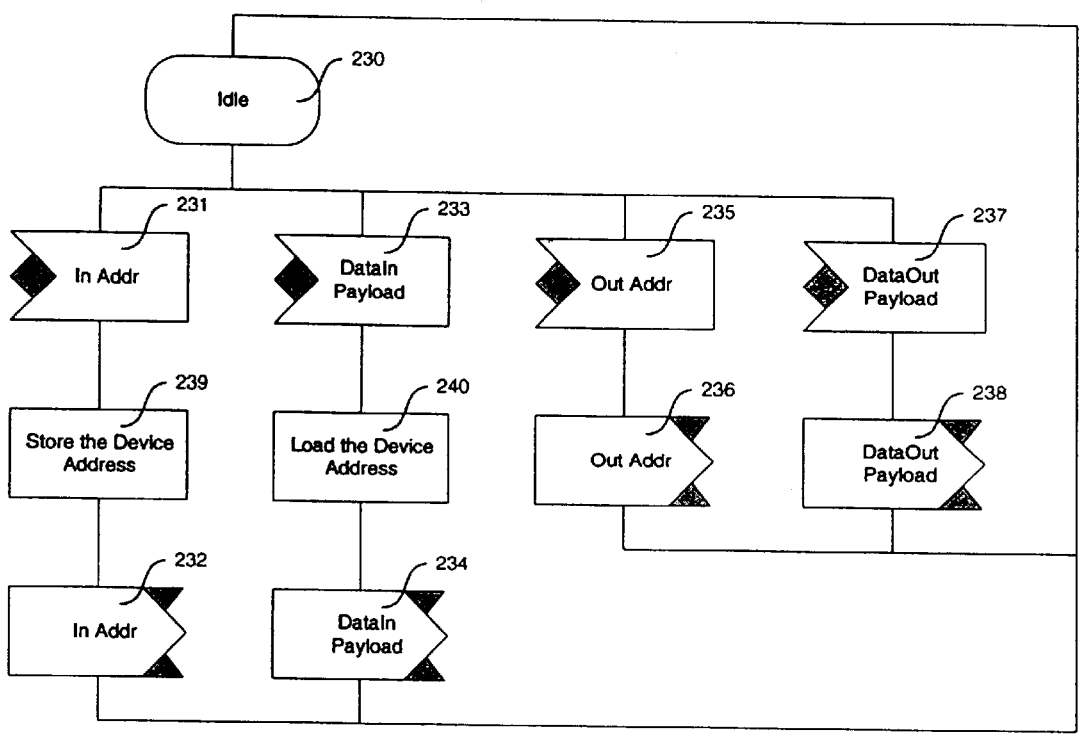
FIG. 15 is a logic diagram of an enhanced REX controller according to the invention.

FIG. 15 provides an enhanced algorithm for implementing isochronous transfers at the Remote Expander. Under certain conditions, there is a risk that packets sent from the Remote Expander and arriving at the Local Expander may not be in the order expected by the Local Expander. The enhancement described in FIG. 15 adds an Address field to packets sent in the inbound direction so that the Local Expander can be certain of the origin of said packets.

According to the enhancement, when an IN packet is received (231) by the REX Controller, the Address it contains is stored in memory (239). The IN packet is then retransmitted as before (232) and the system returns to the Idle state (230). When the system receives the next DATA packet travelling in the inbound direction (233), the system retrieves the Address stored in memory (240) and includes this information with the DATA packet that it retransmits (234) to the LEX. The system returns to the Idle state (230).

Figure 16:
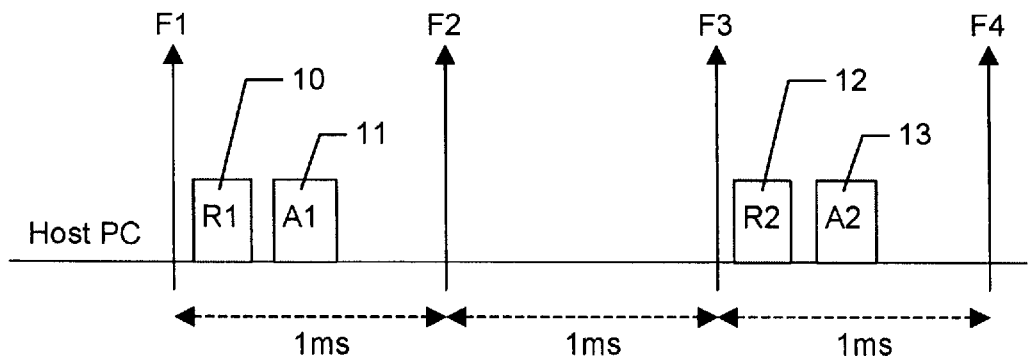
FIG. 16 is a timing diagram showing asynchronous transfers according to the USB protocol.

FIG. 16 provides a timing diagram showing asynchronous transfers according to the USB protocol. The diagram is constructed from the point of view of a USB Host Controller, normally included on a PC motherboard (Host PC). The USB protocol divides time allocation on the shared bus into regular Frames, each of 1 ms in duration. The start of each frame is again identified on the diagram as F1, F2, F3 & F4.

When a Host Controller is engaged upon an asynchronous transfer with a device, the Host Controller issues requests for data transfer to said device on an as needed basis. These requests are identified in FIG. 4 as packets R1 & R2 (10 & 12). Under the USB protocol, a USB device must respond to said request within 16 bit-times. The responses are shown in the diagram as packets A1 & A2 (11 & 13). It is commonly expected that transfer A1 (11) will be delivered in response to request R1 (10), transfer A2 (13) will be delivered in response to request R2 (12), and so on until the requests are terminated.

Figure 1:
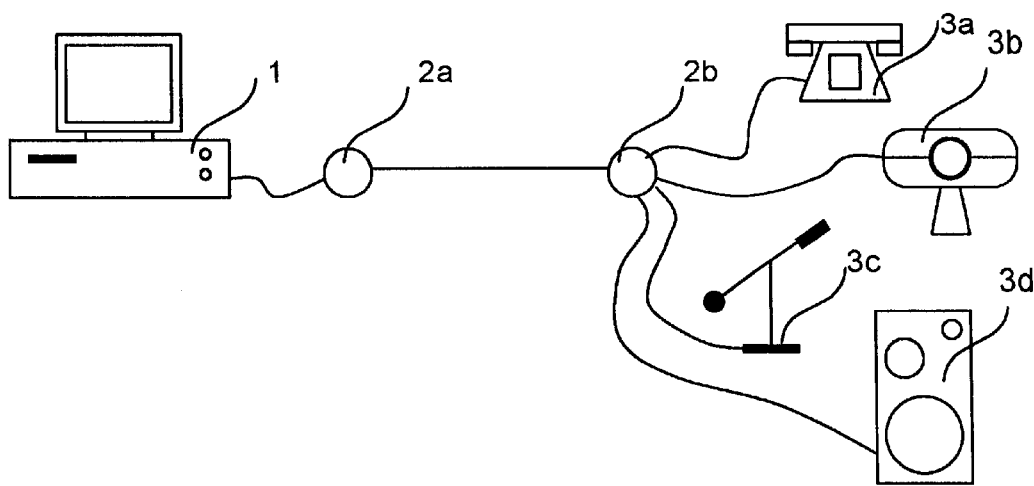
FIG. 1 is a PC equipped with conventional USB Hub and USB Devices.
Figure 2:
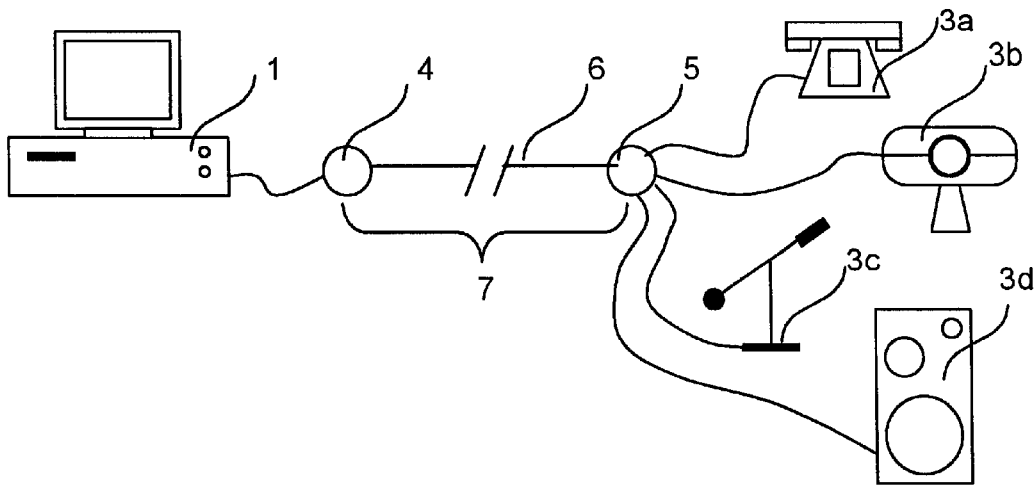
FIG. 2 is a PC equipped with Extended Range Hub and USB Devices according to the present invention.
Figure 3:
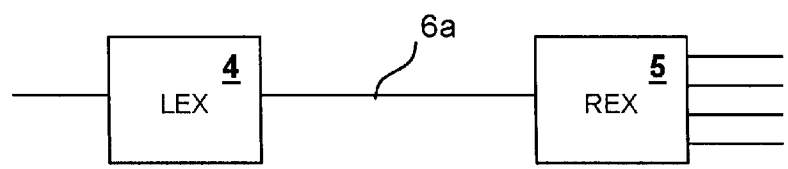
FIG. 3 is a schematic drawing of an embodiment of the invention designed to operate using UTP wiring as a signal distribution system.
Figure 17:
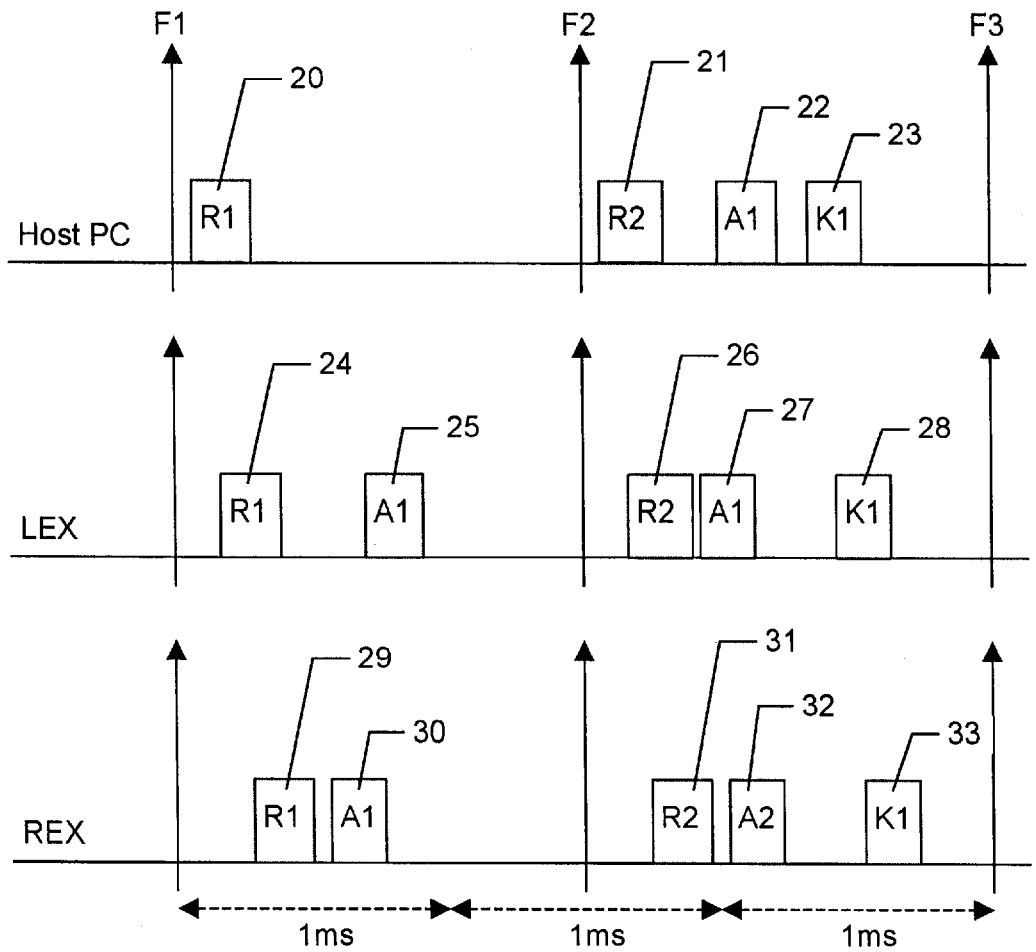
FIG. 17 is a timing diagram showing asynchronous transfers according to the current invention.

FIG. 17 provides a timing diagram'showing asynchronous transfers according to the present invention. The diagram shows the progression of packets through the various subsystems comprising the invention. Timelines are presented for the Host PC (1), Local Expander (4) and Remote Expander (5) subsystems as shown in FIG. 2.

An asynchronous transfer is initiated from a Host PC (1) by emitting a request for input data R1 (20A) to a particular USB address and end-point. Said request R1 (20A) is received by the LEX (4) and retransmitted as R1 (24A) over the external cabling to the REX (5). Said retransmitted packet R1 (24A) is received by the REX (5) and forwarded as R1 (29A) to the target device (i.e. one of items 3a, 3b, 3c or 3d).

The target device generates an input data packet A1 (30A). According to the USB protocol, a device without an integrated cable must generate a response within 6.5 bit-times of the end of the corresponding request. Said input data packet A1 (30A) is received by the REX subsystem (5) and retransmitted as A1 (25A) over the external wiring to the LEX (4). Said retransmitted response A1 (25A) is not immediately forwarded to the Host PC (1), but is stored within the memory of the LEX subsystem (4).

The Host PC (1) notices that it did not receive a response to its input data request R1 (20A), and retries the transaction by generating a new request R2 (21 A) to the same USB address and end-point. Upon receiving request R2 (26A), the LEX subsystem (4) retrieves response A1 (25A) from its memory buffers and forwards it to the Host PC as response A1 (27A). Said response (27A) is received by the Host as response A1 (22A).

Said second request R2 (21A) is repeated as R2 (26A) through the LEX and forwarded as R2 (31A) to the device. The target device generates a second response A2 (32A) which is simply absorbed by the REX subsystem (5). When the Host receives said response A1 (2A), it generates acknowledgement K1 (23A) which it transmits to the LEX subsystem (4). Said acknowledgement K1 (23A) is received by the LEX as acknowledgement K1 (28A) and forwarded to the REX where it appears as acknowledgement K1 (33A). Said acknowledgement K1 (33A) is again forwarded to the USB device to complete the protocol sequence.

Figure 18:
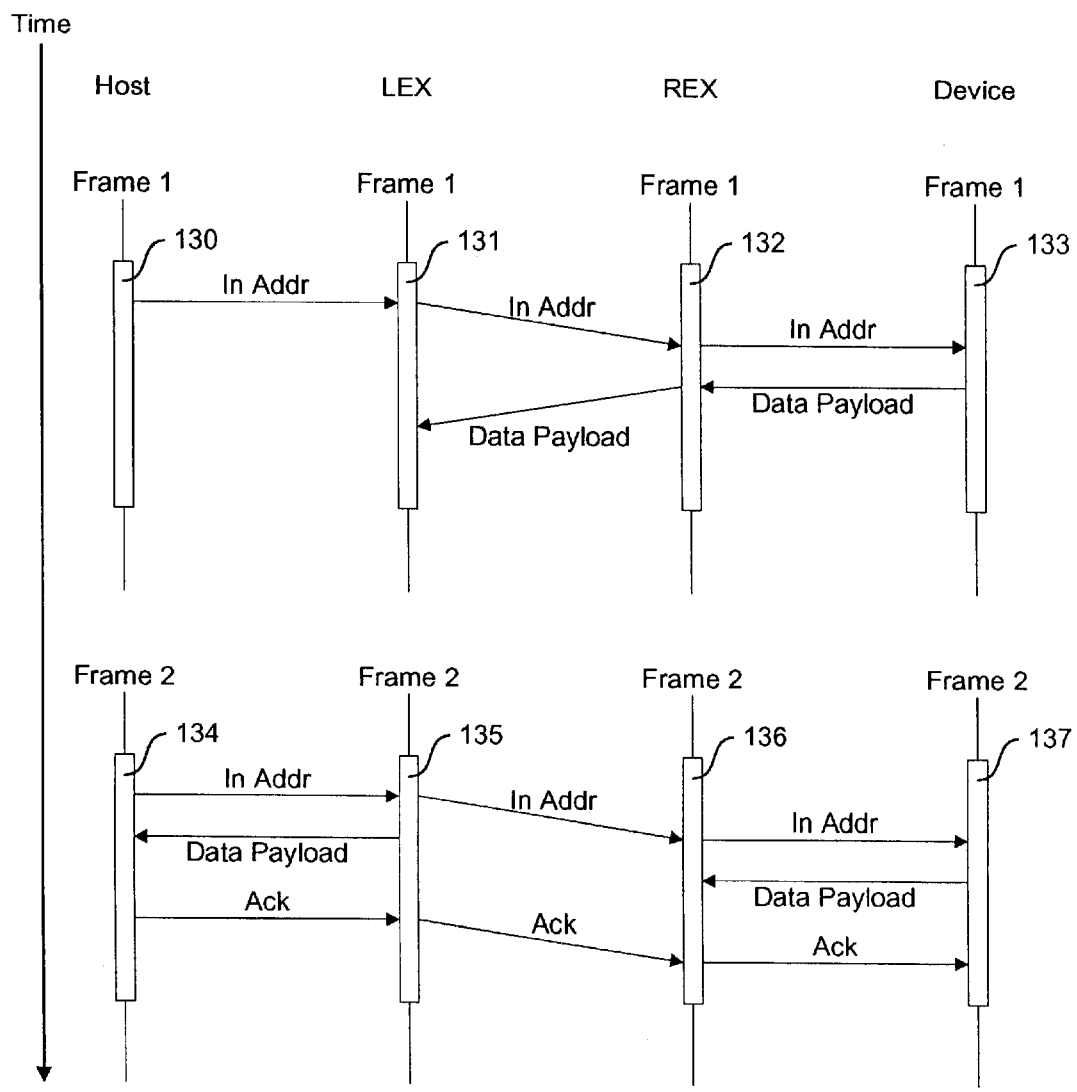
FIG. 18 is a sequence diagram showing an asynchronous input transfer according to the invention.

FIG. 18 provides a sequence diagram showing an asynchronous input transfer according to the invention.

In Frame 1, the control logic (130) within the Host PC generates a request for input data, addressed to a particular USB function. Said request is transmitted to the LEX subsystem as an "In Addr" packet. The control logic (131) within the LEX subsystem forwards the In Addr packet to the REX subsystem. The control logic (132) within the REX subsystem forwards the In Addr packet to the Device. The control logic (133) within the device assembles the requested asynchronous data and transmits it as a "Data Payload" packet to the REX subsystem. The control logic (132) within the REX subsystem forwards the Data Payload packet to the LEX subsystem. The control logic (131) in the LEX subsystem stores the Data Payload packet in its buffer memory.

In Frame 2, the control logic (134) within the Host PC recognizes that it has not received a response to its previous request for input data. Said control logic automatically retries the transaction by generating a further request addressed to the same USB function as in Frame 1. Said further request is transmitted to the LEX subsystem as a second In Addr packet. On receipt of the second In Addr packet, the control logic (135) within the LEX subsystem recognizes that it has a Data Payload packet stored in memory from the same function identified by the further In Addr packet. Said control logic retrieves said stored packet from memory and transmits same to the Host PC. Said control logic (135) also forwards the new In Addr packet to the REX subsystem. The control logic (136) within the REX subsystem forwards the In Addr packet to the Device.

The control logic (137) within the device recognizes that it did not receive an acknowledgement to its previous transmission and assumes that this new request is in fact a second request for the original information. The device thereby assembles the requested asynchronous data and transmits it as a Data Payload packet to the REX subsystem. The control logic (136) within the REX subsystem recognizes that said Data Payload packet is merely a repetition of the previous transmission and absorbs said packet.

When the control logic (134) of the Host receives the requested Data Payload packet from the LEX, said control logic generates an Ack packet to acknowledge a successful transmission. Said Ack packet is received by control logic (135) within the LEX and forwarded to the REX. Said forwarded Ack packet is received by control logic (136) within the REX and further forwarded to the device. The transmission of the Ack packet from the REX to the device is synchronised by control logic (136) to occur within the required response period following the end of transmission of the repeated Data Payload packet from the device.

Figure 19:
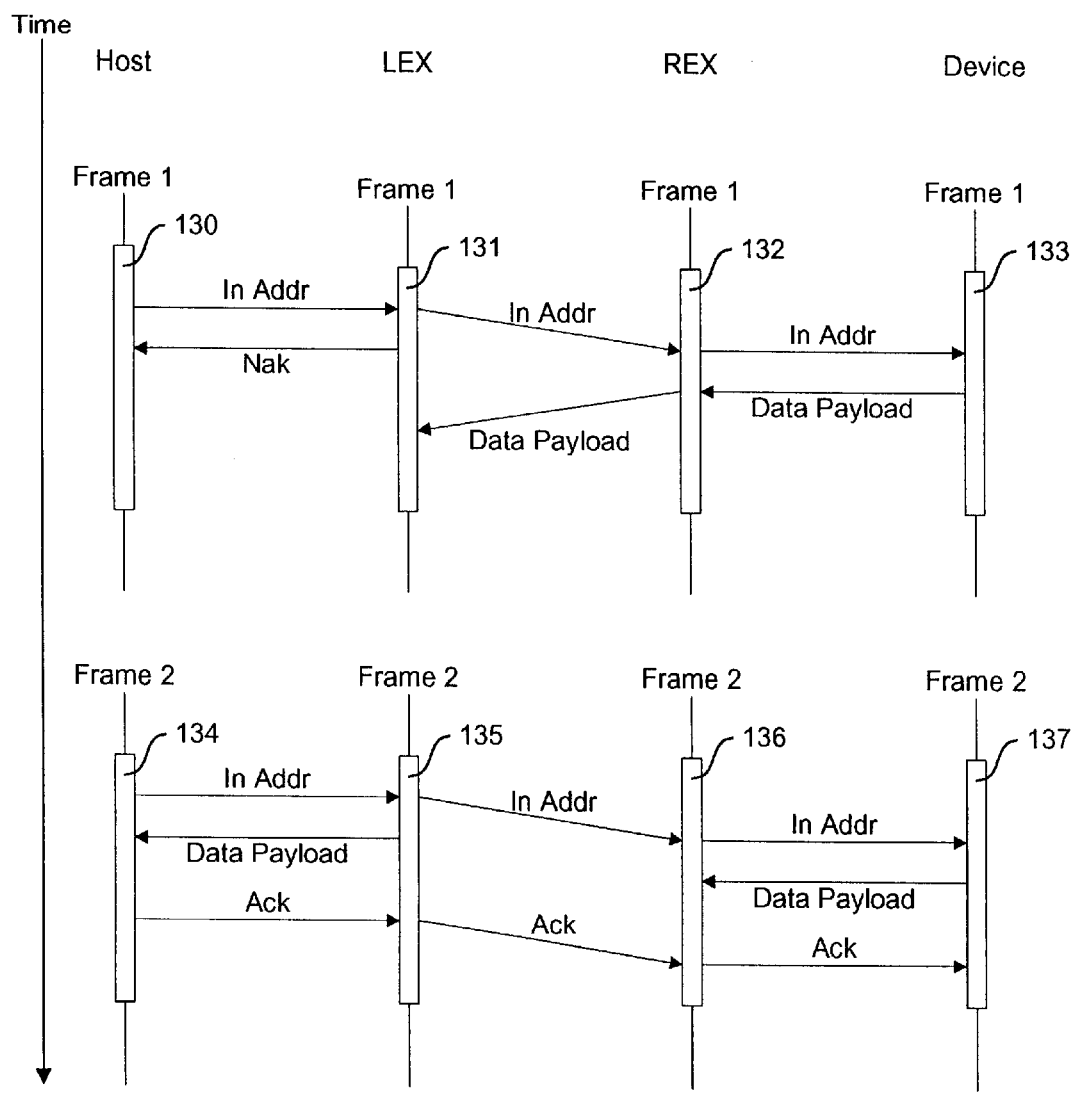
FIG. 19 is a sequence diagram showing an alternative asynchronous input transfer according to the invention.

FIG. 19 provides a sequence diagram showing an alternative asynchronous input transfer according to the invention. This method differs from that described in FIG. 18 in the manner in which the first request for an asynchronous input transfer is handled by the LEX.

In Frame 1, the control logic (130) within the Host PC generates a request for input data, addressed to a particular USB function. Said request is transmitted to the LEX subsystem as an In Addr packet. The control logic (131) within the LEX subsystem forwards the In Addr packet to the REX subsystem as described in FIG. 18.

At this point in the sequence, an additional step is introduced. Said control logic (131) within the LEX subsystem generates a synthetic negative acknowledgement packet and transmits it as a Nak packet to the Host PC. Said Nak packet warns the Host that it will not receive a response to its request and enables said Host to progress to the next transaction. The remainder of the protocol handling continues as described in FIG. 18.

Figure 20:
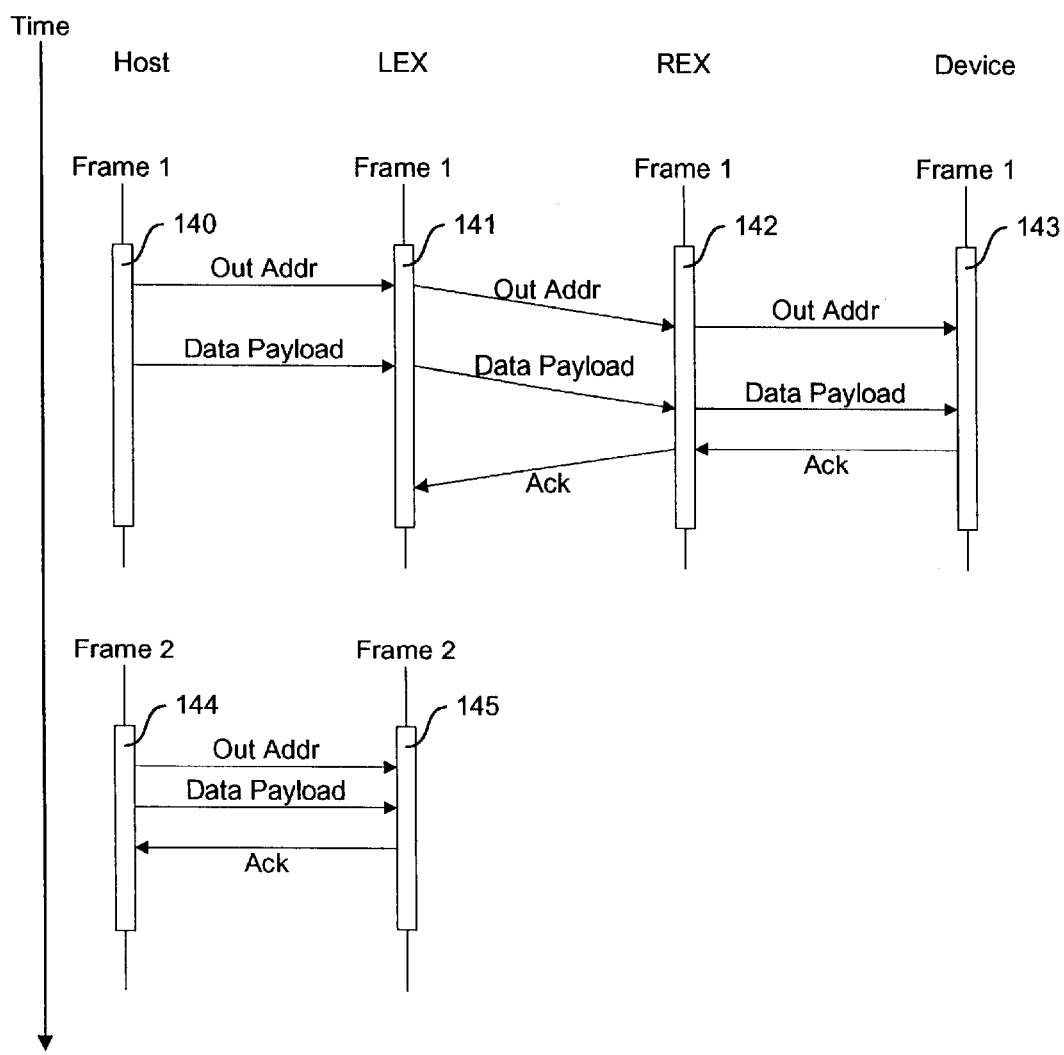
FIG. 20 is a sequence diagram showing an asynchronous output-transfer according to the invention.

FIG. 20 provides a sequence diagram showing an asynchronous output transfer according to the invention.

In Frame 1, the control logic (140) within the Host PC generates a notification of output data, addressed to a particular USB function. Said notification is transmitted to the LEX subsystem as an Out Addr packet. The control logic (141) within the LEX subsystem forwards said Out Addr packet to the REX subsystem. The control logic (142) within the REX subsystem forwards said Out Addr packet to the Device. The information is received by the control logic (143) within the device.

The control logic (140) within the Host PC assembles the notified asynchronous data and transmits same as a Data Payload packet to the LEX subsystem. The control logic (141) within the LEX subsystem forwards the Data Payload packet to the REX subsystem. The control logic (142) in the LEX subsystem further forwards the Data Payload packet to the device. The information is received by the control logic (143) within the device.

Upon successful receipt of said Data Payload packet by the device, the control logic 143) within the device generates an acknowledgement packet which is transmitted as an Ack packet to the REX. Said Ack packet is forwarded by control logic (142) within the REX to the LEX subsystem where its receipt is recorded by control logic (141).

In Frame 2, the control logic (144) within the Host PC recognizes that it has not received an acknowledgement of its previous transmission and generates a new Out Addr packet addressed to same end point as in Frame 1. The same control logic (144) also generates a new Data Payload packet which it transmits to the LEX. Upon receipt of the Data Payload packet by the LEX, the control logic (145) recognizes that it has already received positive acknowledgement of this transaction and generates an Ack packet which it sends to the Host.

Figure 21:
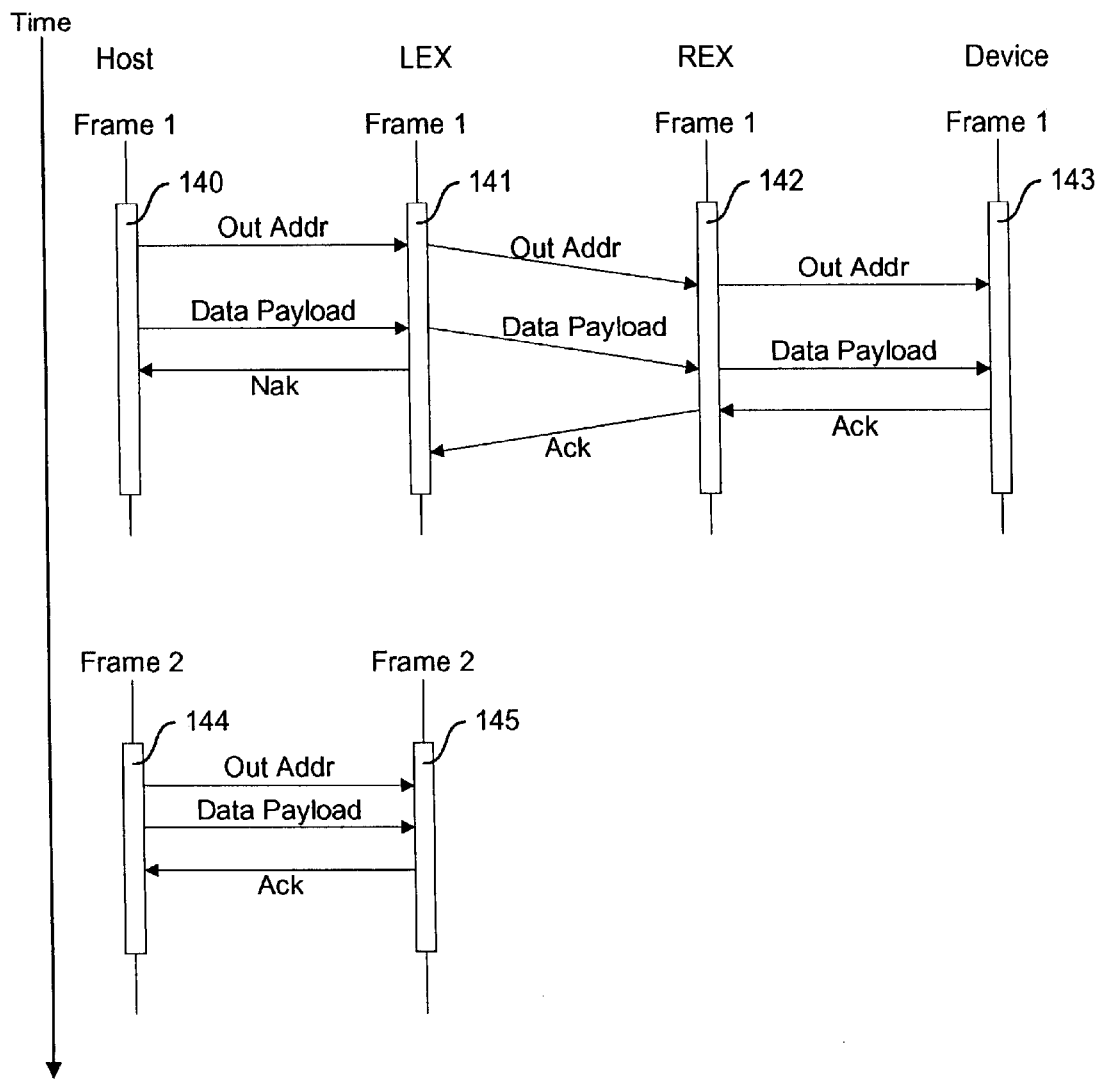
FIG. 21 is a sequence diagram showing an alternative asynchronous output transfer according to the invention.

FIG. 21 provides a sequence diagram showing an enhanced asynchronous output transfer according to the invention. This method differs from that described in FIG.

20 in the manner in which the first request for an asynchronous output transfer is handled by the LEX.

In Frame 1, the control logic (140) within the Host PC generates a notification of output data, addressed to a particular USB function. Said request is transmitted to the LEX subsystem as an Out Addr packet. The control logic (141) within the LEX subsystem forwards the Out Addr packet to the REX subsystem as in FIG. 20.

Also in Frame 1, the control logic (140) within the Host PC generates an output data packet, destined for said particular USB function. Said output data packet is transmitted to the LEX subsystem as an Data Payload packet. The control logic (141) within the LEX subsystem forwards the Data Payload packet to the REX subsystem as in FIG. 20.

At this point in the sequence, an additional step is introduced. Said control logic (141) within the LEX subsystem generates a synthetic negative acknowledgement packet and transmits it as a Nak packet to the Host PC. Said Nak packet wams the Host that it will not receive a response to its transmission and enables said Host to progress to the next transaction. The remainder of the protocol handling continues as described in FIG. 20.

Figure 22:
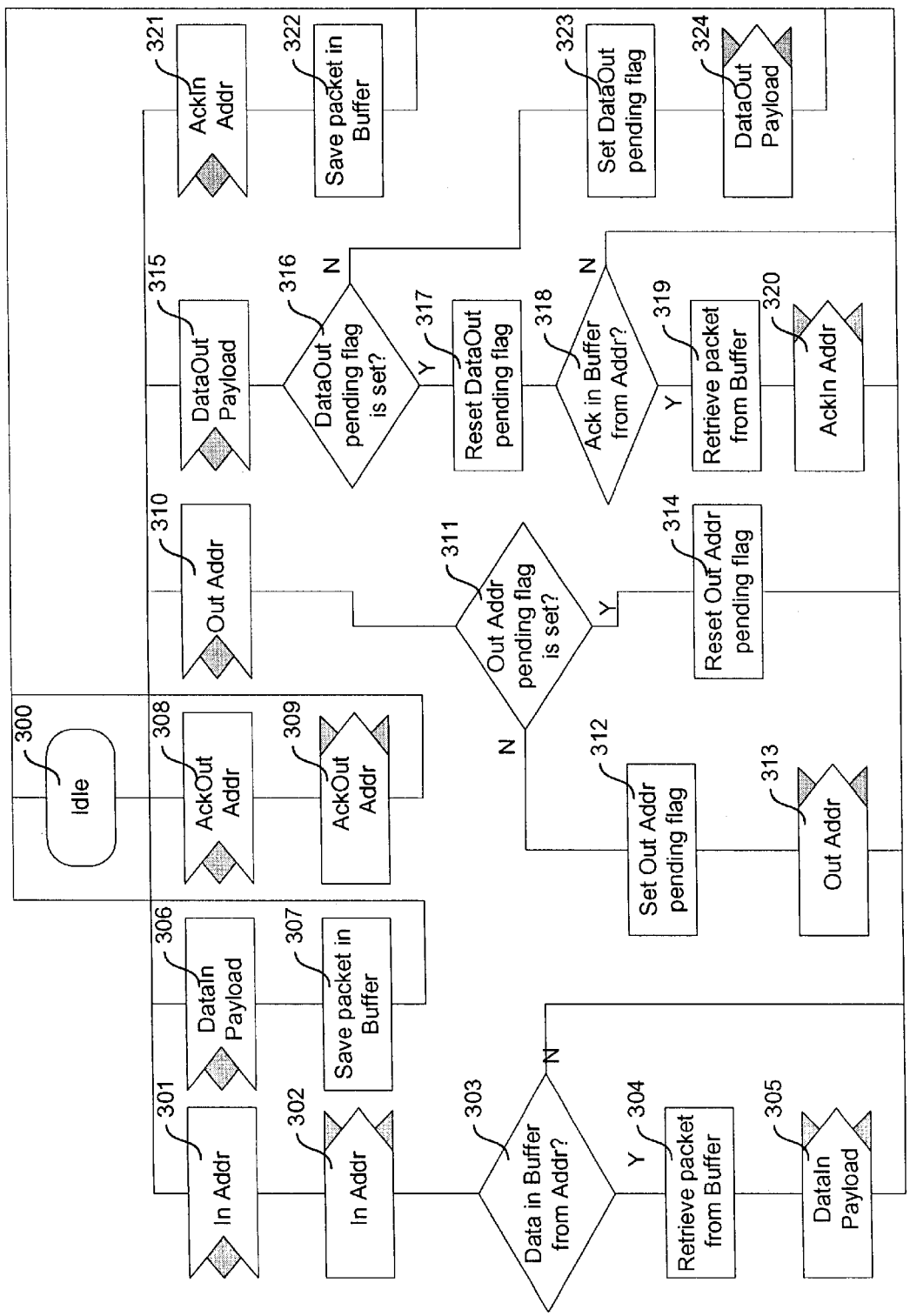
FIG. 22 is a logic diagram of a LEX controller according to the invention.

FIG. 22 provides an algorithm for implementing asynchronous transfers at the Local Expander (4). In the embodiment of the invention described in FIG. 6, said algorithm is implemented in hardware by LEX Controller (51). (It will be apparent to those skilled in the art that this implementation is not unique and that other mechanisms for implementing said algorithm are possible.) In the following description, the inbound direction refers to packets travelling from a peripheral device and towards a host controller; the outbound direction refers to packets travelling from a host controller and towards a peripheral device.

According to the invention, the algorithm of FIG. 22 is required to implement the processing functions represented by processing blocks (131) & (135) of FIG. 18, and processing blocks (141) & (145) of FIG. 20.

On initial power-up and after a reset, the system enters Idle state (300) where it waits for a message (USB packet) to be received. When a packet is received, the Packet Identifier (PID) field within the packet is examined to determine what type of packet has been received and what action is required to process said packet.

If the received packet (301) is of type IN, the system retransmits (302) said IN packet to the REX unit The systems then examines its buffer memory (303) to determine whether an inbound DATA packet from the same address as the IN packet is available. If said DATA packet is available, then It is retrieved (304) from buffer memory and transmitted (305) to the Host. The system returns to the Idle state (300).

If the received packet (306) is of type DATA and is travelling in the inbound direction, the system saves (307) said data packet in its buffer memory and returns to the Idle state (300).

If the received packet (308) is of type ACK and is travelling in the outbound direction, the system retransmits (309) said ACK packet and returns to the Idle state (300).

If the received packet (310) is of type OUT, the system tests (311) whether the OUT pending flag for the address is set. If said flag is set, the system resets said flag and returns to the Idle state (300). If said flag is not set, the system sets (312) said flag and retransmits (313) said received OUT packet before returning to the Idle state (300).

If the received packet (315) is of type DATA and is travelling in the outbound direction, the system tests (316) whether the DATA pending flag for the address is set. If said flag is not set, the system sets (323) said flag and retransmits (324) said received DATA packet before returning to the Idle state (300). If said DATA pending flag is set, the system resets (317) said DATA pending flag and tests (318) whether an ACK packet for the address has been stored in buffer memory. If said Ack packet is present in memory, the system retrieves (319) said packet from memory and transmits (320) said packet to the Host. The system returns to the Idle state (300).

If the received packet (321) is of type ACK and is travelling in the inbound direction, the system saves (322) said ACK packet in buffer memory and returns to the Idle state (300).

Figure 23:
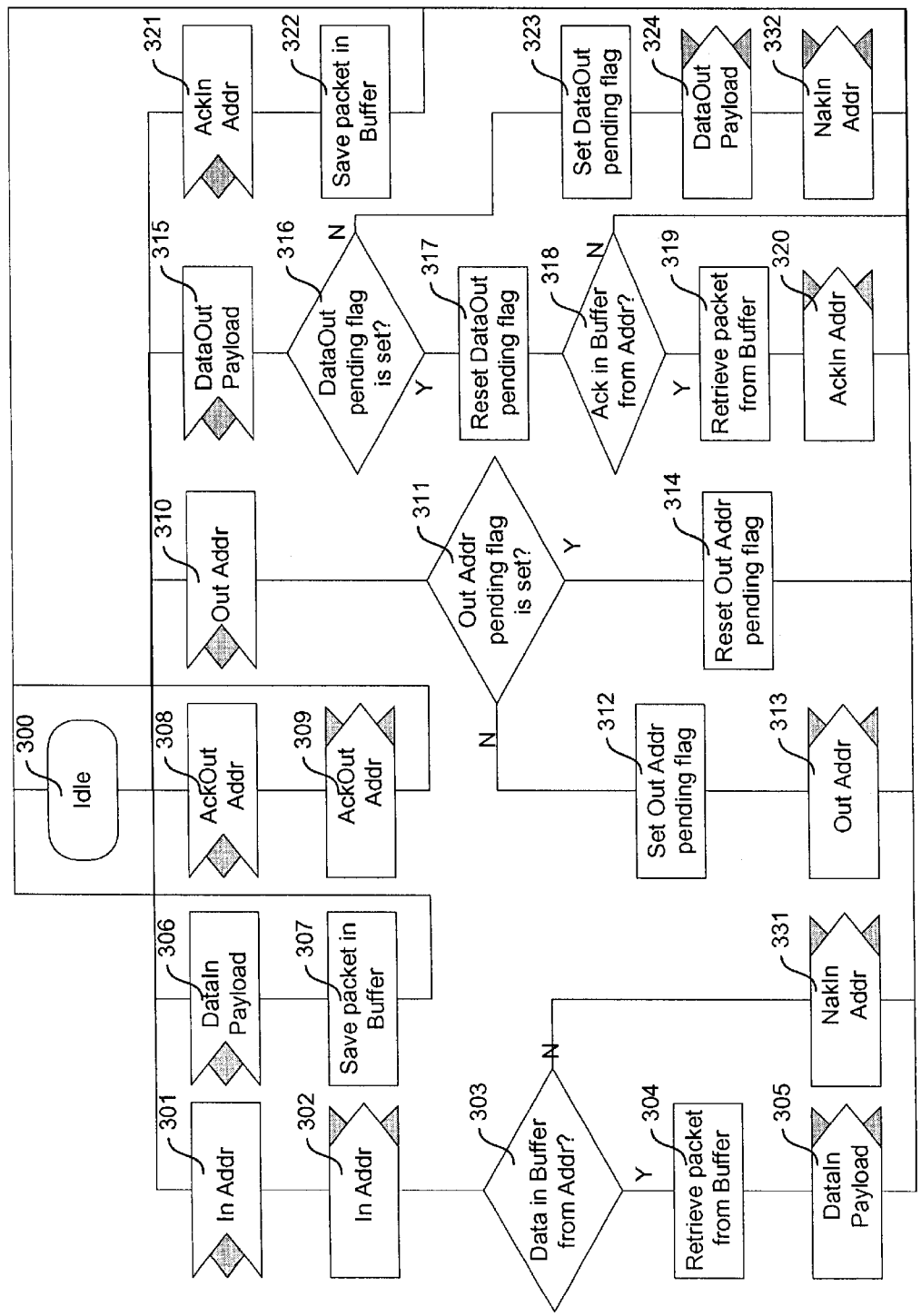
FIG. 23 is a logic diagram of an enhanced LEX controller according to the invention.

FIG. 23 provides an enhanced algorithm for implementing asynchronous transfers at the Local Expander according to the invention described in FIG. 6. This algorithm is identical to that described in FIG. 22, other than in the manner in which the LEX informs the Host that a response to its commands is not available. This situation occurs when the Host initiates a data transfer sequence as described in FIGS. 19 and 21.

Additional step (331) occurs when the system receives an IN packet but does not have the requested data stored in buffer memory. The system transmits (331) a negative acknowledgement packet to the Host before returning to the Idle state (300).

Additional step (332) occurs when the system receives an DATA packet travelling in the outbound direction but the DATA pending flag has not been set. The system transmits (332) a negative acknowledgement packet to the Host before returning to the Idle state (300).

Figure 24:
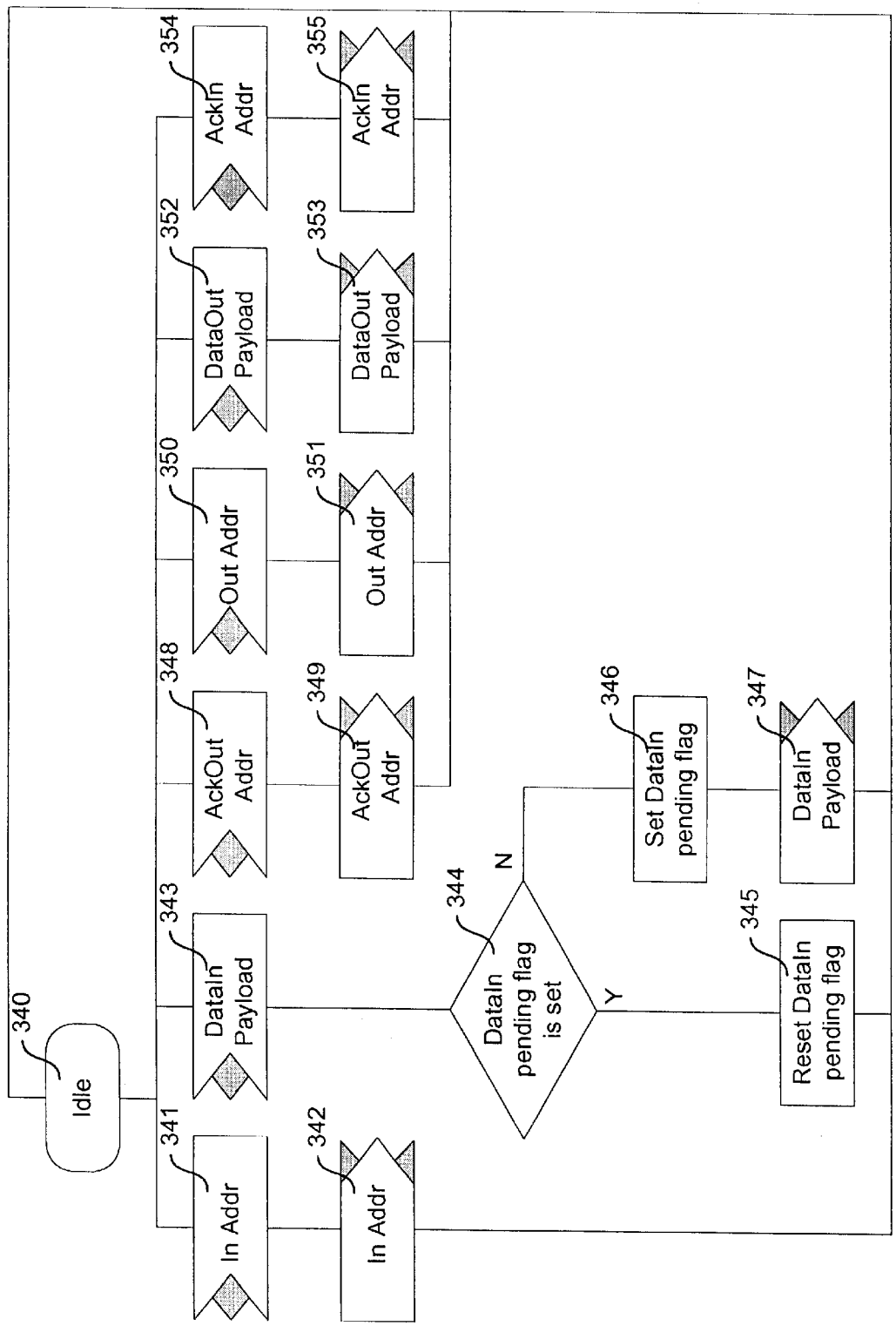
FIG. 24 is a logic diagram of a REX controller according to the invention.

FIG. 24 provides an algorithm for implementing asynchronous transfers at the Remote Expander. In the embodiment of the invention described in FIG. 7, said algorithm is implemented in hardware by REX Controller (61). (It will be apparent to those skilled in the art that this implementation is not unique and that other mechanisms for implementing said algorithm are possible.) In the following description, the inbound direction refers to packets travelling from a peripheral device and towards a host controller, the outbound direction refers to packets travelling from a host controller and towards a peripheral device.

According to the invention, the algorithm of FIG. 24 is required to implerment the processing functions represented by the processing blocks (132) & (136) of FIG. 18, and the processing block (142) of FIG. 20.

On initial power-up and after a reset, the system enters Idle state (340) where it waits for a message (USB packet) to be received. When a packet is received, the Packet Identifier (PID) field within the packet is examined to determine what type of packet has been received and what action is required to process said packet.

If the received packet (341) is of type IN, the system retransmits (342) said IN packet and returns to the Idle state (340).

If the received packet (343) is of type DATA and is travelling in the inbound direction, the system tests (344) whether the data pending flag for the address has been set. If said flag is set, the system resets (345) said flag and returns to the Idle state (340). If said data pending flag is not set, the system sets (346) said flag and retransmits (347) said received DATA packet to the LEX before returning to the Idle state (340).

If the received packet (348) is of type ACK and is travelling in the outbound direction, the system retransmits (349) said ACK packet and returns to the Idle state (300).

If the received packet (350) is of type OUT, the system retransmits (351) said OUT packet and returns to the Idle state (340).

If the received packet (352) is of type DATA and is travelling in the outbound direction, the system retransmits (353) said DATA packet and returns to the Idle state (340).

If the received packet (354) is of type ACK and is travelling in the inbound direction, the system retransmits (355) said ACK packet and returns to the Idle state (340).

Figure 25:
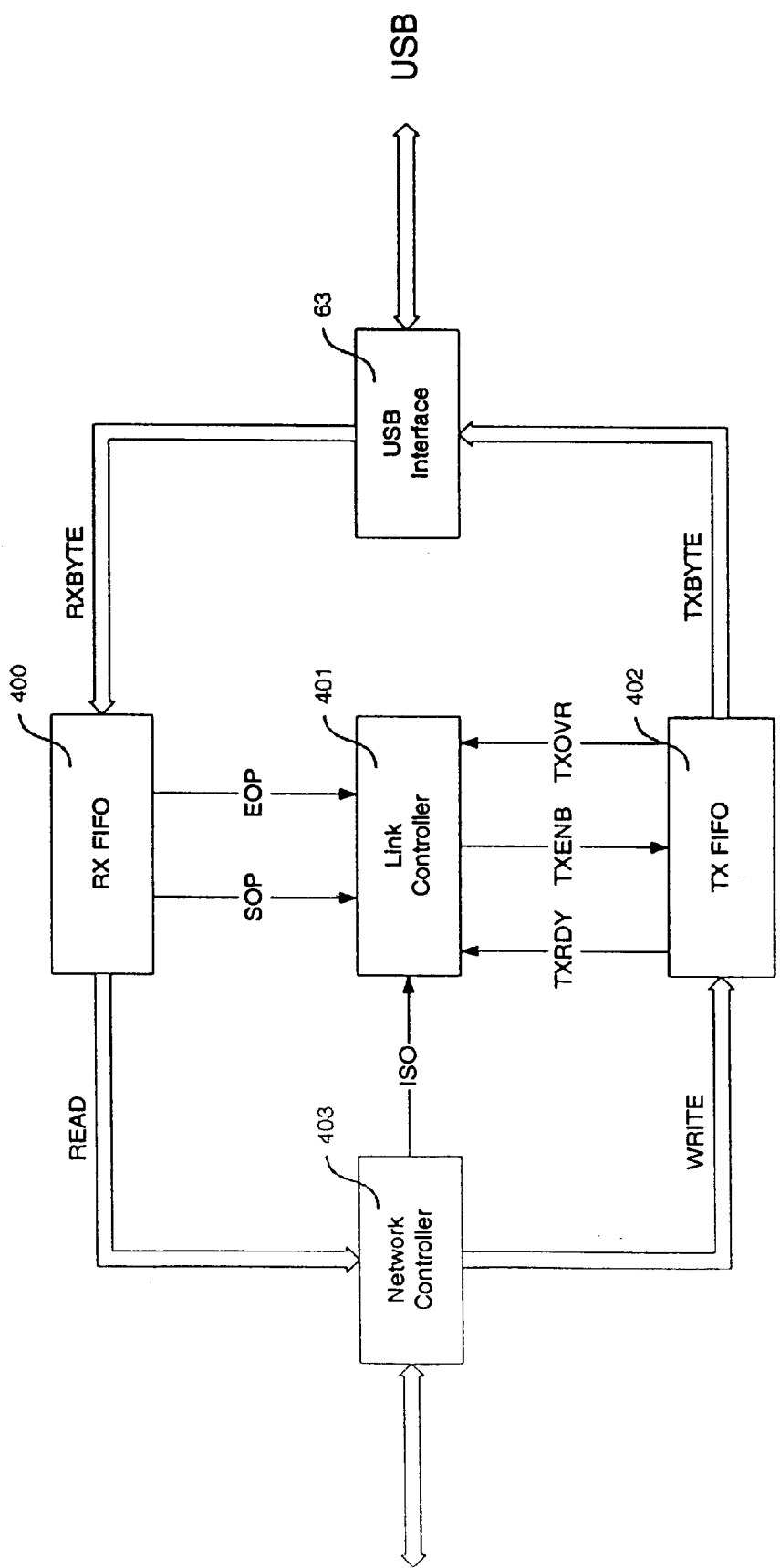
FIG. 25 is a schematic drawing of a REX Controller according to the invention.

FIG. 25 illustrates an embodiment of a REX Controller (61) according to the embodiment of the invention shown in FIG. 7. In this embodiment, the control functions of the REX are separated into two distinct components, the Network Controller (403) and the Link Controller (401). First In First Out (FIFO) buffers (400) & (402) are used to hold individual packets as they are sent to and received from the USB Interface (63).

The separation of functions into discrete controllers (403) and (401) enables the operation of the system to be described more simply. The Network Controller (403) performs the network layer functions as described in FIG. 24, while the Link Controller (401) performs the link layer functions associated with transmitting and receiving individual packets.

The following signals are provided between the components of FIG. 25. The Network Controller (403) generates signal ISO to indicate that the packet it has placed in TX FIFO (402) is related to an isochronous transmission and an acknowledgement is not expected.

TX FIFO (402) generates signal TXRDY to indicate that it contains a complete packet ready to be sent. TX FIFO (402) also generates signal TXOVR to indicate that it has completed sending a packet to USB Interface (63). RX FIFO (400) generates signal SOP to indicate that it has started to receive a packet from USB Interface (63). RX FIFO (400) also generates signal EOP to indicate that it has completed receiving a packet from USB Interface (63). The Link Controller (401) generates signal TXENB to inform TX FIFO (402) that TX FIFO is cleared to send its information to USB Interface (63).

Figure 26:
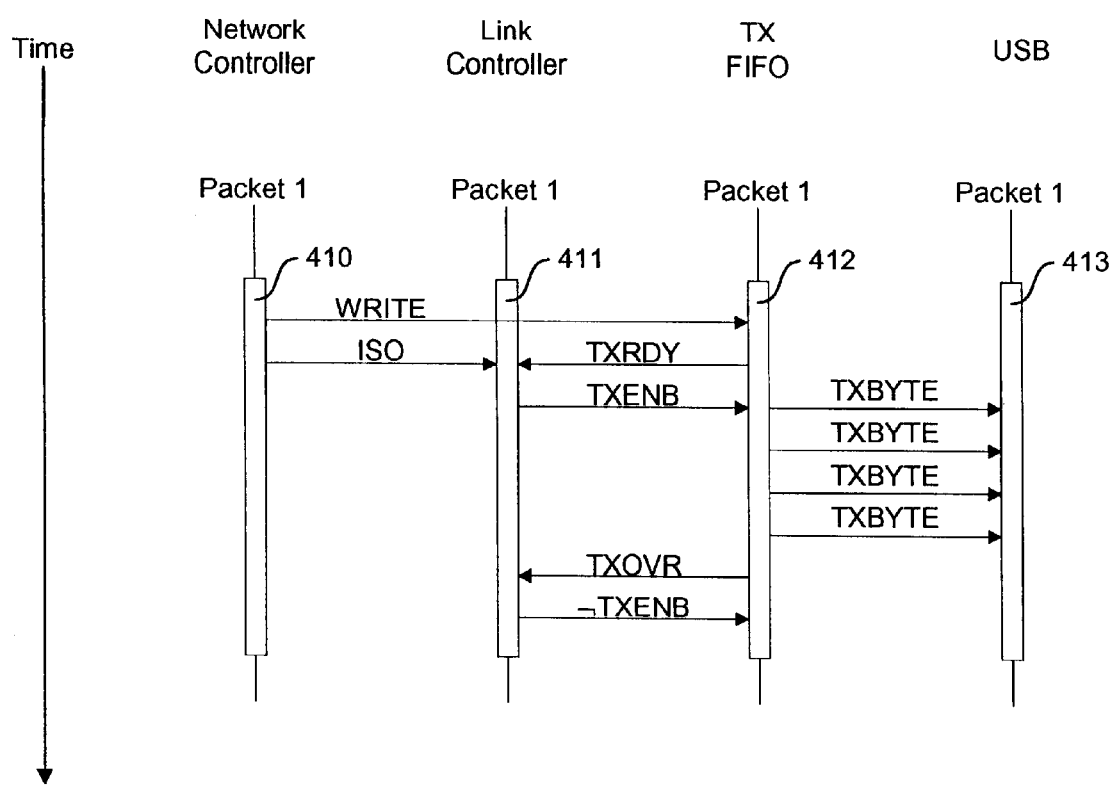
FIG. 26 is a sequence diagram showing a link layer packet output according to the invention.

FIG. 26 provides a sequence diagram showing a link layer packet output. In this drawing, control logic (410) is implemented by Network Controller (403), control logic (411) is Implemented by Link Controller (401, control logic (412) is implemented by TX FIFO (402) and control logic (413) is implemented by USB Interface (63).

A link layer output sequence is started when the Network Controller (403) copies a data packet to the TX FIFO (402) and raises the WRITE signal. Said Network Controller (403) also informs the Link Controller (401) by means of signal ISO whether said packet carries isochronous traffic. Once said data packet has been completely received by TX FIFO (402), said TX FIFO raises signal TXRDY to inform Link Controller (401) that it is now ready to output a data packet to USB Interface (63).

Once the Link Controller (401) determines that there are no conflicts for access to the USB Interface (63), said Link Controller (401) raises signal TXENB to indicate to TX FIFO (402) that it may now begin transmitting said data packet to said USB Interface (63). TX FIFO (402) then transmits said data packet to said USB Interface (63) one byte at a time by means of signal(s) TXBYTE.

When all of the bytes within said data packet have been transmitted, TX FIFO (402) raises signal TXOVR to indicate to Link Controller (401) that the transmission is complete and other tasks related to USB Interface (63) can be scheduled. Link Controller (401) completes the handshake by lowering signal TXENB to prevent a further data packet from being transmitted without intervention by said Link controller.

Figure 27:
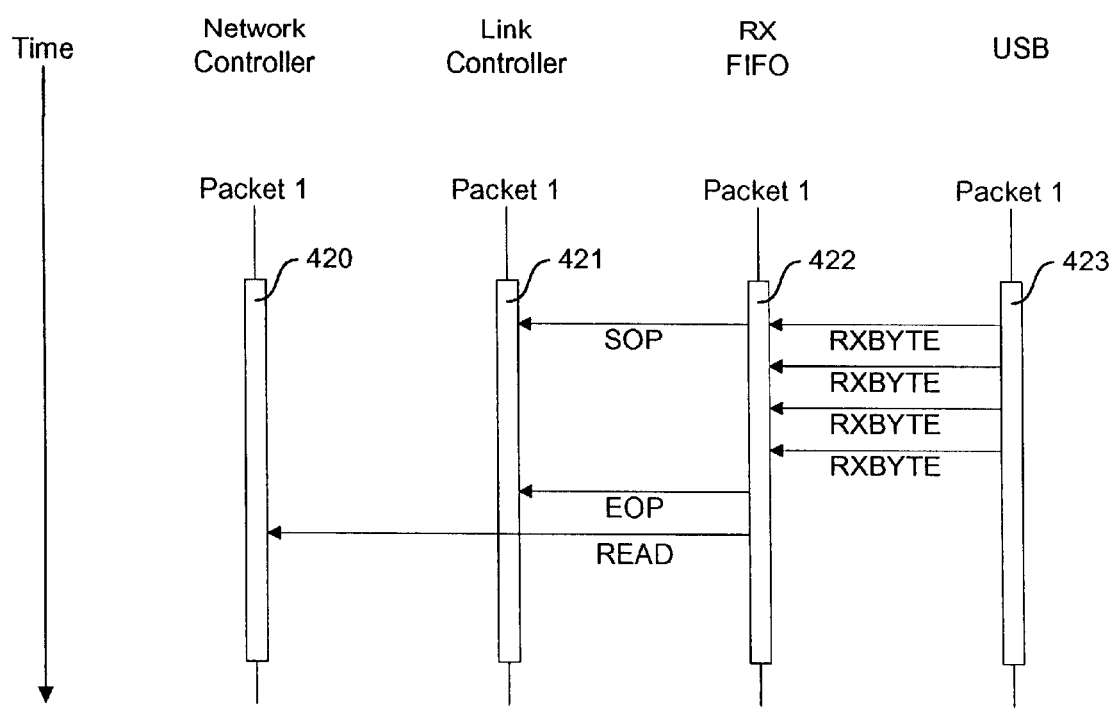
FIG. 27 is a sequence diagram showing a link layer packet input according to the invention.

FIG. 27 provides a sequence diagram showing a link layer packet input. In this drawing, control logic (420) is implemented by Network Controller (403), control logic (421) is implemented by Link Controller (401), control logic (422) is implemented by RX FIFO (400) and control logic (423) is implemented by USB Interface (63).

A link layer input sequence is started when RX FIFO (400) receives, by means of signal RXBYTE, the first byte of a new data packet from USB Interface (63). Thereupon, said RX FIFO indicates to Link Controller (401) by means of signal SOP that the start of a new packet has been detected. The remainder of the data packet is then received by RX FIFO (400) by means of additional RXBYTE signals.

Once the complete data packet has been received by RX FIFO (400), Link Controller (401) is notified by means of End Of Packet signal EOP. RX FIFO (400) then transfers the complete packet to Network Controller (403) by means of signal READ.

Figure 28:
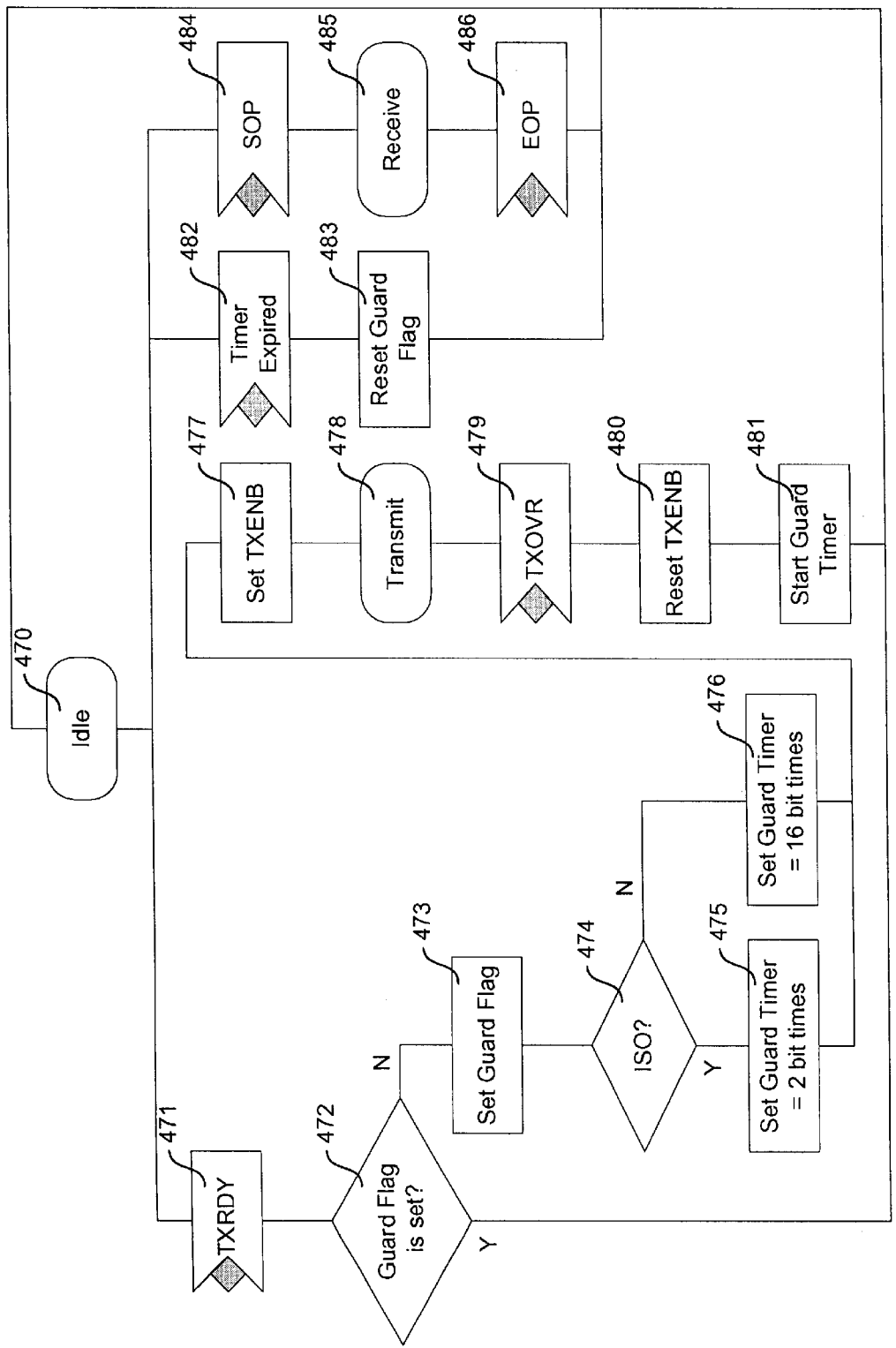
FIG. 28 is a logic diagram of a Link Controller according to the invention.

FIG. 28 provides an algorithm for implementing link control functions according to the invention of FIG. 25. In the embodiment of FIG. 25, the Link Controller functions of FIG. 28 are implemented by a discrete Link Controller block (401).

On initial power-up and after a reset, the system enters Idle state (470) where it waits for a signal to be received.

If the received signal (471) is TXRDY, the system checks (472) whether the guard flag has been set. If said guard is set, the system returns to the Idle state (470). If said guard flag is not set, the system sets (473) said flag to indicate that the system is not ready to transmit another packet. The system then checks (474) the ISO signal to determine whether the packet to be sent represents an isochronous transfer. If said ISO signal is true, the guard timer is set (475) to 2 bit-times. If said ISO signal is false, the guard timer is set (476) to 16 bit-times. The system then sets (477) signal TXENB to indicate that transmission of the packet to the USB Interface (63) can commence and moves to the Transmit state (478).

When the complete packet has been transmitted to the USB Interface, the system receives (479) signal TXOVR, resets (480) signal DXENB to prevent premature transmission of another packet, starts (481) the guard timer with its previously set value, and returns to the Idle state (470).

If the received signal (482) is Timer Expired, the system resets (483) the guard flag to indicate that another transmission can occur. The system returns to the idle state (470).

If the received signal (484) is SOP, the system enters the Receive state (485) where it remains until it receives the EOP signal (486) indicating that a complete packet is now available in RX FIFO (400). The system returns to the Idle state (470).

Figure 29:
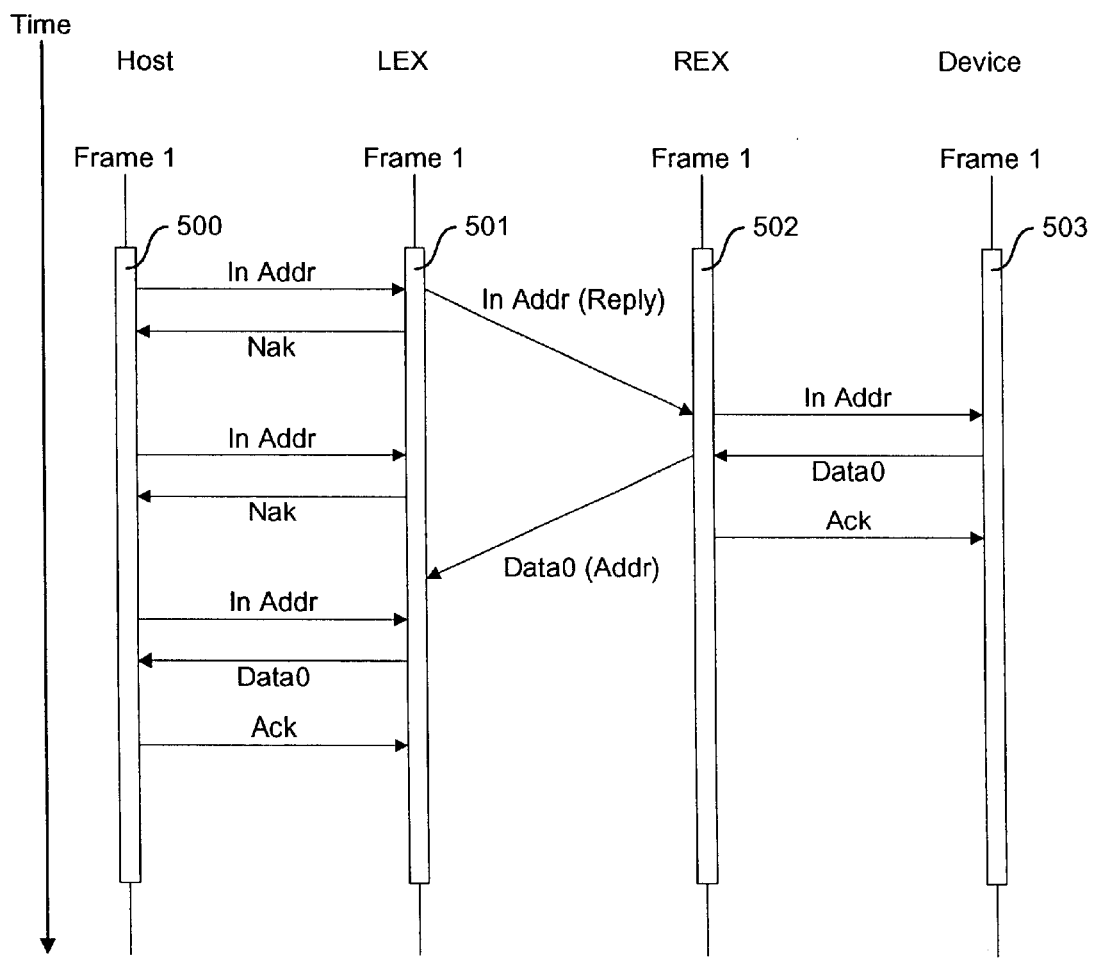
FIG. 29 is a sequence diagram showing a Bulk Read transfer according to the invention.

FIG. 29 is a sequence diagram showing a Bulk Read transfer according to the invention. Said Bulk Read transfer is a special case of an asynchronous input transfer as described in FIG. 18.

In Frame 1, the control logic (500) within the Host PC generates a request for input data, addressed to a particular USB function. Said request is transmitted to the LEX subsystem as an In Addr packet. The control logic (501) within the LEX subsystem forwards the In Addr packet to the REX subsystem, additionally informing said REX subsystem that an acknowledgement handshake is required. The control logic (501) generates a synthetic negative acknowledgement packet and transmits same as a Nak packet to the Host PC. If the LEX subsystem receives additional requests for the same information from the Host PC before it has received the required information from the REX subsystem, then the LEX subsystem absorbs said additional requests and generates additional Nak packets.

The control logic (502) within the REX subsystem receives the In Addr packet from the LEX subsystem and forwards said packet to the Device. The control logic (503) within the Device assembles the appropriate information and transmits same as a Data packet to REX. The control logic (502) within REX receives said Data packet and forwards same to LEX, additionally attaching the address of the originating device to said Data packet. The control logic (502) within REX generates a synthetic acknowledgement packet and transmits same as an Ack packet to the Device.

The control logic (500) within the Host PC generates a further request for Input data, addressed to the same USB function. The control logic (501) within LEX recognizes that said input data has already been received from REX and is stored in memory. Said control logic (501) retrieves said stored input data from memory and transmits same as a Data packet to the Host PC. Control logic (500) within the Host PC accepts the requested Data packet and acknowledges its receipt by transmitting an Ack packet to LEX.

Figure 30:
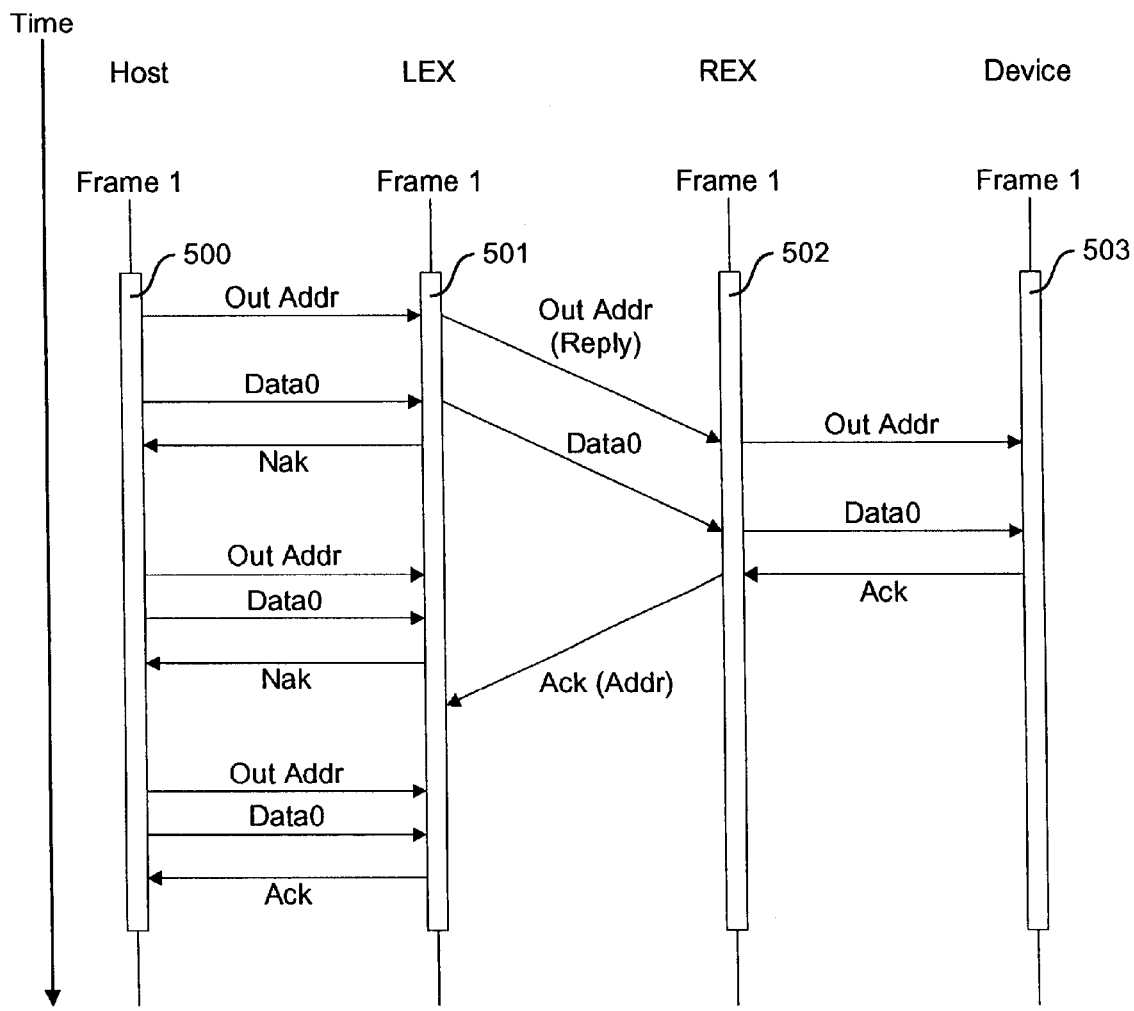
FIG. 30 is a sequence diagram showing a Bulk Write transfer according to the invention.

FIG. 30 is a sequence diagram showing a Bulk Write transfer according to the invention. Said Bulk Write transfer is a special case of an asynchronous output transfer as described in FIG. 20.

In Frame 1, the control logic (500) within the Host PC generates a notification of output data, addressed to a particular USB function. Said notification is transmitted to the LEX subsystem as an Out Addr packet followed by a Data packet. The control logic (501) within the LEX subsystem forwards the Out Addr packet and the Data packet to the REX subsystem, additionally informing said REX subsystem that an acknowledgement handshake is required. The control logic (501) generates a synthetic negative acknowledgement packet and transmits same as a Nak packet to the Host PC. If the LEX subsystem receives additional notifications of the same information from the Host PC before it has received the required acknowledgement from the REX subsystem, then the LEX subsystem absorbs said additional notifications and generates additional Nak packets.

The control logic (502) within the REX subsystem receives the Out Addr packet and the Data packet from the LEX subsystem and forwards said packets to the Device. The control logic (503) within the Device assembles a positive acknowledgement response and transmits same as an Ack packet to REX. The control logic (502) within REX receives said Ack packet and forwards same to LEX, additionally attaching the address of the originating device to said Ack packet.

The control logic (500) within the Host PC generates a further notification of output data, addressed to the same USB function. The control logic (501) within LEX recognizes that an acknowledgement corresponding to said output data has already been received from REX and is stored in memory. Said control logic (501) retrieves said stored acknowledgement from memory and transmits same as an Ack packet to the Host PC.

Figure 31:
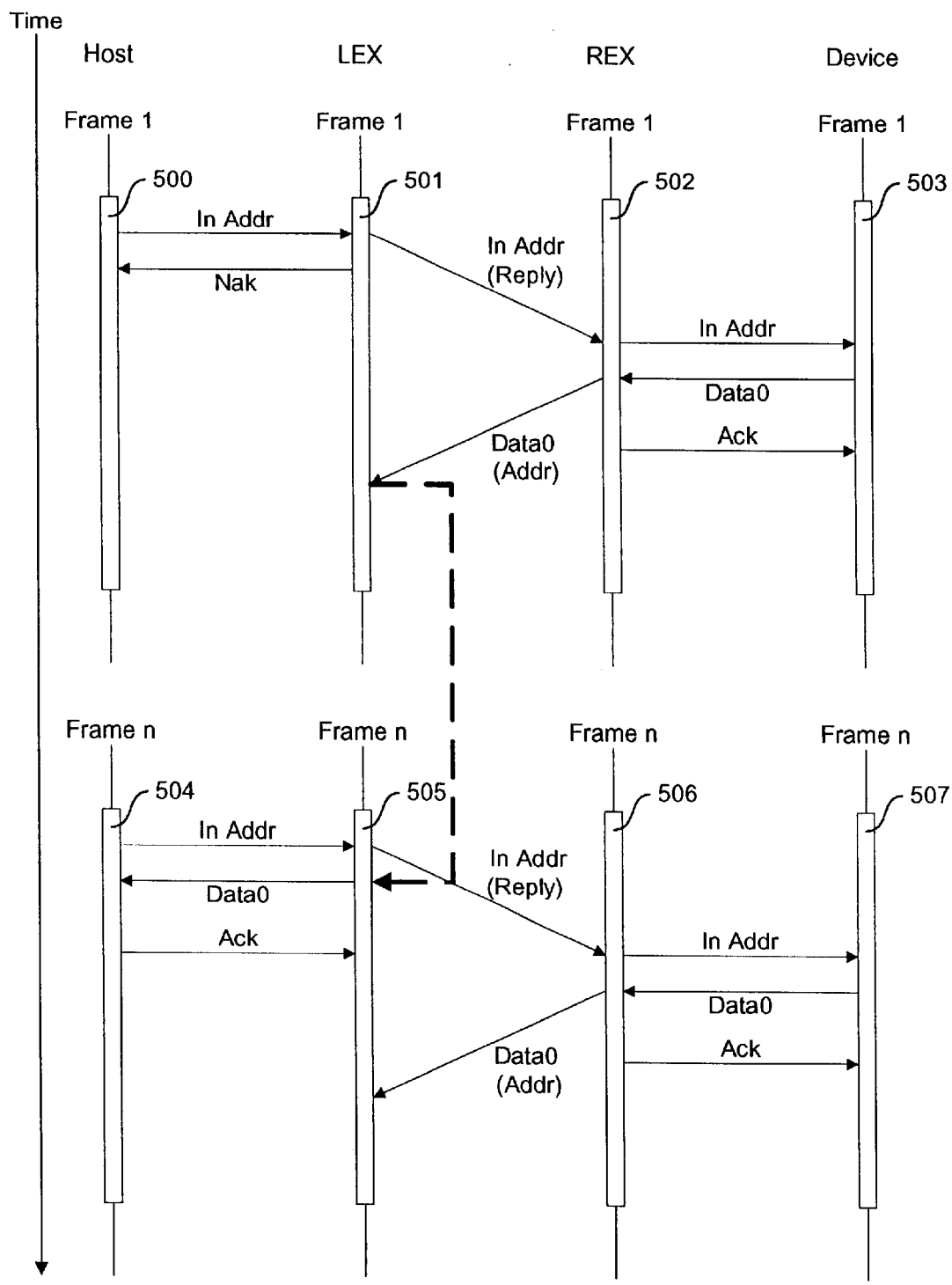
FIG. 31 is a sequence diagram showing an Interrupt In transfer according to the invention.

FIG. 31 is a sequence diagram showing an Interrupt In transfer according to the invention. Said Interrupt In transfer is a special case of an asynchronous input transfer as described in FIG. 18.

In Frame 1, the control logic (500) within the Host PC generates a request for input data, addressed to a particular USB function. Said request is transmitted to the LEX subsystem as an In Addr packet. The control logic (501) within the LEX subsystem forwards the In Addr packet to the REX subsystem, additionally informing said REX subsystem that an acknowledgement handshake is required. The control logic (501) generates a synthetic negative acknowledgement packet and transmits same as a Nak packet to the Host PC.

The control logic (502) within the REX subsystem receives the In Addr packet from the LEX subsystem and forwards said packet to the Device. The control logic (503) within the Device assembles the appropriate information and transmits same as a Data packet to REX. The control logic (502) within REX receives said Data packet and forwards same to LEX, additionally attaching the address of the originating device to said Data packet. The control logic (502) within REX generates a synthetic acknowledgement packet and transmits same as an Ack packet to the Device.

In a subsequent frame "n" the control logic (504) within the Host PC generates a further request for input data, addressed to the same USB function. The control logic (505) within LEX recognizes that said input data has already been received from REX and is stored in memory. Said control logic (505) retrieves said stored input data from memory and transmits same as a Data packet to the Host PC. Control logic (504) within the Host PC accepts the requested Data packet and acknowledges its receipt by transmitting an Ack packet to LEX.

Figure 32:
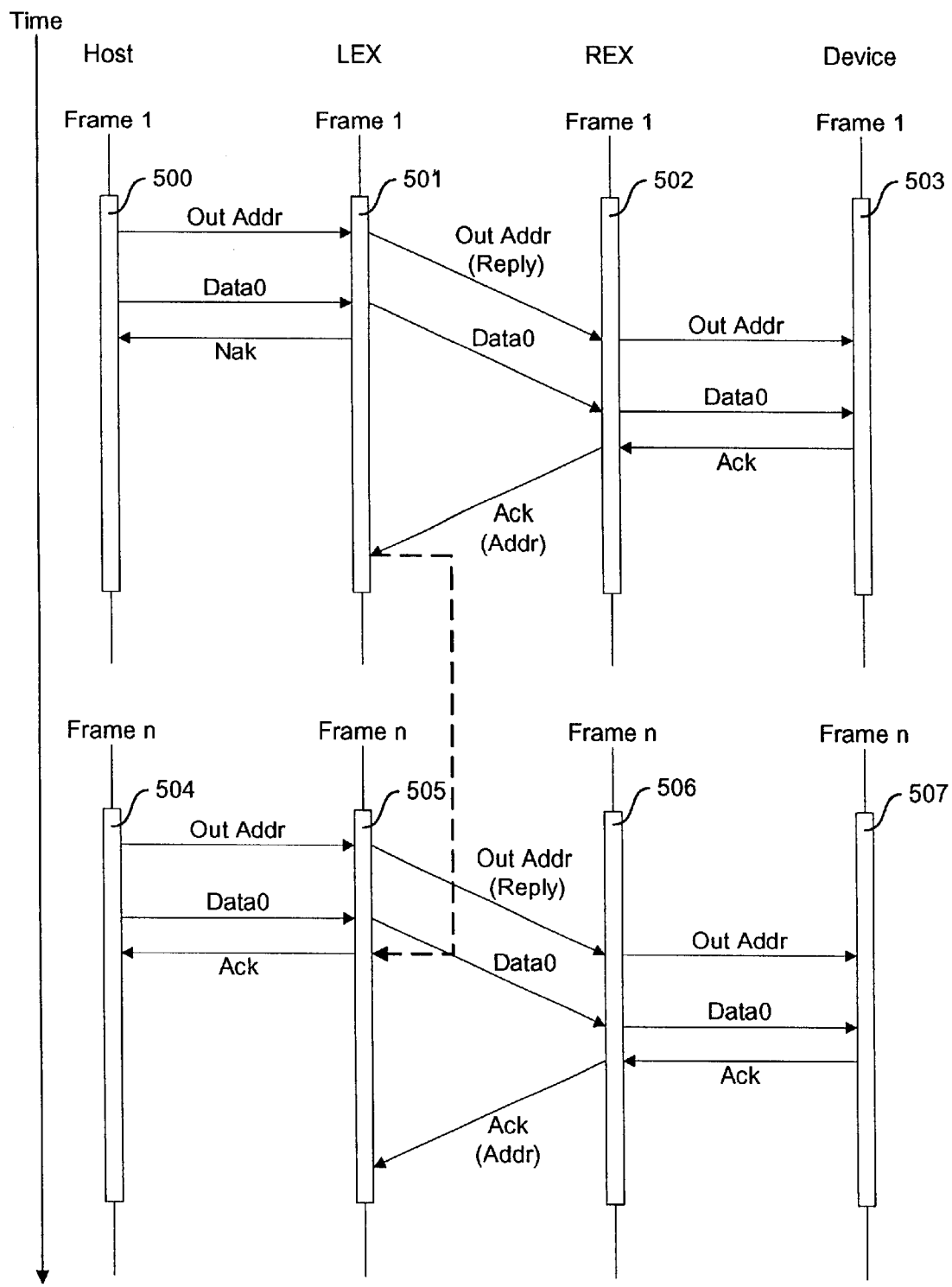
FIG. 32 is a sequence diagram showing an Interrupt Out transfer according to the invention.

FIG. 32 is a sequence diagram showing an Interrupt Out transfer according to the invention. Said Interrupt Out transfer is a special case of an asynchronous output transfer as described in FIG. 20.

In Frame 1, the control logic (500) within the Host PC generates a notification of output data, addressed to a particular USB function. Said notification is transmitted to the LEX subsystem as an Out Addr packet followed by a Data packet. The control logic (501) within the LEX subsystem forwards the Out Addr packet and the Data packet to the REX subsystem, additionally informing said REX subsystem that an acknowledgement handshake is required. The control logic (501) generates a synthetic negative acknowledgement packet and transmits same as a Nak packet to the Host PC.

The control logic (502) within the REX subsystem receives the Out Addr packet and the Data packet from the LEX subsystem and forwards said packets to the Device. The control logic (503) within the Device assembles a positive acknowledgement response and transmits same as an Ack packet to REX. The control logic (502) within REX receives said Ack packet and forwards same to LEX, additionally attaching the address of the originating device to said Ack packet.

In a subsequent frame "n" the control logic (504) within the Host PC generates a further notification of output data, addressed to the same USB function. The control logic (505) within LEX recognizes that an acknowledgement corresponding to said output data has already been received from REX and is stored in memory. Said control logic (505) retrieves said stored acknowledgement from memory and transmits same as an Ack packet to the Host PC.

Figure 33:
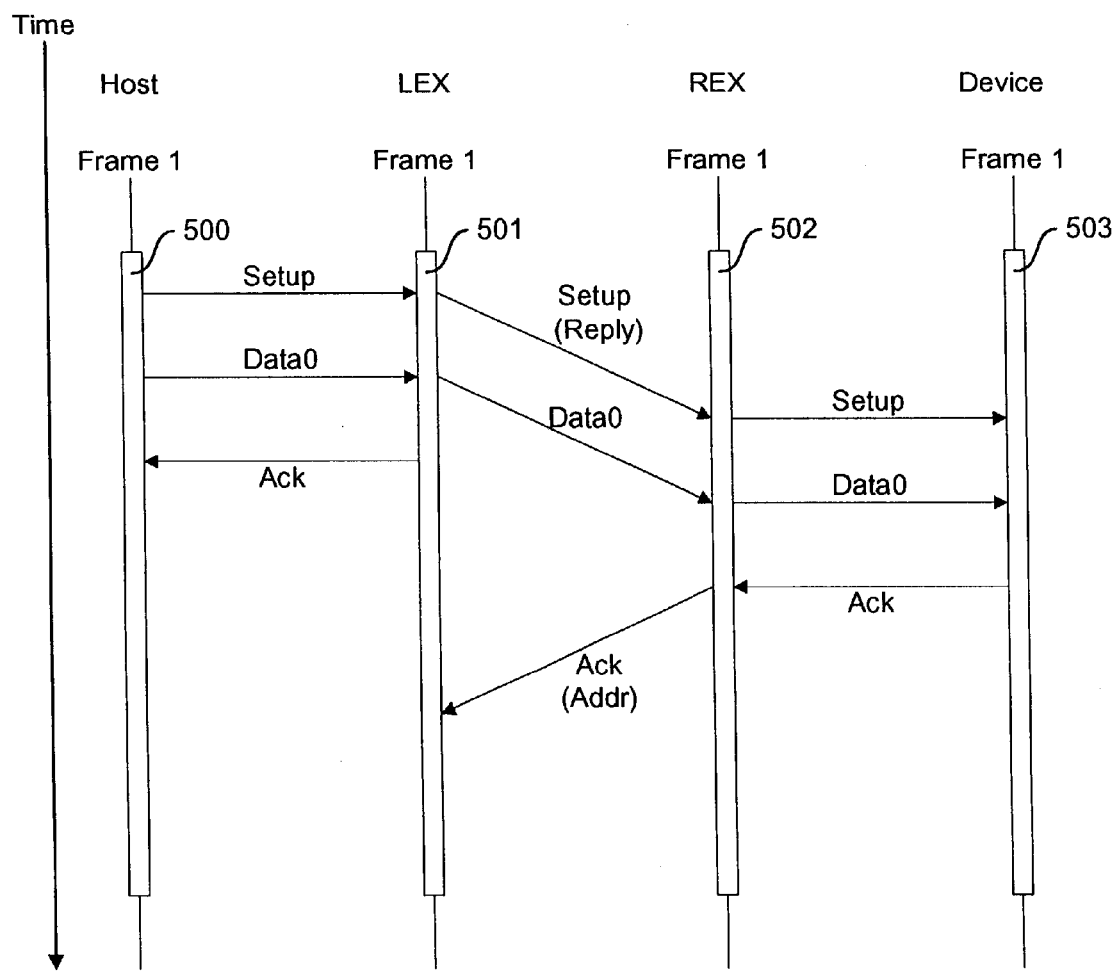
FIG. 33 is a sequence diagram showing a Control transfer according to the invention.

FIG. 33 is a sequence diagram showing a Control transfer according to the invention. Said Control transfer is a special case of an asynchronous output transfer as described in FIG. 20.

In Frame 1, the control logic (500) within the Host PC generates a notification of device set-up, addressed to a particular USB function. Said notification is transmitted to the LEX subsystem as a Setup packet followed by a Data packet. The control logic (501) within the LEX subsystem forwards the Setup packet and the Data packet to the REX subsystem, additionally informing said REX subsystem that an acknowledgement handshake is required. The control logic (501) generates a synthetic positive acknowledgement packet and transmits same as an Ack packet to the Host PC.

The control logic (502) within the REX subsystem receives the Setup packet and the Data packet from the LEX subsystem and forwards said packets to the Device. The control logic (503) within the Device assembles a positive acknowledgement response and transmits same as an Ack packet to REX. The control logic (502) within REX receives said Ack packet and forwards same to LEX, additionally attaching the address of the originating device to said Ack packet.

Optionally, the LEX waits for a positive acknowledgement response from the REX in order to confirm that the signal has been successfully received by the device.

Figure 34:
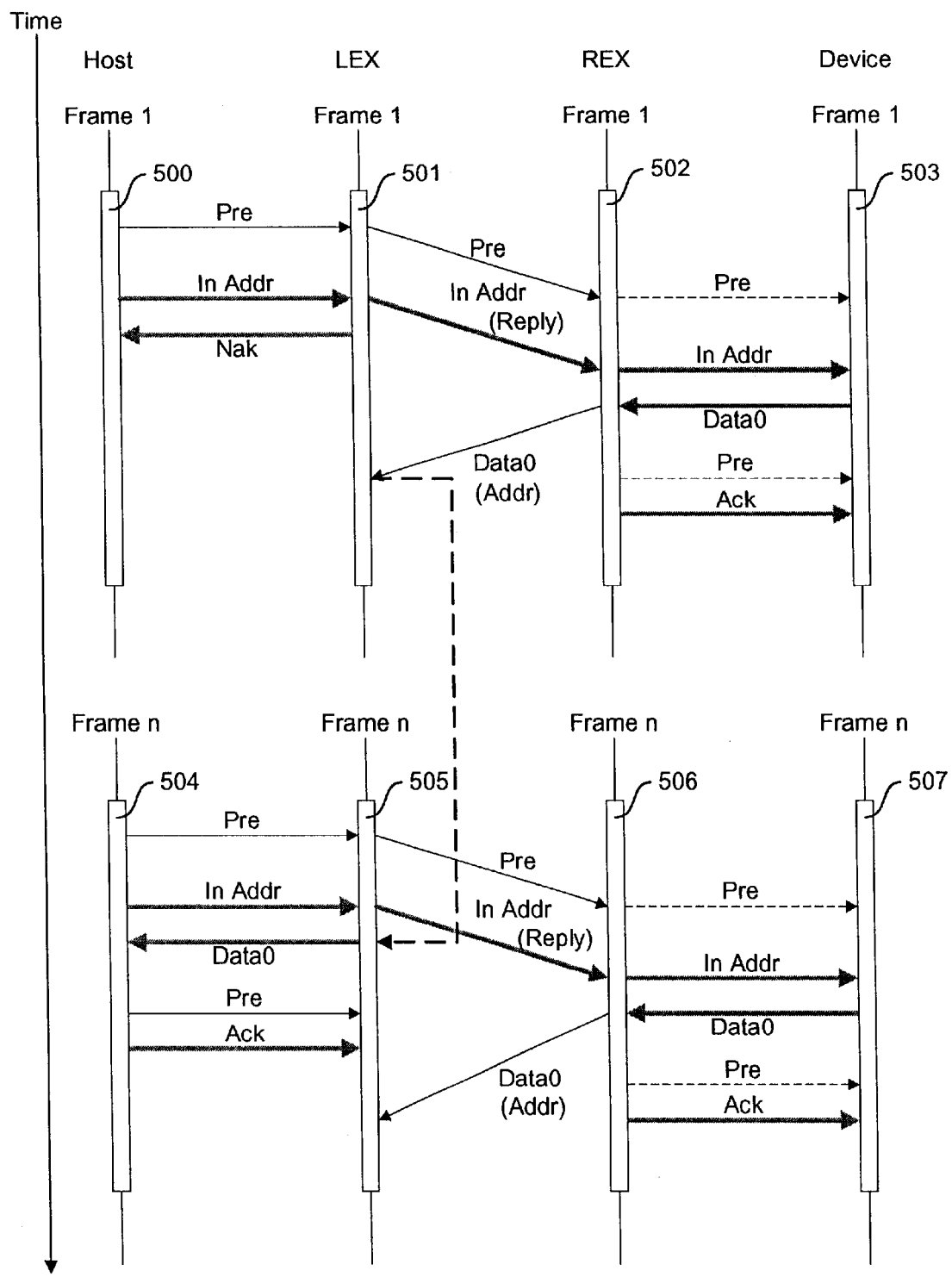
FIG. 34 is a sequence diagram showing a Low-speed Interrupt In transfer according to the invention.

FIG. 34 is a sequence diagram showing a Low-speed Interrupt In transfer according to the invention. Said Low-speed Interrupt In transfer is a special case of an asynchronous input transfer as described in FIG. 18 and of an Interrupt In transfer as described in FIG. 31.

In Frame 1, the control logic (500) within the Host PC generates a request for input data, addressed to a particular low-speed USB function. Said request is transmitted to the LEX subsystem as a Pre packet followed by a low-speed In Addr packet. The control logic (501) within the LEX subsystem forwards the Pre packet and the In Addr packet to the REX subsystem, additionally informing said REX subsystem that an acknowledgement handshake is required. The control logic (501) generates a synthetic negative acknowledgement packet and transmits same as a low-speed Nak packet to the Host PC.

The control logic (502) within the REX subsystem receives the Pre packet and the In Addr packet from the LEX subsystem and forwards said packets to the Device. The control logic (503) within the Device assembles the appropriate information and transmits same as a low-speed Data packet to REX. The control logic (502) within REX receives said Data packet and forwards same to LEX, additionally attaching the address of the originating device to said Data packet. The control logic (502) within REX generates a synthetic acknowledgement packet and transmits same as an Pre packet followed by a low-speed Ack packet to the Device.

In a subsequent frame "n" the control logic (504) within the Host PC generates a further request for input data, addressed to the same USB function. The control logic (505) within LEX recognizes that said input data has already been received from REX and is stored in memory. Said control logic (505) retrieves said stored input data from memory and transmits same as a low-speed Data packet to the Host PC. Control logic (504) within the Host PC accepts the requested Data packet and acknowledges its receipt by transmitting a Pre packet followed by a low-speed Ack packet to LEX.

Figure 35:
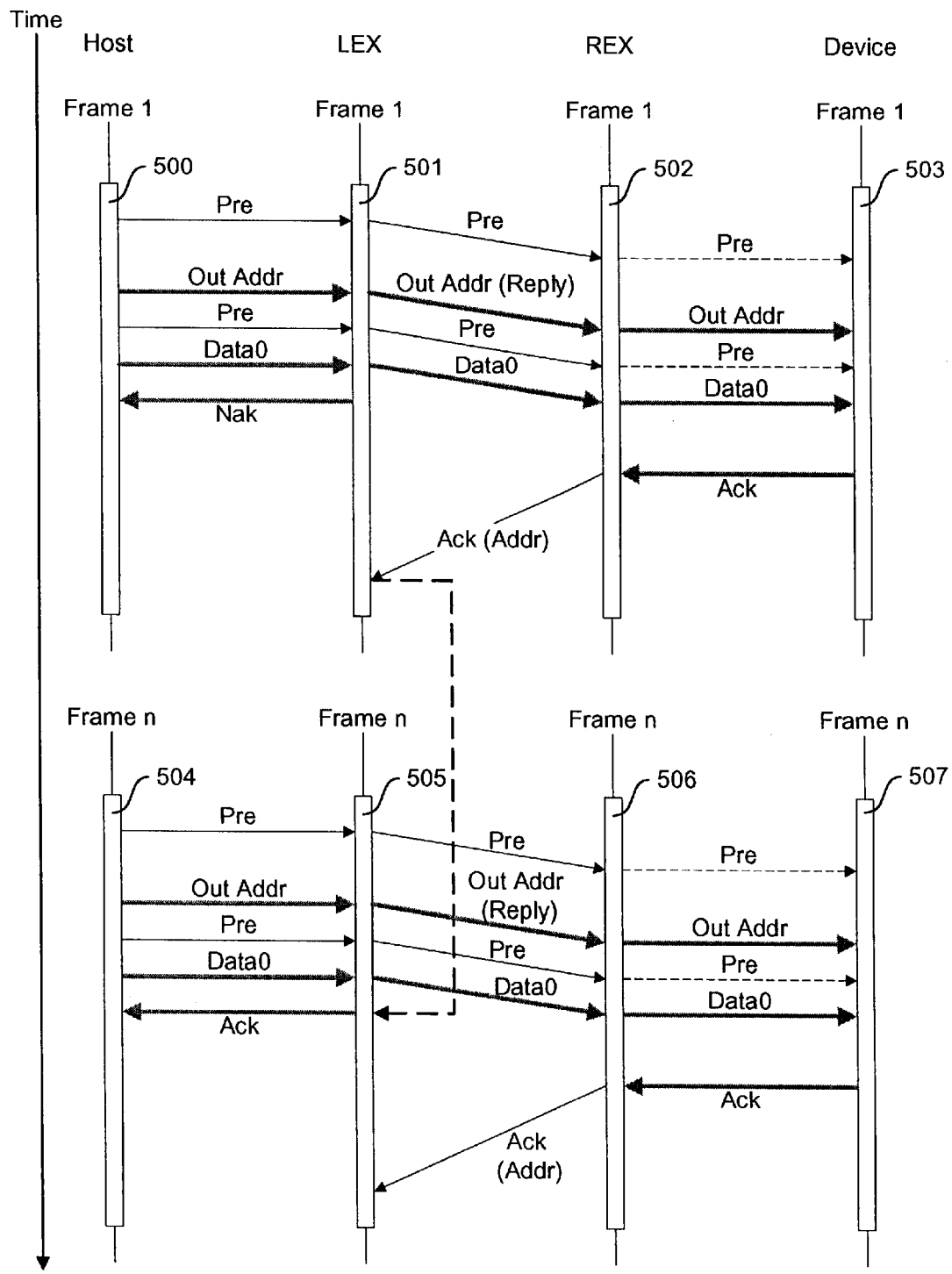
FIG. 35 is a sequence diagram showing a Low-speed Interrupt Out transfer according to the invention.

FIG. 35 is a sequence diagram showing a Low-speed Interrupt Out transfer according to the invention. Said Low-speed Interrupt Out transfer is a special case of an asynchronous output transfer as described in FIG. 20 and of an Interrupt Out transfer as described in FIG. 32.

In Frame 1, the control logic (500) within the Host PC generates a notification of output data, addressed to a particular low-speed USB function. Said notification is transmitted to the LEX subsystem as a Pre packet followed by an Out Addr packet followed by a second Pre packet followed by a Data packet. The control logic (501) within the LEX subsystem forwards the Pre packet, Out Addr packet, second Pre packet and the Data packet to the REX subsystem, additionally informing said REX subsystem that an acknowledgement handshake is required. The control logic (501) generates a synthetic negative acknowledgement packet and transmits same as a low-speed Nak packet to the Host PC.

The control logic (502) within the REX subsystem receives the Pre packet, Out Addr packet, second Pre packet and the Data packet from the LEX subsystem and forwards said packets to the Device. The control logic (503) within the Device assembles a positive acknowledgement response and transmits same as a low-speed Ack packet to REX. The control logic (502) within REX receives said Ack packet and forwards same to LEX, additionally attaching the address of the originating device to said Ack packet.

In a subsequent frame "n" the control logic (504) within the Host PC generates a further Inotification of output data, addressed to the same USB function. The control logic (505) within LEX recognizes that an acknowledgement corresponding to said output data has already been received from REX and is stored in memory. Said control logic (505) retrieves said stored acknowledgement from memory and transmits same as a low-speed Ack packet to the Host PC.

Thus, it is apparent that there have been provided, in accordance with the present invention, USB devices which fully satisfy the means, objects, and advantages set forth hereinbefore. Therefore, having described specific embodiments of the present invention, it will be understood that alterative, modifications and variations thereof may be suggested to those skilled in the art, and that it is intended that the present specification embrace all such aftematives, modifications and variations as fall within the scope of the appended claims. Additionally, for clarity and unless otherwise stated, the word "comprise" and variations of the word such as "comprising" and "comprises", when used in the description and claims of the present specification, is not intended to exclude other additives, components, integers or steps.

The embodiments of the invention in which an exclusive property or privilege is claimed are defined as follows:

1. A method for transmitting a data stream between a host controller and a peripheral device over an extended distance; said method comprising:
   a. feeding a first original, outgoing digital signal from a host controller to a local expander unit;
   b. transmitting said outgoing digital signal as a outgoing transmission signal, over a signal distribution system;
   c. receiving said outgoing transmission signal as a first original outgoing digital signal at a remote expander unit;
   d. delivering said first original outgoing digital signal from said remote expander to at least one peripheral device;
   e. receiving, at said remote expander, a reply digital signal from said at least one peripheral device;
   f. transmitting said reply digital signal as a reply transmission signal over said signal distribution system;
   g. receiving said reply transmission signal as a reply digital signal at said local expander;
   h. storing said reply digital signal as a stored reply digital signal until the receipt of a subsequent original, outgoing digital signal from said host controller, which subsequent signal is the same as, or similar to, said first original outgoing digital signal; and i. forwarding said stored reply digital signal to said host controller in response to said subsequent original outgoing digital signal.

2. A method as claimed in claim 1 wherein said data stream is a time relevant data stream.

3. A method as in claim 2 wherein said digital signals conform to the USB Specification and represent isochronous data.

4. A method as claimed in claim 3 wherein said method provides a method for transmission of isochronous data according to the USB Specification wherein lsochronous data is transmitted from a peripheral device and is received by a host controller, said method comprising:

a. transmitting a request for isochronous datafrom a host controller to a local expander;

b. forwarding said request for isochronous data from said local expander to a remote expander over a signal distribution system;

c. delivering said forwarded request for isochronous data to at least one peripheral device;

d. transmitting the requested isochronous data from said peripheral device to said remote expander;

e. forwarding said requested isochronous data from said remote expander to said local expander over said signal distribution system;

f. storing said requested isochronous data in a packet buffer at said local expander;

g. transmitting a subsequent request for isochronous data from said host controller to said local expander;

h. receiving said subsequent request for isochronous data at said local expander; and I. retrieving the stored isochronous data from said local expander;

II. delivering said stored isochronous data to said host controller;

III. forwarding said subsequent request for isochronous data from said local expander to said remote expander over said signal distribution system; and IV. repeating steps (c) through (h) for said subsequent request and any further subsequent requests for isochronous data.

5. A method as claimed in claim 3 wherein said method provides a method for transmission of isochronous data according to the USB Specification wherein isochronous data is transmitted from a host controller and is received by a peripheral device, said method comprising:

a) receiving, at a local expander, an original notification of isochronous a host controller;

b) forwarding said original notification of isochronous data from said local expander to a remote expander over a signal distribution system;

c) receiving, at a remote expander, said forwarded original notification of isochronous data;

d) delivering said forwarded notification of asynchronous data to at least one peripheral device;

e) receiving, at a local expander, an original isochronous data packet from a host controller;

f) forwarding said original isochronous data packet from said local expander to a remote expander over a signal distribution system;

g) receiving, at a remote expander, said forwarded original isochronous data packet; and h) delivering said forwarded original isochronous data packet to at least one peripheral device.

6. A method as claimed in claim 4 additionally comprising the following steps after step (b) of claim 4 namely:

i. Determining whether said local expander already possesses said requested isochnonous data;

ii. Generating a synthetic data packet if no such requested isochronous data is present; and iii. Delivering said synthetic isochronous data to said host controller.

7. A method as claimed in claim 4 additionally comprising the following step after step (c) of claim 4, namely:

i) Storing the address of the peripheral device at said remote expander unit; and further comprising the following steps after step (d) of claim 4, namely:

i) Retrieving the address of said peripheral device at said remote expander unit; and ii) Adding said retrieved address to said requested isochronous data.

8. A method as claimed in claim 4 wherein vestigial packets are removed from the system, said method comprising:

i) Detecting when a new frame has begun;

ii) Examining the properties of each packet buffer;

iii) Determining whether the data packet contained in said examined packet buffer has been stored for at least one complete frame period;

iv) Discarding said data packet if said data packet has been stored for at least one complete frame period; and v) Repeating steps (i) through (iv) for each packet buffer in the system.

9. A method as claimed in claim 1 wherein said data stream is a non-time-relevant data stream.

10. A method as in claim 9 wherein said digital signals conform to the USB Specification-and represent asynchronous data.

11. A method as claimed in claim 10 wherein said method provides a method for transmission of asynchronous data according to the USB Specification wherein asynchronous data is transmitted from a peripheral device and is received by a host controller, said method comprising:

a) receiving, at a local expander, an original request for asynchronous data from a host controller;

b) forwarding said original request for asynchronous data from said local expander to a remote expander over a signal distribution system;

c) receiving, at a remote expander, said forwarded original request for asynchronous data;

d) delivering said forwarded original request for asynchronous data to at least one peripheral device;

e) receiving, at said remote expander, the requested asynchronous data from said peripheral device;

f) forwarding said requested asynchronous data from said remote expander to said local expander over said signal distribution system;

g) storing, in a packet buffer at said local expander, said requested asynchronous data;

h) receiving, at said local expander, a subsequent request for asynchronous data from said host controller; and i) forwarding said subsequent request for asynchronous data from said local expander to a remote expander over a signal distribution system;

ii) delivering said forwarded subsequent request for asynchronous data to at least one peripheral device;

iii) receiving, at said remote expander, the requested asynchronous data from said peripheral device;
i) additionally receiving, at said locat expander, said subsequent request for asynchronous data from said host controller as in step (h); and
  i) retrieving the stored asynchronous data from said packet buffer;
  ii) delivering said retrieved asynchronous data to said host controller;
j) receiving, at said local expander, an outgoing acknowledgement signal from said host controller;
k) optionally converting said outgoing acknowledgement signal into a converted acknowledgement signal having a format suitable for transmission over extended distances;
l) transmitting either said outgoing acknowledgement signal or said converted acknowledgement signal, as an acknowledgement transmission signal, over a signal distribution system;
m) receiving, at a remote expander unit, said acknowledgement transmission signal;
n) optionally converting said acknowledgement transmission signal to said outgoing acknowledgement signal; and
o) delivering said outgoing acknowledgement signal from said remote expander to at least one peripheral device.

12. A method as claimed in claim 11 additionally comprising the following step after step (b) of claim 11, namely:
  i) Determining whether said local expander already possesses said requested asynchronous data;
  ii) Generating a negative acknowledgement packet if no such requested asynchronous data is present; and
  iii) Delivering said negative acknowledgement packet to said host controller.

13. A method as claimed in claim 11 additionally comprising the following step after step (e) of claim 11, namely:
  i) generating an acknowledgement packet at said remote expander; and
  ii) delivering said acknowledgement packet to said peripheral device.

14. A method as claimed in claim 11 wherein, additionally, a guard time is imposed after a data packet is transmitted from a remote expander to a USB device, which guard time is set to a value that is dependent upon the transfer type of said transmitted data packet, said method comprising:
  a) Receiving, at a remote expander, an outbound data packet,
  b) Determining, at a remote expander, the transfer type of said outbound data packet,
  c) Forwarding said outbound data packet from said remote expander to a USB device,
  d) Setting the value of a transmission guard timer to a value that is dependent upon said determined transfer type; and
  e) Inhibiting further outbound transmissions until said guard timer has expired.

15. A method as claimed in claim 10 wherein said method provides a method for transmission of asynchronous data according to the USB Specification wherein asynchronous data is transmitted from a host controller and is received by a peripheral device, said method comprising:
  a) receiving, at a local expander, an original notification of asynchronous data from a host controller;
  b) forwarding said original notification of asynchronous data from said local expander to a remote expander over a signal distribution system;
  c) receiving, at a remote expander, said forwarded original notification of asynchronous data;
  d) delivering said forwarded notification of asynchronous data to at least one peripheral device;
  e) receiving, at a local expander, an original asynchronous data packet from a host controller;
  f) forwarding said original asynchronous data packet from said local expander to a remote expander over a signal distribution system;
  g) receiving, at a remote expander, said forwarded original asynchronous data packet;
  h) delivering said forwarded original asynchronous data packet to at least one peripheral device;
  i) receiving, at said remote expander, an inbound acknowledgement packet from said peripheral device;
  j) forwarding said inbound acknowledgement packet from said remote expander to said local expander over said signal distribution system;
  k) storing, in a packet buffer at said local expander, said inbound acknowledgement packet;
  l) receiving, at said local expander, a subsequent notification of asynchronous data from said host controller;
  m) receiving, at said local expander, a subsequent asynchronous data packet from said host controller; and
    i) retrieving said stored inbound acknowledgement packet from said packet buffer; and
    ii) delivering said retrieved inbound acknowledgement packet to said host controller.

16. A method as claimed in claim 15 additionally comprising the following step after step (e) of claim 15, namely:
  i) generating an acknowledgement packet at said local expander; and
  ii) delivering said acknowledgement packet to said host controller.

17. A method as claimed in claim 15 additionally comprising the following step after step (e) of claim 15, namely:
  i) Determining whether said local expander already possesses said inbound acknowledgement packet;
  ii) Generating a negative acknowledgement packet if no such inbound acknowledgement packet is present; and
  iii) Delivering said negative acknowledgement packet to said host controller.

18. A method as claimed in claim 15 wherein, additionally, a guard time is imposed after a data packet is transmitted from a remote expander to a USB device, which guard time is set to a value that is dependent upon the transfer type of said transmitted data packet, said method comprising:
  a) Receiving, at a remote expander, an outbound data packet,
  b) Determining, at a remote expander, the transfer type of said outbound data packet,
  c) Forwarding said outbound data packet from said remote expander to a USB device,
  d) Setting the value of a transmission guard timer to a value that is dependent upon said determined transfer type; and
  e) Inhibiting further outbound transmissions until said guard timer has expired.

19. A method as claimed in claim 1 wherein said host controller is a PC, and said peripheral device is a camera, a mouse, a keyboard, a monitor or a speaker or speakers.

20. A method as in claim 1 wherein said extended distance exceeds 5 meters.

21. A method as claimed in claim 20 wherein said extended distance exceeds 30 meters.

22. A method as claimed in claim 21 wherein said extended distance is equal to or exceeds 100 meters.

23. A method as in claim 1 wherein said signal distribution system utilizes unshielded twisted pair (UTP) wiring.

24. A method as in claim 1 wherein said signal distribution system utilizes fibre optic cabling.

25. A method as in claim 1 wherein said signal distribution system utilizes wireless transmission.

26. An apparatus for transmission of a digital signal over an extended distance comprising:
   a local expander comprising means for receiving a request for a data signal from a host controller which host controller is connected to said local expander;
   means in said local expander for generating an outgoing transmission signal;
   means in said local expander for sending said outgoing transmission signal, which outgoing transmission signal is sent over a signal distribution system;
   a remote expander comprising means for receiving said outgoing transmission signal;
   means in said remote expander for generating a digital signal from said outgoing transmission signal;
   means in said remote expander for forwarding said digital signal to at least one peripheral device, which peripheral device is connected to said remote expander;
   means in said remote expander for receiving inbound digital signals from said peripheral device;
   means in said remote expander for converting said inbound digital signals to an inbound transmission signal;
   means in said remote expander for sending said inbound transmission signal to said local expander, which inbound transmission signal is sent over said signal distribution system;
   means in said local expander for receiving said inbound transmission signal;
   means in said local expander for generating a digital signal from said inbound transmission; and
   means in said remote expander for forwarding said digital signal to said host controller.

27. An apparatus as claimed in claim 26 wherein said data signal is a time relevant data signal.

28. An apparatus as claimed in claim 27 wherein said time relevant signal is a digital signal which conforms to the USB Specification; and said time relevant signal represent isochronous data.

29. An apparatus as claimed in claim 28 wherein said local expander additionally comprises:
   means for storing said inbound signal as a stored inbound signal;
   means for analysing said digital signal from said host controller to recognize a subsequent request for transmission of said time relevant digital signal; and
   means for sending said stored inbound signal to said host controller in response to said subsequent request.

30. An apparatus as claimed in claim 26 wherein said digital signal is a non time-relevant signal which conforms to the USB Specification; and said non time-relevant signal represents asynchronous data.

31. An apparatus as claimed in claim 30 for transmission of a digital signal over an extended distance comprising:

a) a local expander comprising means for receiving a request for a non time-relevant data signal from a host controller which host controller is connected to said local expander;

b) means in said local expander for generating an outgoing transmission signal;

c) means in said local expander for sending said outgoing transmission signal to a remote expander, which outgoing transmission signal is sent over a signal distribution system;

d) a remote expander comprising means for receiving said outgoing transmission signal;

e) means in said remote expander for generating a digital signal from said outgoing transmission signal;

f) means in said remote expander for forwarding said digital signal to at least one peripheral device, which peripheral device is connected to said remote expander;

g) means in said remote expander for receiving inbound digital signals from said peripheral device;

h) means in said remote expander for converting said inbound digital signals to an inbound transmission signal;

i) means in said remote expander for sending said inbound transmission signal to said local expander, which inbound transmission signal is sent over said signal distribution system;

j) means in said local expander for receiving said inbound transmission signal;

k) means in said local expander for generating a digital signal from said inbound transmission; and l) means in said remote expander for forwarding said digital signal to said host controller.

32. An apparatus as claimed in claim 31 wherein said local expander additionally comprises:
   a) means for storing said inbound signal as a stored inbound signal;
   b) means for analysing said digital signal from said host controller to recognize a subsequent request for transmission of said non time-relevant digital signal; and
   c) means for sending said stored inbound signal to said host controller in response to said subsequent request.

33. An apparatus as claimed in claim 26 wherein said extended distance exceeds 5 meters.

34. An apparatus as claimed in claim 26 wherein said extended distance exceeds 30 meters.

35. An apparatus as claimed in claim 26 wherein said extended distance is equal to or exceeds 100 meters.

36. An apparatus as claimed in claim 26 wherein said signal distribution system utilizes unshielded twisted pair (UTP) wiring.

37. An apparatus as claimed in claim 26 wherein said signal distribution system utilizes fibre optic cabling.

38. An apparatus as claimed in claim 26 wherein said signal distribution system utilizes wireless transmission.

39. An apparatus as claimed in claim 26 wherein said host controller is a PC, and said peripheral device is a camera, a mouse, a keyboard, a monitor or a speaker or speakers.

40. A method for transmitting a data stream between a host controller and a peripheral device over an extended distance; said method comprising:
   a. feeding a first original, outgoing digital signal from a host controller to a local expander unit;
   b. converting said outgoing digital signals into a converted outgoing signal having a format suitable for transmission over extended distances;

c. transmitting said outgoing digital signal, as a outgoing transmission signal, over a signal distribution system;
d. receiving said outgoing transmission signal at a remote expander unit;
e. converting said outgoing transmission signal to said first original outgoing digital signal;
f. delivering said first original outgoing digital signal from said remote expander to at least one peripheral device;
g. receiving, at said remote expander, a reply digital signal from said peripheral device;
h. converting said reply digital signal into a converted reply signal having a format suitable for transmission over extended distances;
i. transmitting said converted reply signal as a reply transmission signal over said signal distribution system;
j. receiving said reply transmission signal at said local expander;
k. converting said reply transmission signal to said reply digital signal;
l. storing said reply digital signal as a stored reply digital signal until the receipt of a subsequent original, outgoing digital signal from said host controller, which subsequent signal is the same as, or similar to, said first original outgoing digital signal; and
m. forwarding said stored reply digital signal to said host controller in response to said subsequent original outgoing digital signal.

* * * * *

UNITED STATES PATENT AND TRADEMARK OFFICE
CERTIFICATE OF CORRECTION

PATENT NO. : 6,381,666 B1
DATED : April 30, 2002
INVENTOR(S) : Keith Kejser et al.

It is certified that error appears in the above-identified patent and that said Letters Patent is hereby corrected as shown below:

<u>Title page,</u>
Item [73], should read -- Icron Systems Inc., --

Signed and Sealed this

Twenty-fourth Day of September, 2002

Attest:

Attesting Officer

JAMES E. ROGAN
*Director of the United States Patent and Trademark Office*

US006381666C1

(12) EX PARTE REEXAMINATION CERTIFICATE (10031st)

United States Patent
Kejser et al.

(10) Number: US 6,381,666 C1
(45) Certificate Issued: Feb. 11, 2014

(54) METHOD AND APPARATUS FOR EXTENDING THE RANGE OF THE UNIVERSAL SERIAL BUS PROTOCOL

(75) Inventors: Keith Kejser, New Westminster (CA); Juraj Krajci, Coquitlam (CA)

(73) Assignee: Icron Technologies Corp., Burnaby, British Columbia (CA)

Reexamination Request:
No. 90/020,010, Jul. 25, 2012

Reexamination Certificate for:
Patent No.: 6,381,666
Issued: Apr. 30, 2002
Appl. No.: 09/506,802
Filed: Feb. 18, 2000

Certificate of Correction issued Sep. 24, 2002

(30) Foreign Application Priority Data

Feb. 19, 1999 (CA) .................................. 2262334
Apr. 26, 1999 (CA) .................................. 2269961

(51) Int. Cl.
   *G06F 13/40* (2006.01)

(52) U.S. Cl.
   USPC ........... 710/300; 710/100; 710/305; 710/316; 710/62

(58) Field of Classification Search
   None
   See application file for complete search history.

(56) References Cited

To view the complete listing of prior art documents cited during the proceeding for Reexamination Control Number 90/020,010, please refer to the USPTO's public Patent Application Information Retrieval (PAIR) system under the Display References tab.

*Primary Examiner* — Majid A. Banankhah

(57) ABSTRACT

The present invention provides a method and apparatus to be used to extend the range of a standard USB devices. An extended range hub is provided which comprises a Local Expander (LEX) and a Remote Expander (REX) which can be separated by up to, for example 100 metres. The method and apparatus permits USB devices to be more conveniently located and used.

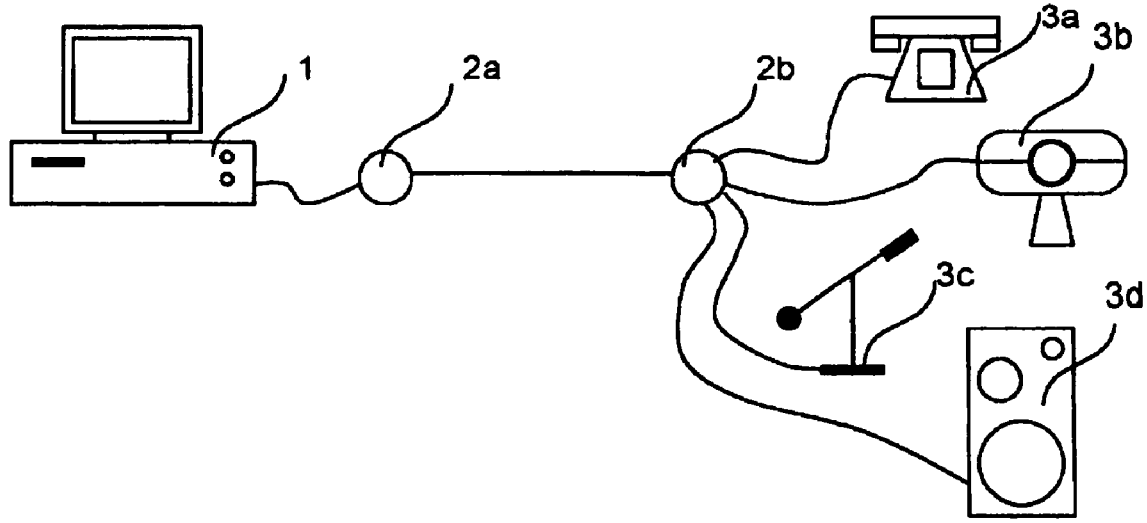

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 9, 10, 28 and 30 are cancelled.

Claims 1, 11, 15, 26, 29, 31 and 40 are determined to be patentable as amended.

Claims 2-3, 19-25, 27 and 32-39, dependent on an amended claim, are determined to be patentable.

New claims 41-46 are added and determined to be patentable.

Claims 4-8, 12-14 and 16-18 were not reexamined.

1. A method for transmitting [a] *an isochronous USB* data stream between a host controller and a peripheral device over an extended distance; said method comprising:
   a. feeding a first original, outgoing digital signal from a host controller to a local expander unit, *and in response to determining that the local expander unit does not already possess data requested by said outgoing digital signal, delivering a synthetic data packet having a payload of zero length to the host controller*;
   b. transmitting said outgoing digital signal as [a] *an* outgoing transmission signal, over a signal distribution system;
   c. receiving said outgoing transmission signal as a first original outgoing digital signal at a remote expander unit;
   d. delivering said first original outgoing digital signal from said remote expander to at least one peripheral device;
   e. receiving, at said remote expander, a reply digital signal from said at least one peripheral device;
   f. transmitting said reply digital signal as a reply transmission signal over said signal distribution system;
   g. receiving said reply transmission signal as a reply digital signal at said local expander;
   h. storing said reply digital signal as a stored reply digital signal until the receipt of a subsequent original, outgoing digital signal from said host controller, which subsequent signal is the same as, or similar to, said first original outgoing digital signal; and
   i. forwarding said stored reply digital signal to said host controller in response to said subsequent original outgoing digital signal.

11. A method as claimed in claim [10] *1* wherein said method provides a method for transmission of asynchronous data according to the USB Specification wherein asynchronous data is transmitted from a peripheral device and is received by a host controller, said method comprising:
   a) receiving, at a local expander, an original request for asynchronous data from a host controller;
   b) forwarding said original request for asynchronous data from said local expander to a remote expander over a signal distribution system;
   c) receiving, at a remote expander, said forwarded original request for asynchronous data;
   d) delivering said forwarded original request for asynchronous data to at least one peripheral device;
   e) receiving, at said remote expander, the requested asynchronous data from said peripheral device;
   f) forwarding said requested asynchronous data from said remote expander to said local expander over said signal distribution system;
   g) storing, in a packet buffer at said local expander, said requested asynchronous data;
   h) receiving, at said local expander, a subsequent request for asynchronous data from said host controller; and
   i) forwarding said subsequent request for asynchronous data from said local expander to a remote expander over a signal distribution system;
      ii) delivering said forwarded subsequent request for asynchronous data to at least one peripheral device;
      iii) receiving, at said remote expander, the requested asynchronous data from said peripheral device;
   i) additionally receiving, at said [locat] *local* expander, said subsequent request for asynchronous data from said host controller as in step (h); and
      i) retrieving the stored asynchronous data from said packet buffer;
      ii) delivering said retrieved asynchronous data to said host controller;
   j) receiving, at said local expander, an outgoing acknowledgement signal from said host controller;
   k) optionally converting said outgoing acknowledgement signal into a converted acknowledgement signal having a format suitable for transmission over extended distances;
   l) transmitting either said outgoing acknowledgement signal or said converted acknowledgement signal, as an acknowledgement transmission signal, over a signal distribution system;
   m) receiving, at a remote expander unit, said acknowledgement transmission signal;
   n) optionally converting said acknowledgement transmission signal to said outgoing acknowledgement signal; and
   o) delivering said outgoing acknowledgement signal from said remote expander to at least one peripheral device.

15. A method as claimed in claim [10] *1* wherein said method provides a method for transmission of asynchronous data according to the USB Specification wherein asynchronous data is transmitted from a host controller and is received by a peripheral device, said method comprising:
   a) receiving, at a local expander, an original notification of asynchronous data from a host controller;
   b) forwarding said original notification of asynchronous data from said local expander to a remote expander over a signal distribution system;
   c) receiving, at a remote expander, said forwarded original notification of asynchronous data;
   d) delivering said forwarded notification of asynchronous data to at least one peripheral device;
   e) receiving, at a local expander, an original asynchronous data packet from a host controller;
   f) forwarding said original asynchronous data packet from said local expander to a remote expander over a signal distribution system;
   g) receiving, at a remote expander, said forwarded original asynchronous data packet;
   h) delivering said forwarded original asynchronous data packet to at least one peripheral device;

i) receiving, at said remote expander, an inbound acknowledgement packet from said peripheral device;
j) forwarding said inbound acknowledgement packet from said remote expander to said local expander over said signal distribution system;
k) storing, in a packet buffer at said local expander, said inbound acknowledgement packet;
l) receiving, at said local expander, a subsequent notification of asynchronous data from said host controller;
m) receiving, at said local expander, a subsequent asynchronous data packet from said host controller; and
   i) retrieving said stored inbound acknowledgement packet from said packet buffer; and
   ii) delivering said retrieved inbound acknowledgement packet to said host controller.

26. An apparatus for transmission of [a digital] *an isochronous USB* signal over an extended distance comprising:
   a local expander comprising means for receiving a request for a data signal from a host controller which host controller is connected to said local expander;
   *means in said local expander for, in response to determining that the local expander does not already possess data requested by said request for a data signal, delivering a synthetic data packet having a payload of zero length to the host controller,*
   means in said local expander for generating an outgoing transmission signal;
   means in said local expander for sending said outgoing transmission signal, which outgoing transmission signal is sent over a signal distribution system;
   a remote expander comprising means for receiving said outgoing transmission signal;
   means in said remote expander for generating a digital signal from said outgoing transmission signal;
   means in said remote expander for forwarding said digital signal to at least one peripheral device, which peripheral device is connected to said remote expander;
   means in said remote expander for receiving inbound digital signals from said peripheral device;
   means in said remote expander for converting said inbound digital signals to an inbound transmission signal;
   means in said remote expander for sending said inbound transmission signal to said local expander, which inbound transmission signal is sent over said signal distribution system;
   means in said local expander for receiving said inbound transmission signal;
   means in said local expander for generating a digital signal from said inbound transmission; and
   means in said remote expander for forwarding said digital signal to said host controller.

29. An apparatus as claimed in claim [28] *26* wherein said local expander additionally comprises:
   means for storing said inbound signal as a stored inbound signal;
   means for analysing said digital signal from said host controller to recognize a subsequent request for transmission of said time relevant digital signal; and
   means for sending said stored inbound signal to said host controller in response to said subsequent request.

31. An apparatus as claimed in claim [30] *26* for transmission of a digital signal over an extended distance comprising:
   a) a local expander comprising means for receiving a request for a non time-relevant data signal from a host controller which host controller is connected to said local expander;
   b) means in said local expander for generating an outgoing transmission signal;
   c) means in said local expander for sending said outgoing transmission signal to a remote expander, which outgoing transmission signal is sent over a signal distribution system;
   d) a remote expander comprising means for receiving said outgoing transmission signal;
   e) means in said remote expander for generating a digital signal from said outgoing transmission signal;
   f) means in said remote expander for forwarding said digital signal to at least one peripheral device, which peripheral device is connected to said remote expander;
   g) means in said remote expander for receiving inbound digital signals from said peripheral device;
   h) means in said remote expander for converting said inbound digital signals to an inbound transmission signal;
   i) means in said remote expander for sending said inbound transmission signal to said local expander, which inbound transmission signal is sent over said signal distribution system;
   j) means in said local expander for receiving said inbound transmission signal;
   k) means in said local expander for generating a digital signal from said inbound transmission; and
   l) means in said remote expander for forwarding said digital signal to said host controller.

40. A method for transmitting [a] *an isochronous USB* data stream between a host controller and a peripheral device over an extended distance; said method comprising:
   a. feeding a first original, outgoing digital signal from a host controller to a local expander unit, *and in response to determining that the local expander unit does not already possess data requested by said outgoing digital signal, delivering a synthetic data packet having a payload of zero length to the host controller*;
   b. converting said outgoing digital signals into a converted outgoing signal having a format suitable for transmission over extended distances;
   c. transmitting said outgoing digital signal, as [a] *an* outgoing transmission signal, over a signal distribution system;
   d. receiving said outgoing transmission signal at a remote expander unit;
   e. converting said outgoing transmission signal to said first original outgoing digital signal;
   f. delivering said first original outgoing digital signal from said remote expander to at least one peripheral device;
   g. receiving, at said remote expander, a reply digital signal from said peripheral device;
   h. converting said reply digital signal into a converted reply signal having a format suitable for transmission over extended distances;
   i. transmitting said converted reply signal as a reply transmission signal over said signal distribution system;
   j. receiving said reply transmission signal at said local expander;
   k. converting said reply transmission signal to said reply digital signal;
   l. storing said reply digital signal as a stored reply digital signal until the receipt of a subsequent original, outgoing digital signal from said host controller, which subsequent signal is the same as, or similar to, said first original outgoing digital signal; and m. forwarding said stored reply digital signal to said host controller in response to said subsequent original outgoing digital signal.

41. A method for transmitting a data stream between a host controller and a peripheral device over an extended distance; said method comprising:
(I). feeding a first original, outgoing digital signal from a host controller to a local expander unit;
(II). transmitting said outgoing digital signal as a outgoing transmission signal, over a signal distribution system;
(III). receiving said outgoing transmission signal as a first original outgoing digital signal at a remote expander unit;
(IV). delivering said first original outgoing digital signal from said remote expander to at least one peripheral device;
(V). receiving, at said remote expander, a reply digital signal from said at least one peripheral device;
(VI). transmitting said reply digital signal as a reply transmission signal over said signal distribution system;
(VII). receiving said reply transmission signal as a reply digital signal at said local expander;
(VIII). storing said reply digital signal as a stored reply digital signal until the receipt of a subsequent original, outgoing digital signal from said host controller, which subsequent signal is the same as, or similar to, said first original outgoing digital signal; and
(IX). forwarding said stored reply digital signal to said host controller in response to said subsequent original outgoing digital signal;
wherein said data stream is a time relevant data stream;
wherein said digital signals conform to the USB Specification and represent isochronous data; and
wherein said method provides a method for transmission of isochronous data according to the USB Specification wherein isochronous data is transmitted from a peripheral device and is received by a host controller, said method comprising:
a. transmitting a request for isochronous data from a host controller to a local expander;
b. forwarding said request for isochronous data from said local expander to a remote expander over a signal distribution system;
(1) determining whether said local expander already possesses said requested isochronous data;
(2) generating a synthetic data packet having a payload of zero length if no such requested isochronous data is present;
(3) delivering said synthetic isochronous data to said host controller;
c. delivering said forwarded request for isochronous data to at least one peripheral device:
d. transmitting the requested isochronous data from said peripheral device to said remote expander;
e. forwarding said requested isochronous data from said remote expander to said local expander over said signal distribution system;
f. storing said requested isochronous data in a packet buffer at said local expander;
g. transmitting a subsequent request for isochronous data from said host controller to said local expander;
h. receiving said subsequent request for isochronous data at said local expander; and
I. retrieving the stored isochronous data from said local expander;
II. delivering said stored isochronous data to said host controller;
III. forwarding said subsequent request for isochronous data from said local expander to said remote expander over said signal distribution system; and
IV. repeating steps (c) through (h) for said subsequent request and any further subsequent requests for isochronous data.

42. A method for transmitting a data stream between a host controller and a peripheral device over an extended distance; said method comprising:
(I). feeding a first original, outgoing digital signal from a host controller to a local expander unit, and in response to determining that the local expander unit does not already possess data requested by said outgoing digital signal, delivering a synthetic data packet having a payload of zero length to the host controller;
(II). transmitting said outgoing digital signal as a outgoing transmission signal, over a signal distribution system;
(III). receiving said outgoing transmission signal as a first original outgoing digital signal at a remote expander unit;
(IV). delivering said first original outgoing digital signal from said remote expander to at least one peripheral device;
(V). receiving, at said remote expander, a reply digital signal from said at least one peripheral device;
(VI). transmitting said reply digital signal as a reply transmission signal over said signal distribution system;
(VII). receiving said reply transmission signal as a reply digital signal at said local expander;
(VIII). storing said reply digital signal as a stored reply digital signal until the receipt of a subsequent original, outgoing digital signal from said host controller, which subsequent signal is the same as, or similar to, said first original outgoing digital signal; and
(IX). forwarding said stored reply digital signal to said host controller in response to said subsequent original outgoing digital signal;
wherein said data stream is a time relevant data stream;
wherein said digital signals conform to the USB Specification and represent isochronous data; and
wherein said method provides a method for transmission of isochronous data according to the USB Specification wherein isochronous data is transmitted from a host controller and is received by a peripheral device, said method comprising:
a) receiving, at a local expander, an original notification of isochronous a host controller;
b) forwarding said original notification of isochronous data from said local expander to a remote expander over a signal distribution system;
c) receiving, at a remote expander, said forwarded original notification of isochronous data;
d) delivering said forwarded notification of asynchronous data to at least one peripheral device;
e) receiving, at a local expander, an original isochronous data packet from a host controller;
f) forwarding said original isochronous data packet from said local expander to a remote expander over a signal distribution system;
g) receiving, at a remote expander, said forwarded original isochronous data packet; and
h) delivering said forwarded original isochronous data packet to at least one peripheral device.

43. A method for transmitting an isochronous data stream between a host controller and a peripheral device over an extended distance; said method comprising:

(I). feeding a first original, outgoing digital signal from a host controller to a local expander unit, and in response to determining that the local expander unit does not already possess data requested by said outgoing digital signal, delivering a synthetic data packet having a payload of zero length to the host controller;

(II). transmitting said outgoing digital signal as a outgoing transmission signal, over a signal distribution system;

(III). receiving said outgoing transmission signal as a first original outgoing digital signal at a remote expander unit;

(IV). delivering said first original outgoing digital signal from said remote expander to at least one peripheral device;

(V). receiving, at said remote expander, a reply digital signal from said at least one peripheral device;

(VI). transmitting said reply digital signal as a reply transmission signal over said signal distribution system;

(VII). receiving said reply transmission signal as a reply digital signal at said local expander;

(VIII). storing said reply digital signal as a stored reply digital signal until the receipt of a subsequent original, outgoing digital signal from said host controller, which subsequent signal is the same as, or similar to, said first original outgoing digital signal; and (IX). forwarding said stored reply digital signal to said host controller in response to said subsequent original outgoing digital signal;

wherein said method provides a method for transmission of asynchronous data according to the USB Specification wherein asynchronous data is transmitted from a peripheral device and is received by a host controller, said method comprising:

a) receiving, at a local expander, an original request for asynchronous data from a host controller;

b) forwarding said original request for asynchronous data from said local expander to a remote expander over a signal distribution system;

c) receiving, at a remote expander, said forwarded original request for asynchronous data;

d) delivering said forwarded original request for asynchronous data to at least one peripheral device;

e) receiving, at said remote expander, the requested asynchronous data from said peripheral device;

f) forwarding said requested asynchronous data from said remote expander to said local expander over said signal distribution system;

g) storing, in a packet buffer at said local expander, said requested asynchronous data;

h) receiving, at said local expander, a subsequent request for asynchronous data from said host controller; and 1) forwarding said subsequent request for asynchronous data from said local expander to a remote expander over a signal distribution system;

2) delivering said forwarded subsequent request for asynchronous data to at least one peripheral device;

3) receiving, at said remote expander, the requested asynchronous data from said peripheral device;

i) additionally receiving, at said local expander, said subsequent request for asynchronous data from said host controller as in step (h); and 1) retrieving the stored asynchronous data from said packet buffer;

2) delivering said retrieved asynchronous data to said host controller;

j) receiving, at said local expander, an outgoing acknowledgement signal from said host controller;

k) optionally converting said outgoing acknowledgement signal into a converted acknowledgement signal having a format suitable for transmission over extended distances;

l) transmitting either said outgoing acknowledgement signal or said converted acknowledgement signal, as an acknowledgement transmission signal, over a signal distribution system;

m) receiving, at a remote expander unit, said acknowledgement transmission signal;

n) optionally converting said acknowledgement transmission signal to said outgoing acknowledgement signal; and o) delivering said outgoing acknowledgement signal from said remote expander to at least one peripheral device.

44. A method for transmitting an isochronous data stream between a host controller and a peripheral device over an extended distance, said method comprising:

(I) feeding a first original, outgoing digital signal from a host controller to a local expander unit, and in response to determining that the local expander unit does not already possess data requested by said outgoing digital signal, delivering a synthetic data packet having a payload of zero length to the host controller;

(II) transmitting said outgoing digital signal as a outgoing transmission signal, over a signal distribution system;

(III) receiving said outgoing transmission signal as a first original outgoing digital signal at a remote expander unit;

(IV) delivering said first original outgoing digital signal from said remote expander to at least one peripheral device;

(V) receiving, at said remote expander, a reply digital signal from said at least one peripheral device;

(VI) transmitting said reply digital signal as a reply transmission signal over said signal distribution system;

(VII) receiving said reply transmission signal as a reply digital signal at said local expander;

(VIII) storing said reply digital signal as a stored reply digital signal until the receipt of a subsequent original, outgoing digital signal from said host controller, which subsequent signal is the same as, or similar to, said first original outgoing digital signal; and (IX) forwarding said stored reply digital signal to said host controller in response to said subsequent original outgoing digital signal;

wherein said method provides a method for transmission of asynchronous data according to the USB Specification wherein asynchronous data is transmitted from a host controller and is received by a peripheral device, said method comprising:

a) receiving, at a local expander, an original notification of asynchronous data from a host controller;

b) forwarding said original notification of asynchronous data from said local expander to a remote expander over a signal distribution system;

c) receiving, at a remote expander, said forwarded original notification of asynchronous data;

d) delivering said forwarded notification of asynchronous data to at least one peripheral device;

e) receiving, at a local expander, an original asynchronous data packet from a host controller;

1) generating an acknowledgement packet at said local expander; and 2) delivering said acknowledgement packet to said host controller;

f) forwarding said original asynchronous data packet from said local expander to a remote expander over a signal distribution system;

g) receiving, at a remote expander, said forwarded original asynchronous data packet;

h) delivering said forwarded original asynchronous data packet to at least one peripheral device;

i) receiving, at said remote expander, an inbound acknowledgement packet from said peripheral device;

j) forwarding said inbound acknowledgement packet from said remote expander to said local expander over said signal distribution system;

k) storing, in a packet buffer at said local expander, said inbound acknowledgement packet;

l) receiving, at said local expander, a subsequent notification of asynchronous data from said host controller;

m) receiving, at said local expander, a subsequent asynchronous data packet from said host controller; and 1) retrieving said stored inbound acknowledgement packet from said packet buffer; and 2) delivering said retrieved inbound acknowledgement packet to said host controller.

45. A method for transmitting an isochronous data stream between a host controller and a peripheral device over an extended distance; said method comprising:

(I) feeding a first original, outgoing digital signal from a host controller to a local expander unit, and in response to determining that the local expander unit does not already possess data requested by said outgoing digital signal, delivering a synthetic data packet having a payload of zero length to the host controller;

(II) transmitting said outgoing digital signal as a outgoing transmission signal, over a signal distribution system;

(III) receiving said outgoing transmission signal as a first original outgoing digital signal at a remote expander unit;

(IV) delivering said first original outgoing digital signal from said remote expander to at least one peripheral device;

(V) receiving, at said remote expander, a reply digital signal from said at least one peripheral device;

(VI) transmitting said reply digital signal as a reply transmission signal over said signal distribution system;

(VII) receiving said reply transmission signal as a reply digital signal at said local expander;

(VIII) storing said reply digital signal as a stored reply digital signal until the receipt of a subsequent original, outgoing digital signal from said host controller, which subsequent signal is the same as, or similar to, said first original outgoing digital signal; and (IX) forwarding said stored reply digital signal to said host controller in response to said subsequent original outgoing digital signal;

wherein said method provides a method for transmission of asynchronous data according to the USB Specification wherein asynchronous data is transmitted from a host controller and is received by a peripheral device, said method comprising:

a) receiving, at a local expander, an original notification of asynchronous data from a host controller;

b) forwarding said original notification of asynchronous data from said local expander to a remote expander over a signal distribution system;

c) receiving, at a remote expander, said forwarded original notification of asynchronous data;

d) delivering said forwarded notification of asynchronous data to at least one peripheral device;

e) receiving, at a local expander, an original asynchronous data packet from a host controller;

1) determining whether said local expander already possesses said inbound acknowledgement packet;

2) generating a negative acknowledgement packet if no such inbound acknowledgement packet is present; and 3) delivering said negative acknowledgement packet to said host controller;

f) forwarding said original asynchronous data packet from said local expander to a remote expander over a signal distribution system;

g) receiving, at a remote expander, said forwarded original asynchronous data packet;

h) delivering said forwarded original asynchronous data packet to at least one peripheral device;

i) receiving, at said remote expander, an inbound acknowledgement packet from said peripheral device;

j) forwarding said inbound acknowledgement packet from said remote expander to said local expander over said signal distribution system;

k) storing, in a packet buffer at said local expander, said inbound acknowledgement packet;

l) receiving, at said local expander, a subsequent notification of asynchronous data from said host controller;

m) receiving, at said local expander, a subsequent asynchronous data packet from said host controller; and 1) retrieving said stored inbound acknowledgement packet from said packet buffer; and 2) delivering said retrieved inbound acknowledgement packet to said host controller.

46. A method for transmitting an isochronous data stream between a host controller and a peripheral device over an extended distance; said method comprising:

(I). feeding a first original, outgoing digital signal from a host controller to a local expander unit, and in response to determining that the local expander unit does not already possess data requested by said outgoing digital signal, delivering a synthetic data packet having a payload of zero length to the host controller;

(II). transmitting said outgoing digital signal as a outgoing transmission signal, over a signal distribution system;

(III). receiving said outgoing transmission signal as a first original outgoing digital signal at a remote expander unit;

(IV). delivering said first original outgoing digital signal from said remote expander to at least one peripheral device;

(V). receiving, at said remote expander, a reply digital signal from said at least one peripheral device;

(VI). transmitting said reply digital signal as a reply transmission signal over said signal distribution system;

(VII). receiving said reply transmission signal as a reply digital signal at said local expander;

(VIII). storing said reply digital signal as a stored reply digital signal until the receipt of a subsequent original, outgoing digital signal from said host controller, which subsequent signal is the same as, or similar to, said first original outgoing digital signal; and (IX). forwarding said stored reply digital signal to said host controller in response to said subsequent original outgoing digital signal;

wherein said method provides a method for transmission of asynchronous data according to the USB Specification wherein asynchronous data is transmitted from a host controller and is received by a peripheral device, said method comprising:

a) receiving, at a local expander, an original notification of asynchronous data from a host controller;
b) forwarding said original notification of asynchronous data from said local expander to a remote expander over a signal distribution system;
c) receiving, at a remote expander, said forwarded original notification of asynchronous data;
d) delivering said forwarded notification of asynchronous data to at least one peripheral device;
e) receiving, at a local expander, an original asynchronous data packet from a host controller;
f) forwarding said original asynchronous data packet from said local expander to a remote expander over a signal distribution system;
g) receiving, at a remote expander, said forwarded original asynchronous data packet;
h) delivering said forwarded original asynchronous data packet to at least one peripheral device;
i) receiving, at said remote expander, an inbound acknowledgement packet from said peripheral device;
j) forwarding said inbound acknowledgement packet from said remote expander to said local expander over said signal distribution system;
k) storing, in a packet buffer at said local expander, said inbound acknowledgement packet;
l) receiving, at said local expander, a subsequent notification of asynchronous data from said host controller;
m) receiving, at said local expander, a subsequent asynchronous data packet from said host controller; and
 1) retrieving said stored inbound acknowledgement packet from said packet buffer; and
 2) delivering said retrieved inbound acknowledgement packet to said host controller;
wherein, additionally, a guard time is imposed after a data packet is transmitted from a remote expander to a USB device, which guard time is set to a value that is dependent upon the transfer type of said transmitted data packet, said method comprising:
A) receiving, at a remote expander, an outbound data packet,
B) determining, at a remote expander, the transfer type of said outbound data packet,
C) forwarding said outbound data packet from said remote expander to a USB device,
D) setting the value of a transmission guard timer to a value that is dependent upon said determined transfer type; and
E) inhibiting further outbound transmissions until said guard timer has expired.

* * * * *